(12) United States Patent
Dupray

(10) Patent No.: US 6,249,252 B1
(45) Date of Patent: *Jun. 19, 2001

(54) WIRELESS LOCATION USING MULTIPLE LOCATION ESTIMATORS

(75) Inventor: Dennis J. Dupray, Denver, CO (US)

(73) Assignee: TracBeam LLC, Golden, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,115

(22) Filed: Apr. 23, 1999

Related U.S. Application Data

(63) Continuation-in-part of application No. 09/194,367, filed on Nov. 24, 1998, which is a continuation-in-part of application No. 09/176,587, filed on Oct. 21, 1998, which is a continuation-in-part of application No. 09/230,109, filed on Jan. 22, 1999.

(60) Provisional application No. 60/083,041, filed on Apr. 23, 1998.

(51) Int. Cl.[7] ........................................................ G01S 3/02
(52) U.S. Cl. ...................... 342/450; 342/457; 342/357.01
(58) Field of Search .................................... 342/450, 457, 342/357.01, 357.02; 455/456, 457; 701/213, 216

(56) References Cited

U.S. PATENT DOCUMENTS

Re. 31,962    7/1985    Brodeur ............................... 343/389

(List continued on next page.)

FOREIGN PATENT DOCUMENTS 0 177 203 A2    9/1985    (EP) ................................. G01S/1/20

(List continued on next page.)

OTHER PUBLICATIONS

CC Docket No. 94–102, Before the Federal Communications Commission, in the Matter of Revision of the Commission's Rules to Ensure Compatibility with Enhanced 911 Emergency Calling Systems; "Comments of Harris Government Communication Systems Division A Division of Harris Corporation", filed Sep. 25, 1996.

(List continued on next page.)

Primary Examiner—Thomas H. Tarcza
Assistant Examiner—Dao L. Phan
(74) Attorney, Agent, or Firm—Dennis J. Dupray

(57) ABSTRACT

A location system is disclosed for commercial wireless telecommunication infrastructures. The system is an end-to-end solution having one or more location centers for outputting requested locations of commercially available handsets or mobile stations (MS) based on, e.g., CDMA, AMPS, NAMPS or TDMA communication standards, for processing both local MS location requests and more global MS location requests via, e.g., Internet communication between a distributed network of location centers. The system uses a plurality of MS locating technologies including those based on: (1) two-way TOA and TDOA; (2) pattern recognition; (3) distributed antenna provisioning; (5) GPS signals, (6) angle of arrival, (7) super resolution enhancements, and (8) supplemental information from various types of very low cost non-infrastructure base stations for communicating via a typical commercial wireless base station infrastructure or a public telephone switching network. Accordingly, the traditional MS location difficulties, such as multipath, poor location accuracy and poor coverage are alleviated via such technologies in combination with strategies for: (a) automatically adapting and calibrating system performance according to environmental and geographical changes; (b) automatically capturing location signal data for continual enhancement of a self-maintaining historical data base retaining predictive location signal data; (c) evaluating MS locations according to both heuristics and constraints related to, e.g., terrain, MS velocity and MS path extrapolation from tracking and (d) adjusting likely MS locations adaptively and statistically so that the system becomes progressively more comprehensive and accurate. Further, the system can be modularly configured for use in location signing environments ranging from urban, dense urban, suburban, rural, mountain to low traffic or isolated roadways. Accordingly, the system is useful for 911 emergency calls, tracking, routing, people and animal location including applications for confinement to and exclusion from certain areas.

8 Claims, 24 Drawing Sheets

U.S. PATENT DOCUMENTS

| | | | |
|---|---|---|---|
| 3,886,553 | 5/1975 | Bates | 343/112 R |
| 4,023,176 | 5/1977 | Currie et al. | 343/113 E |
| 4,232,313 | 11/1980 | Fleishman | 343/6 R |
| 4,347,618 | 8/1982 | Kavouras et al. | 375/37 |
| 4,438,439 | 3/1984 | Shreve | 343/449 |
| 4,475,010 | 10/1984 | Huensch et al. | 179/2 EB |
| 4,630,057 | 12/1986 | Martin | 342/358 |
| 4,636,795 | 1/1987 | Dano | 342/387 |
| 4,651,157 | 3/1987 | Gray et al. | 342/457 |
| 4,670,758 | 6/1987 | Campbell | 342/458 |
| 4,740,792 | 4/1988 | Sagey et al. | 342/457 |
| 4,742,357 | 5/1988 | Rackley | 342/457 |
| 4,799,062 | 1/1989 | Sanderford, Jr. et al. | 342/450 |
| 4,857,840 | 8/1989 | Lanchais | 324/207 |
| 4,860,352 | 8/1989 | Laurance et al. | 380/23 |
| 4,864,313 | 9/1989 | Konneker | 342/457 |
| 4,876,550 | 10/1989 | Kelly | 342/451 |
| 4,879,713 | 11/1989 | Ichiyoshi | 370/75 |
| 4,888,593 | 12/1989 | Laurance et al. | 380/23 |
| 4,914,689 | 4/1990 | Quade et al. | 379/142 |
| 4,952,772 | 8/1990 | Zana | 219/124.34 |
| 4,990,922 | 2/1991 | Young et al. | 342/52 |
| 4,992,796 | 2/1991 | Apostolos | 342/156 |
| 5,003,317 | 3/1991 | Gray et al. | 342/457 |
| 5,008,679 | 4/1991 | Effland et al. | 342/353 |
| 5,017,926 | 5/1991 | Ames et al. | 342/353 |
| 5,034,898 | 7/1991 | Lu et al. | 364/513 |
| 5,055,851 | 10/1991 | Sheffer | 342/457 |
| 5,092,343 | 3/1992 | Spitzer et al. | 128/733 |
| 5,099,245 | 3/1992 | Sagey | 342/357 |
| 5,119,102 | 6/1992 | Barnard | 342/357 |
| 5,136,686 | 8/1992 | Koza | 395/13 |
| 5,142,590 | 8/1992 | Carpenter et al. | 382/14 |
| 5,155,490 | 10/1992 | Spradley et al. | 342/357 |
| 5,163,004 | 11/1992 | Rentz | 364/460 |
| 5,166,694 | 11/1992 | Russell et al. | 342/457 |
| 5,184,347 | 2/1993 | Farwell et al. | 370/94.1 |
| 5,191,342 | 3/1993 | Alsup et al. | 342/465 |
| 5,212,765 | 5/1993 | Skeirik | 395/11 |
| 5,212,804 | 5/1993 | Choate | 455/33.1 |
| 5,214,789 | 5/1993 | George | 455/33.2 |
| 5,218,367 | 6/1993 | Sheffer et al. | 342/457 |
| 5,218,618 | 6/1993 | Sagey | 375/1 |
| 5,218,716 | 6/1993 | Comroe et al. | 455/33 |
| 5,225,842 | 7/1993 | Brown et al. | 342/357 |
| 5,243,530 | 9/1993 | Stanifer et al. | 364/452 |
| 5,251,273 | 10/1993 | Betts et al. | 382/57 |
| 5,260,711 | 11/1993 | Sterzer | 342/375 |
| 5,278,892 | 1/1994 | Bolliger et al. | 379/60 |
| 5,280,295 | 1/1994 | Kelley et al. | 342/463 |
| 5,280,472 | 1/1994 | Gilhousen et al. | 370/18 |
| 5,282,261 | 1/1994 | Skeirik | 395/22 |
| 5,293,642 | 3/1994 | Lo | 455/33.1 |
| 5,319,374 | 6/1994 | Desai et al. | 342/387 |
| 5,325,419 | 6/1994 | Connolly et al. | 379/60 |
| 5,327,144 | 7/1994 | Stilp et al. | 342/387 |
| 5,331,550 | 7/1994 | Stafford et al. | 364/413.02 |
| 5,359,521 | 10/1994 | Kyrtsos et al. | 364/449 |
| 5,363,110 | 11/1994 | Inamiya | 342/357 |
| 5,365,516 | 11/1994 | Jandrell | 370/18 |
| 5,365,544 | 11/1994 | Schilling | 375/1 |
| 5,388,259 | 2/1995 | Fleischman et al. | 395/600 |
| 5,390,339 | 2/1995 | Bruckert et al. | 455/33.2 |
| 5,394,158 | 2/1995 | Chia | 342/457 |
| 5,394,435 | 2/1995 | Weerackody | 375/206 |
| 5,398,302 | 3/1995 | Thrift | 395/23 |
| 5,402,520 | 3/1995 | Schnitta | 395/22 |
| 5,408,586 | 4/1995 | Skeirik | 395/23 |
| 5,408,588 | 4/1995 | Ulug | 395/23 |
| 5,410,737 | 4/1995 | Jones | 455/56.1 |
| 5,420,914 | 5/1995 | Blumhardt | 379/114 |
| 5,426,745 | 6/1995 | Baji et al. | 395/375 |
| 5,434,927 | 7/1995 | Brady et al. | 382/104 |
| 5,438,644 | 8/1995 | Fu | 395/22 |
| 5,448,754 | 9/1995 | Ho et al. | 455/34.1 |
| 5,457,736 | 10/1995 | Cain et al. | 379/60 |
| 5,479,397 | 12/1995 | Lee | 370/18 |
| 5,479,482 | 12/1995 | Grimes | 379/59 |
| 5,485,163 | 1/1996 | Singer | 342/457 |
| 5,506,864 | 4/1996 | Schilling | 375/205 |
| 5,508,707 | 4/1996 | LeBlanc et al. | 342/457 |
| 5,508,708 | 4/1996 | Ghosh et al. | 342/457 |
| 5,517,667 | 5/1996 | Wang | 395/24 |
| 5,519,760 | 5/1996 | Borkowski et al. | 379/59 |
| 5,526,357 | 6/1996 | Jandrell | 370/95.2 |
| 5,526,466 | 6/1996 | Takizawa | 395/2.62 |
| 5,537,460 | 7/1996 | Holliday, Jr. et al. | 379/59 |
| 5,564,079 | 10/1996 | Olsson | 455/54.1 |
| 5,570,412 | 10/1996 | LeBlanc | 379/58 |
| 5,574,648 | 11/1996 | Pilley | 364/439 |
| 5,577,169 | 11/1996 | Prezioso | 395/61 |
| 5,581,596 | 12/1996 | Hogan | 379/59 |
| 5,596,625 | 1/1997 | LeBlanc | 379/60 |
| 5,602,903 | 2/1997 | LeBlanc et al. | 379/60 |
| 5,608,410 | 3/1997 | Stilp et al. | 342/387 |
| 5,610,972 | 3/1997 | Emery et al. | 379/58 |
| 5,612,703 | 3/1997 | Mallinckrodt | 342/457 |
| 5,613,041 | 3/1997 | Keeler et al. | 395/23 |
| 5,613,205 | 3/1997 | Dufour | 455/33.2 |
| 5,614,914 | 3/1997 | Bolgiano et al. | 342/364 |
| 5,619,552 | 4/1997 | Karppanen et al. | 379/60 |
| 5,621,848 | 4/1997 | Wang | 395/2.2 |
| 5,629,707 | 5/1997 | Heuvel et al. | 342/357 |
| 5,631,469 | 5/1997 | Carrieri et al. | 250/341.5 |
| 5,638,486 | 6/1997 | Wang et al. | 395/2.45 |
| 5,640,103 | 6/1997 | Petsche et al. | 324/772 |
| 5,649,065 | 7/1997 | Lo et al. | 395/23 |
| 5,701,328 | 12/1997 | Schuchman et al. | 375/204 |
| 5,717,406 | 2/1998 | Sanderford et al. | 342/457 |
| 5,724,660 | 3/1998 | Kauser et al. | 455/456 |
| 5,732,354 | 3/1998 | MacDonald | 455/456 |
| 5,774,802 | 6/1998 | Tell et al. | 455/408 |
| 5,790,953 | 8/1998 | Wang et al. | 455/435 |
| 5,802,454 | 9/1998 | Goshay et al. | 455/31.2 |
| 5,805,670 | 9/1998 | Pons et al. | 379/45 |
| 5,832,367 | 11/1998 | Bamburak et al. | 455/62 |
| 5,845,198 | 12/1998 | Bamburak et al. | 455/31.1 |
| 5,875,394 | 2/1999 | Daly et al. | 455/411 |
| 5,875,401 | 2/1999 | Rochkind | 455/466 |
| 5,883,598 | 3/1999 | Parl et al. | 342/457 |
| 5,890,068 | * 3/1999 | Fattouche et al. | 455/456 |
| 5,892,441 | 4/1999 | Woolley et al. | 340/539 |
| 5,893,091 | 4/1999 | Hunt et al. | 707/3 |
| 5,901,358 | 5/1999 | Petty et al. | 455/456 |
| 5,905,455 | 5/1999 | Heger et al. | 342/22 |
| 5,906,655 | 5/1999 | Fan | 701/216 |
| 5,913,170 | 6/1999 | Wortham | 455/457 |
| 5,917,449 | 6/1999 | Sanderford et al. | 342/457 |
| 5,917,866 | 6/1999 | Pon | 375/346 |
| 5,920,873 | 7/1999 | Van Huben et al. | 707/202 |
| 5,924,090 | 7/1999 | Krellenstein | 707/5 |
| 5,926,133 | 7/1999 | Green, Jr. | 342/363 |
| 5,933,421 | 8/1999 | Alamouti et al. | 370/330 |
| 5,933,822 | 8/1999 | Braden-Harder et al. | 707/5 |
| 5,936,572 | 8/1999 | Loomis et al. | 342/357 |
| 5,943,014 | 8/1999 | Gilhousen | 342/465 |
| 5,945,948 | 8/1999 | Buford et al. | 342/457 |
| 5,949,815 | 9/1999 | Pon | 375/208 |
| 5,952,969 | 9/1999 | Hagerman et al. | 342/457 |
| 5,963,866 | 10/1999 | Palamara et al. | 455/456 |
| 5,973,643 | 10/1999 | Hawkes et al. | 342/457 |

| | | |
|---|---|---|
| 5,977,913 | 11/1999 | Christ .................................... 342/465 |
| 5,978,840 | 11/1999 | Nguyen et al. ........................ 709/217 |
| 5,982,324 * | 11/1999 | Watters et al. ................... 342/357.06 |
| 5,982,891 | 11/1999 | Ginter et al. .............................. 380/4 |
| 5,983,214 | 11/1999 | Lang et al. ............................... 707/1 |
| 5,987,329 | 11/1999 | Yost et al. .............................. 455/456 |
| 5,999,124 | 12/1999 | Sheynblat ........................ 342/357.09 |
| 6,009,334 | 12/1999 | Grubeck et al. ...................... 355/456 |
| 6,014,102 | 1/2000 | Mitzlaff et al. ....................... 342/456 |
| 6,026,304 | 2/2000 | Hilsenrath et al. ................... 455/456 |
| 6,028,551 | 2/2000 | Schoen et al. ........................ 342/357 |
| 6,029,161 | 2/2000 | Lang et al. ............................... 707/1 |
| 6,031,490 | 2/2000 | Forssén et al. ....................... 342/457 |
| 6,038,668 | 3/2000 | Chipman et al. ..................... 713/201 |
| 6,046,683 | 4/2000 | Pidwerbetsky et al. ......... 340/825.54 |
| 6,047,192 | 4/2000 | Maloney et al. ...................... 455/456 |
| 6,064,339 | 5/2000 | Wax et al. ............................ 342/417 |
| 6,064,942 | 5/2000 | Johnson et al. ....................... 701/213 |
| 6,101,178 | 8/2000 | Beal ..................................... 370/336 |
| 6,101,390 | 8/2000 | Jayaraman et al. ................... 455/456 |
| 6,101,391 | 8/2000 | Ishizuka et al. ...................... 455/457 |

FOREIGN PATENT DOCUMENTS

| | | | |
|---|---|---|---|
| 0 546 758 A2 | 12/1992 | (EP) | ............................... H04Q/7/04 |
| 0 689 369 A1 | 6/1995 | (EP) | ............................... H04Q/7/38 |
| 1 605 207 | 6/1975 | (GB) | ............................ G01S/11/00 |
| 2 155 720 | 9/1985 | (GB) | ............................. H04B/1/59 |
| WO 93/04453 | 3/1993 | (WO) | ............................ G08G/1/127 |
| WO 94/27161 | 4/1994 | (WO) . | |
| WO 94/27161 | 11/1994 | (WO) | ............................... G01S/1/24 |

OTHER PUBLICATIONS

CC Docket No. 94–102, Before the Federal Communications Commission, in the Matter of Revision of the Commission's Rules to Ensure Compatibility with Enhanced 911 Emergency Calling Systems; "Reply Comments of KSI Inc. and MULIC Inc." filed Oct. 25, 1996.

CC Docket No. 94–102, Before the Federal Communications Commission, in the Matter of Revision of the Commission's Rules to Ensure Compatibility with Enhanced 911 Emergency Calling Systems; ex parte communication from Cambridge Positioning Systems Ltd. received Apr. 14, 1997 by the Commission.

CC Docket No. 94–102, Before the Federal Communications Commission, in the Matter of Revision of the Commission's Rules to Ensure Compatibility with Enhanced 911 Emergency Calling Systems; ex parte communication from GeoTek Communications, Inc. received Apr. 14, 1997 by the Commission.

CC Docket No. 94–102, Before the Federal Communications Commission, in the Matter of Revision of the Commission's Rules to Ensure Compatibility with Enhanced 911 Emergency Calling Systems; ex parte communication from XYPOINT Corporation, Inc. received Jul. 28, 1997 by the Commission.

CC Docket No. 94–102, Before the Federal Communications Commission, in the Matter of Revision of the Commission's Rules to Ensure Compatibility with Enhanced 911 Emergency Calling Systems; ex parte communication from National Strategies, Inc., regarding enhanced 911 system trial by TruePosition, Inc. and New Jersey Office of Emergency Telecommunications Services, received Aug. 8, 1997 by the Commission.

CC Docket No. 94–102, Before the Federal Communications Commission, in the Matter of Revision of the Commission's Rules to Ensure Compatibility with Enhanced 911 Emergency Calling Systems; ex parte communication from SnapTrack, Inc., received Jun. 27, 1997 by the Commission.

Evans, 1998, "New Satellites for Personal Communications," *Scientific American*, 278 (4):70–77.

Hills, 1998, Terrestrial Wireless Networks, *Scientific American*, 278 (4):86–91.

Pelton, 1998, "Telecommunications for the 21st Century," *Scientific American*, 278 (4):80–85.

Stutzman et al., 1998, "Moving Beyond Wireless Voice Systems," *Scientific American*, 278 (4):92–93.

from http:/www.uswcorp.com/laby.htm,, Release concerning RadioCamera™, printed Sep. 14, 1998.

Wylie et al., "The Non–Line of Sight Problem in Mobile Location Estimation".

Driscoll, "Wireless Caller Location Systems", 1998, *GSP World* Advanstar Communications, Inc., www.gpsworld.com/1198/1198driscol.html, pp. 1–8.

Junius et al., "New Methods for Processing GSM Radio Measurement Data: Applications for Locating, Handover, and Network Management", 1994, *IEEE*, 0–7803–1927–3/94, pp. 338–342.

Low, "Comparison of Urban Propagation Models with CW–Measurements", 1992, *IEEE*, 0–7963–2/92, pp. 936–942.

"Location Systems and Technologies", 1994, *Wireless Emergency Services JEM Report*, Annex A pp. 42–46 and Appendix A pp. 1–2.

"The Measearch Engine Years: Fit the First", 1992, http://www.conman.org/people/spc/refs/search.hpl.html, pp. 1–3.

Fechner et al., A Hybrid Neural Network Architecture for Automatic Object Recognition, 1994, *IEEE*, pp. 187–194.

Kosko, "Fuzzy Systems as Universal Approximators", 1994, *IEEE*, 0018–9340/94, pp. 1329–1333.

Mardiraju et al., "Neural Networks for Robust Image Feature Classification: A Comparative Study", 1994, *IEEE*, 0–7803–2026–3/94, pp. 423–430.

Sousa et al., "Delay Spread Measurements for the Digital Cellular Channel in Toronto", Nov. 1994, *IEEE*, vol. 43, No. 4, pp. 837–847.

Goldsmith et al., "A Measurement–Based Model for Predicting Coverage Areas of Urban Microcells", Sep. 1993, *IEEE*, vol. 11, No. 7, pp. 1013–1023.

Ichitsubo et al., "A Statistical Model for Microcellular Multipath Propagation Environment", Prior to Dec. 22, 1997, *Wireless Systems Laboratories*, Japan, pp. 1–6.

Wittenben et al., "A Low Cost Noncoherent Receiver with Adaptive Antenna Combining for High Speed Wireless Lans", Prior to Dec. 22, 1997, *ASCOM Systec AG*, pp. 1–4.

Gaspard et al., "Position Assignment in Digital Cellular Mobile Radio Networks (e.g. GSM) derived from Measurements at the Protocol Interface", Prior to Dec. 22, 1997, pp. 1–5.

Dutta et al., "Modified Adaptive Multiuser Detector for DS–CDMA in Multipath Fading", Prior to Dec. 22, 1997, pp. 1–7.

Wolfe et al., "Field Strength Prediction in Indoor Environments with Neural Networks", Prior to Dec. 22, 1997, pp. 1–5.

Lawrence et al., "Northern Light Search Engine Leads the Pack—Others Fall Behind", May 1, 1998, *Online Newsletter*, 19(5)pp. 1–2.

Johnson, "Smart Technology Busting Out All Over Web", Jun 15, 1998, *Electronic Enginerring Times*, 1012 pp. 1–6.

Notess, "Internet Search Engine Update", Jul. 1, 1998, *Online*, vol. v22:n4, pp. 1–3.

Gallant, "Neural Network Learning and Expert Systems", 1994, *The MIT Press*, pp. 132–137.

Chan et al., "Multipath Propagation Effects on a CDMA Cellular System", 1994, *IEEE*, pp. 848–855.

Meadow, "Text Information Retrieval Systems", 1992, *Academic Press*, pp. 204–209.

Iwayama et al., "Cluster–Based Text Catagorization: A Comparison of Category Search Strategies", 1995, *ACM–SIGIR*, pp. 273–279.

Botafogo, "Cluster Analysis for Hypertext Systems", June. 1993, *ACM–SIRIG*, pp. 116–124.

Wang Baldonado et al., "SenseMaker: An Information–Exploration Interface Supporting the Contextual Evolution of a User s Interest", 1997, *ACM–CHI*, pp. 11–18.

Baldazo, "Navigating with a Web Compass: Quarterdeck Harnesses Leading–edge "Metasearch" Technology to Create a Smart Agent that Searches the Web and Organizes the Results", Mar. 1996, *Byte*, pp. 97–98.

Striglis et al., "A Multistage RAKE Receiver for Improved Capacity of CDMA Systems", 1994, IEEE Vehicular Technology Conference, pp. 1–5.

Weiss et al., "HyPursuite: A Hierarcical Network Search Engine that Exploits Content–Link Hypertext Clustering", 1996, *Hypertext*, pp. 180–193.

* cited by examiner

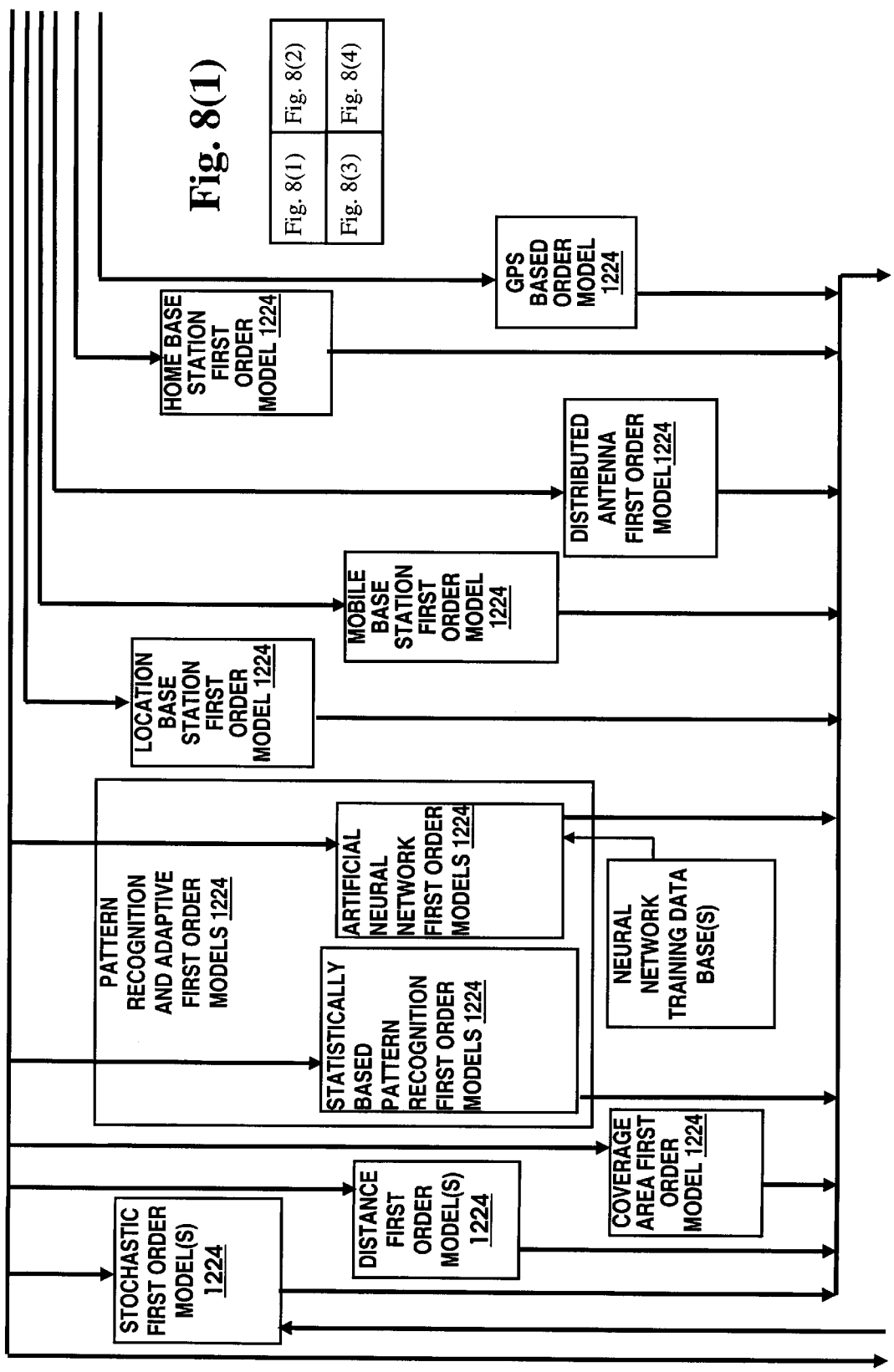

*FOM_ID*: First Order Model ID (providing this Location Hypothesis); note, since it is possible for location hypotheses to be generated by other than the FOM's, in general this field identifies the module that generated this location hypothesis.

*MS_ID*: The identification of the target MS to which this location hypothesis applies.

*pt_est*: The most likely location point estimate of the target MS

*valid_pt*: Boolean indicating the validity of "pt_est"

*area_est*: Location Area Estimate of the target MS provided by the FOM. This area estimate will be used whenever "image_area" below is NULL.

*valid_area*: Boolean indicating the validity of "area_est" (one of "pt_est" and "area_est" must be valid).

*adjust*: Boolean (true iff adjustments to the fields of this location hypothesis are to be performed in the Context Adjuster Module).

*pt_covering*: reference to a substantially minimal area (e.g., mesh cell) covering of "pt_est". Note, since this MS may be substantially on a cell boundary, this covering may in some cases include more than one cell.

*image_area*: reference to an area (e.g., mesh cell) covering of the image cluster set area for "pt_covering" (see detailed description of the function, "confidence_adjuster"). Note that if this field is not NULL, then this is the target MS location estimate used by the Location Center instead of "area_est".

FIG. 9A

*extrapolation_area*: reference to (if non-NULL) an extrapolated MS target estimate area provided by the Location Extrapolator submodule of the Hypothesis Analyzer. That is, this field, if non_NULL, is an extrapolation of the "image_area" field if it exists, otherwise this field is an extrapolation of the "area_est" field. Note other extrapolation fields may also be provided depending on the embodiment of the present invention, such as an extrapolation of the "pt_covering".

*confidence*: A real value in the range [-1.0, +1.0] indicating a likelihood that the target MS is in (or out) of a particular area. If positive: if "image_area" exists, then this is a measure of the likelihood that the target MS is within the area represented by "image_area," else if "image_area" has not been computed (e.g., "adjust" is FALSE), then "area_est" must be valid and this is a measure of the likelihood that the target MS is within the area represented by "area_est." If negative, then "area_est" must be valid and this is a measure of the likelihood that the target MS is NOT in the area represented by "area_est". If it is zero (near zero), then the likelihood is unknown.

*Original_Timestamp*: Date and time that the location signature cluster for this location hypothesis was received by the CDMA Filter Subsystem,

*Active_Timestamp*: Run-time field providing the time to which this location hypothesis has had its MS location estimate(s) extrapolated (in the Location Extrapolator of the Hypothesis Analyzer). Note that this field is initialized with the value from the "Original_Timestamp" field.

*Processing Tags and environmental categorizations*: For indicating particular types of environmental classifications not readily determined by the Original_Timestamp field (e.g., weather, traffic), and restrictions on location hypothesis processing.

*loc_sig_cluster:* Access to location signature signal characteristics provided to the First Order Models by the CDMA Filter Subsystem; i.e., access to the "loc sigs" (received at "timestamp" regarding the location of the target MS)

*descriptor*: Optional descriptor (from the First Order Model indicating why/how the Location Area Estimate and Confidence Value were determined).

FIG. 9B

FIG. 15: LOCATION PROVISIONING VIA MULTIPLE CMRS

Signal Processing Subsystem 1220

WIRELESS LOCATION USING MULTIPLE LOCATION ESTIMATORS

CROSS-REFERENCE TO RELATED APPLICATIONS

The present application is a continuation-in-part of co-pending U.S. application Ser. No. 09/194,367 filed Nov. 24, 1998 which is the National Stage of International Application No. PCT/US97/15892 filed Sep. 8, 1997 (and claims the benefit thereof); in turn, the above-identified International Application No. PCT/US97/15892 claims the benefit of the following three applications: U.S. Provisional Application No. 60/056,590 filed Aug. 20, 1997; U.S. Provisional Application No. 60/044,821 filed Apr. 25, 1997; and U.S. Provisional Application No. 60/025,855 filed Sep. 9, 1996. Additionally, the present patent application is a continuation-in-part of co-pending U.S. application Ser. No. 09/176,587, filed Oct. 21, 1998 which, in turn, claims the benefit of (a1) and (a2) following: (a1) the above-identified International Application No. PCT/US97/15892 and the corresponding National Stage filing U.S. application Ser. No. 09/194,367, and (a2) the U.S. Provisional Application No. 06/062,931 filed Oct. 21, 1997. Additionally, the present patent application is a continuation-in-part of co-pending U.S. application Ser. No. 09/230,109 filed Jan. 22, 1999 which is the National Stage of International Application No. PCT/US97/15933 filed Sep. 8, 1997 (and claims the benefit thereof) which, in turn, claims the benefit of the following three applications: U.S. Provisional Application No. 60/056,603 filed Aug. 20, 1997; U.S. Provisional Application No. 60/044,821 filed Apr. 25, 1997; and U.S. Provisional Application No. 60/025,855 filed Sep. 9, 1996. Additionally, the present patent application claims the benefit of Provisional Application No. 60/083,041 filed Apr. 23, 1998. All the above cited references are fully incorporated by reference herein.

FIELD OF THE INVENTION

The present invention is directed generally to a system and method for locating people or objects, and in particular, to a system and method for locating a wireless mobile station using a plurality of activated mobile station location estimators.

The present invention is directed generally to a system and method for locating people or objects, and in particular, to a system and method for locating a wireless mobile station using a plurality of mobile station location estimators. More generally, the present invention is directed to a computational system and method for calibrating the relative performance of multiple models, wherein each such model is capable of being activated for generating hypotheses (e.g., estimates and/or predictions) of an unknown condition such as the location of wireless mobile station. Additionally, the present invention is directed to a computational system and method for generating enhanced hypotheses of the unknown condition, wherein the model generated hypotheses are used as queries into an archive that associates: (a) historical model generated hypotheses, (b) model input data used in generating the model hypotheses, and (c) verified hypotheses to which the model input data is known to correspond.

BACKGROUND OF THE INVENTION

Introduction

Wireless communications systems are becoming increasingly important worldwide. Wireless cellular telecommunications systems are rapidly replacing conventional wire-based telecommunications systems in many applications. Cellular radio telephone networks ("CRT"), and specialized mobile radio and mobile data radio networks are examples. The general principles of wireless cellular telephony have been described variously, for example in U.S. Pat. No. 5,295,180 to Vendetti, et al, which is incorporated herein by reference.

There is great interest in using existing infrastructures for wireless communication systems for locating people and/or objects in a cost effective manner. Such a capability would be invaluable in a variety of situations, especially in emergency or crime situations. Due to the substantial benefits of such a location system, several attempts have been made to design and implement such a system.

Systems have been proposed that rely upon signal strength and trilateralization techniques to permit location include those disclosed in U.S. Pat. Nos. 4,818,998 and 4,908,629 to Apsell et al. ("the Apsell patents") and U.S. Pat. No. 4,891,650 to Sheffer ("the Sheffer patent"). However, these systems have drawbacks that include high expense in that special purpose electronics are required. Furthermore, the systems are generally only effective in line-of-sight conditions, such as rural settings. Radio wave surface reflections, refractions and ground clutter cause significant distortion, in determining the location of a signal source in most geographical areas that are more than sparsely populated. Moreover, these drawbacks are particularly exacerbated in dense urban canyon (city) areas, where errors and/or conflicts in location measurements can result in substantial inaccuracies.

Another example of a location system using time of arrival and triangulation for location are satellite-based systems, such as the military and commercial versions of the Global Positioning Satellite system ("GPS"). GPS can provide accurate position determination (i.e., about 100 meters error for the commercial version of GPS) from a time-based signal received simultaneously from at least three satellites. A ground-based GPS receiver at or near the object to be located determines the difference between the time at which each satellite transmits a time signal and the time at which the signal is received and, based on the time differentials, determines the object's location. However, the GPS is impractical in many applications. The signal power levels from the satellites are low and the GPS receiver requires a clear, line-of-sight path to at least three satellites above a horizon of about 60 degrees for effective operation. Accordingly, inclement weather conditions, such as clouds, terrain features, such as hills and trees, and buildings restrict the ability of the GPS receiver to determine its position. Furthermore, the initial GPS signal detection process for a GPS receiver is relatively long (i.e., several minutes) for determining the receiver's position. Such delays are unacceptable in many applications such as, for example, emergency response and vehicle tracking.

Summary of Factors Affecting RF Propagation

The physical radio propagation channel perturbs signal strength, frequency (causing rate changes, phase delay, signal to noise ratios (e.g., C/I for the analog case, or $E_{b/No}$, RF energy per bit, over average noise density ratio for the digital case) and Doppler-shift. Signal strength is usually characterized by:

Free Space Path Loss ($L_p$)
Slow fading loss or margin ($L_{slow}$)
Fast fading loss or margin ($L_{fast}$)
Loss due to slow fading includes shadowing due to clutter blockage (sometimes included in Lp). Fast fading is composed of multipath reflections which cause: 1) delay spread; 2) random phase shift or Rayleigh fading, and 3) random frequency modulation due to different Doppler shifts on different paths.

Summing the path loss and the two fading margin loss components from the above yields a total path loss of:

$$L_{total} = L_p + L_{slow} + L_{fast}$$

Referring to FIG. 3, the figure illustrates key components of a typical cellular and PCS power budget design process. The cell designer increases the transmitted power $P_{TX}$ by the shadow fading margin $L_{slow}$ which is usually chosen to be within the 1–2 percentile of the slow fading probability density function (PDF) to minimize the probability of unsatisfactorily low received power level $P_{RX}$ at the receiver. The $P_{RX}$ level must have enough signal to noise energy level (e.g., 10 dB) to overcome the receiver's internal noise level (e.g., −118 dBm in the case of cellular 0.9 GHz), for a minimum voice quality standard Thus in the example $P_{RX}$ must never be below −108 dBm, in order to maintain the quality standard.

Additionally the short term fast signal fading due to multipath propagation is taken into account by deploying fast fading margin $L_{fast}$, which is typically also chosen to be a few percentiles of the fast fading distribution. The 1 to 2 percentiles compliment other network blockage guidelines. For example the cell base station traffic loading capacity and network transport facilities are usually designed for a 1–2 percentile blockage factor as well. However, in the worst-case scenario both fading margins are simultaneously exceeded, thus causing a fading margin overload.

SUMMARY DISCUSSION

The present invention relates to a method and system for performing wireless mobile station location. In particular, the present invention is a wireless mobile station location computing method and system that utilizes multiple wireless location computational estimators (these estimators also denoted herein as MS location hypothesizing computational models, "first order models" and/or "location estimating models"), for providing a plurality of location estimates of a target mobile station, wherein ambiguities and/or conflicts between the location estimates may be effectively and straightforwardly resolved. More particularly, the present invention provides a technique for calibrating the performance of each of the location estimators so that a confidence value (e.g., a probability) can be assigned to each generated location estimate. Additionally, the present invention provides a straightforward technique for using the confidence values (probabilities) for deriving a resulting most likely location estimate of a target wireless mobile station.

More generally, the present invention relates to a novel computational method and architecture for synergistically combining the results of a plurality of computational models in a straightforward way that allows the models to be calibrated relative to one another so that differences in results generated by the models can be readily resolved. Accordingly, the computational method and architecture of the present invention may be applied to wide range applications where synergies between multiple models is expected to be enhance performance.

For a particular application having a plurality of computational models (each generating a hypothetical estimate of a desired result(s) in a space of hypothesis results), the present invention may be described, at a high level, as any method or system that performs the following steps:

(4.1.1) A step of determining a classification scheme for determining an input class for each input data set supplied to the plurality of computational models (FOMs), wherein for each range, R, of a plurality of ranges of desired results in the hypothesis space, there is an input class, and the input data sets of this input class are expected to have their corresponding desired result(s) in the range R. Some examples will be illustrative. For a wireless location system, the present step determines geographical subareas of a wireless network coverage area that have "similar" wireless signal characteristics. Such subareas may be relatively easy to determine, and there may be no constraint on the size of the subareas. The intention is to determine: (a) such a subarea as only a general area where a target MS must reside, and (b) the subarea should be relatively homogeneous in its wireless signaling characteristics. Accordingly, (a) and (b) are believed to be substantially satisfied by grouping together into the same input class the wireless signal data sets (i.e., input data sets) from corresponding target MS locations wherein at each of the target MS locations: (i) the set of base stations detected by the target MS (at the location) is substantially the same, and/or (b) the set of base stations detecting the target MS is substantially the same set of base stations.

Note that there are numerous techniques and commercial packages for determining such a classification scheme. In particular, the statistically based system, "CART" (acronym for Classification and Regression Trees) by ANGOSS Software International Limited of Toronto, Canada is one such package. Further, note that this step is intended to provide reliable but not necessarily highly accurate ranges R for the desired results. Also note that in some applications there may be only a single input class, thus assuring high reliability (albeit, likely low accuracy). Accordingly, in this latter case the present step may be omitted.

(4.1.2) A step of calibrating each of the plurality of computational models (FOMs) so that each subsequent hypothesis generated by one of the models has a confidence value (e.g., probability) associated therewith that is indicative of the likeliness of the hypothesis being correct. The calibrating of this step is performed using the input classification scheme determined in the above step (4.1.1). In one embodiment of this step, each model is supplied with inputs from a given fixed input class, wherein each of these inputs have corresponding known results that constitute a correct hypothesis (i.e., a desired result). Subsequently, the performance of each model is determined for the input class and a confidence value is assigned to the model for inputs received from the input class. Note that this procedure is repeated with each input class available from the input classification scheme. In performing this procedure, an application domain specific criteria is used to determine whether the hypotheses generated by the models identify the desired results in the hypothesis space. Accordingly, for each of the models, when supplied with an input data set from a fixed input class, the hypothesis generated by the model will be given the confidence value determined for this input class as an indication of the likelihood of the generated hypothesis being correct (i.e., the desired result). Note that the confidence value for each generated hypothesis may be computed as a probability that the hypothesis is correct.

Note that for a wireless location application, the criteria (m one embodiment) is whether a location hypothesis contains the actual location where the MS was when the corresponding input data set (wireless signal measurements) were communicated between this MS and the wireless network.

For applications related to the diagnosis of electronic systems, this criteria may be whether an hypothesis identifies a proper functional unit such as a circuit board or chip.

For economic forecasting applications, this criteria may be whether an hypothesis is within a particular range of the correct hypothesis. For example, if an application according to the present invention predicts the U.S. gross national product (GNP) six months into the future according to certain inputs (defining input data sets), then hypotheses generated from historical data that has associated therewith the actual corresponding GNP (six months later), may be used for calibrating each of the plurality of economic forecasting models (FOMs). Thus, the application specific criteria for this case may be that a generated hypothesis is within, say, 10% of the actual corresponding six month GNP prediction.

Note that the applications described herein are illustrative, but not comprehensive of the scope of the present invention. Further note that this step typically is performed at least once prior to inputting input data sets whose resulting hypotheses are to be used to determine the desired or correct results. Additionally, once an initial calibration has been performed, this step may also be performed: (a) intermittently between the generation of hyptheses, and/or (b) substantially continuously and in parallel with the generation of hypotheses by the models.

(4.1.3) A step of providing one or more input data sets to the models MOMs) for generating a plurality of hypotheses, wherein the result(s) desired to be hypothesized are unknown. Moreover, note that the generated hypotheses are preferred to have a same data structure definition.

For example, for a wireless location system, the present step provides an input data set including the composite signal characteristic values to one or more MS location hypothesizing computational models, wherein each such model subsequently determines one or more initial estimates (also denoted location hypotheses) of the location of the target MS. Note that one or more of these model may be based on, for example, the signal processing techniques 2.1 through 2.3 above.

(4.1.4) A step of adjusting or modifying the generated hypotheses output by the models, wherein for such an hypothesis, adjustments may be performed on one or both of its hypothesized result H.R, and its confidence value for further enhancing the performance of the present invention. In one embodiment of this step, H.R is used as an index to retrieve other results from an archival database, wherein this database associates hypothesized results with their corresponding desired or correct results. Thus, H.R may be used to identify data from other archived hypothesized results that are "nearby" to H.R, and subsequently use the nearby data to retrieve the corresponding desired results. Thus, the set of retrieved desired results may be used to define a new "adjusted" hypothesis.

For example, for a wireless location system utilizing the present invention, each location hypothesis, H, identifies an area for a target MS, and H can used to identify additional related locations included in archived hypotheses generated by the same FOM as generated H. For instance, such related locations may be the area centroids of the archived hypotheses, wherein these centroids reside within the area hypothesized by H. Accordingly, such centroids may be used to retrieve the corresponding actual verified MS locations (i.e., the corresponding desired results), and these retrieved verified locations may be used to generate a new adjusted area that is likely to be more accurate than H. In particular, a convex hull of the verified locations may be used as a basis for determining a new location hypothesis of the target MS.

For other application domains, the present step requires a first technique to determine both "nearby" archived data from previously archived hypotheses, and a second technique to determine an "adjusted" hypothesis from the retrieved desired results. In general, such techniques can be relatively straightforward to provide when the hypothesized results reside in a vector space, and more particularly, in a Cartesian product of the real numbers. Accordingly, there are numerous applications that can be configured to generate hypothesized results in a vector space (or Cartesian product of the real numbers). For instance, economic financial forecasting applications typically result in numeric predictions where the first and second techniques can be, e.g., substantially identical to the centroid and convex hull techniques for the wireless location application.; and (4.1.5) A step of subsequently computing a "most likely" target MS location estimate is computed. for outputting to a location requesting application such as 911 emergency, the fire or police departments, taxi services, etc. Note that in computing the most likely target MS location estimate a plurality of location hypotheses may be taken into account. In fact, it is an important aspect of the present invention that the most likely MS location estimate is determined by computationally forming a composite MS location estimate utilizing such a plurality of location hypotheses so that, for example, location estimate similarities between location hypotheses can be effectively utilized.

Referring to (4.1.3) there may be hypotheses for estimating not only desired result(s), but also hypotheses may be generated that indicate where the desired result(s) is not. Thus, if the confidence values are probabilities, an hypothesis may be generated that has a very low (near zero) probability of having the desired result. As an aside, note that in general, for each generated hypothesis, H, having a probability, P, there is a dual hypothesis $H^c$ that may be generated, wherein the $H^c$ represents the complementary hypothesis that the desired result is in the space of hypothesized results outside of H. Thus, the probability that the desired result(s) is outside of the result hypothesized by H is 1-P. Accordingly, with each location hypothesis having a probability favorably indicating where a desired result may be (i.e., P>=0.5), there is a corresponding probability for the complement hypothesis that indicates where the desired result(s) is unlikely to be. Thus, applying this reasoning to a wireless location application utilizing the present invention, then for an hypothesis H indicating that the target MS is in a geographical area A, there is a dual location estimate $H^c$ that may be generated, wherein the $H^c$ represents the area outside of A and the probability that the target MS is outside of A is 1-P. Thus, with each location hypothesis having a probability favorably indicating where a target MS may be (i.e., P>=0.5), there is a corresponding probability for the complement area not represented by the location hypothesis that does not favor the target MS being in this complement area. Further, note that similar dual hypotheses can be used in other applications using the multiple model architecture of the present invention when probabilities are assigned to hypotheses generated by the models of the application.

Referring to (4.1.4) as it relates to a wireless location system provided by the present invention, note that, it is an aspect of the present invention to provide location hypothesis enhancing and evaluation techniques that can adjust target MS location estimates according to historical MS location data and/or adjust the confidence values of location hypotheses according to how consistent the corresponding target MS location estimate is: (a) with historical MS signal characteristic values, (b) with various physical constraints, and (c) with various heuristics. In particular, the following capabilities are provided by the present invention:

(5.1) a capability for enhancing the accuracy of an initial location hypothesis, H, generated by a first order model, FOMH, by using H as, essentially, a query or index into an historical data base (denoted herein as the location signature data base), wherein this data base includes: (a) a plurality of previously obtained location signature clusters (i.e., composite wireless signal characteristic values) such that for each such cluster there is an associated actual or verified MS locations where an MS communicated with the base station infrastructure for locating the MS, and (b) previous MS location hypothesis estimates from $FOM_H$ derived from each of the location signature clusters stored according to (a);

(5.2) a capability for analyzing composite signal characteristic values of wireless communications between the target MS and the base station infrastructure, wherein such values are compared with composite signal characteristics values of known MS locations (these latter values being archived in the location signature data base). In one instance, the composite signal characteristic values used to generate various location hypotheses for the target MS are compared against wireless signal data of known MS locations stored in the location signature data base for determining the reliability of the location hypothesizing models for particular geographic areas and/or environmental conditions;

(5.3) a capability for reasoning about the likeliness of a location hypothesis wherein this reasoning capability uses heuristics and constraints based on physics and physical properties of the location geography;

(5.4) an hypothesis generating capability for generating new location hypotheses from previous hypotheses.

As also mentioned above in (2.3), the present invention may utilize adaptive signal processing techniques. One particularly important utilization of such techniques includes the automatic tuning of the present invention so that, e.g., such tuning can be applied to adjusting the values of location processing system parameters that affect the processing performed by the present invention. For example, such system parameters as those used for determining the size of a geographical area to be specified when retrieving location signal data of known MS locations from the historical (location signature) data base can substantially affect the location processing. In particular, a system parameter specifying a minimum size for such a geographical area may, if too large, cause unnecessary inaccuracies in locating an MS. Accordingly, to accomplish a tuning of such system parameters, an adaptation engine is included in the present invention for automatically adjusting or tuning parameters used by the present invention. Note that in one embodiment, the adaptation engine is based on genetic algorithm techniques.

A novel aspect of the present invention relies on the discovery that in many areas where MS location services are desired, the wireless signal measurements obtained from communications between the target MS and the base station infrastructure are extensive enough to provide sufficiently unique or peculiar values so that the pattern of values alone may identify the location of the target MS. Further, assuming a sufficient amount of such location identifying pattern information is captured in the composite wireless signal characteristic values for a target MS, and that there is a technique for matching such wireless signal patterns to geographical locations, then a FOM based on this technique may generate a reasonably accurate target MS location estimate. Moreover, if the present invention (e.g., the location signature data base) has captured sufficient wireless signal data from location communications between MSs and the base station infrastructure where the locations of the MSs are also verified and captured, then this captured data (e.g., location signatures) can be used to train or calibrate such models to associate the location of a target MS with the distinctive signal characteristics between the target MS and one or more base stations. Accordingly, the present invention includes one or more FOMs that may be generally denoted as classification models wherein such FOMs are trained or calibrated to associate particular composite wireless signal characteristic values with a geographical location where a target MS could likely generate the wireless signal samples from which the composite wireless signal characteristic values are derived. Further, the present invention includes the capability for tracing and retraining such classification FOMs to automatically maintain the accuracy of these models even though substantial changes to the radio coverage area may occur, such as the construction of a new high rise building or seasonal variations (due to, for example, foliage variations). As used herein, "training" refers to iteratively presenting "training data" to a computational module for changing the behavior of the module so that the module may perform progressively better as it learns appropriate behavioral responses to the training data. Accordingly, training may include, for example, the repeated input of training data to an artificial neural network, or repeated statistical regression analyses on different and/or enhanced training data (e.g., statistical sample data sets).

Note that such classification FOMs that are trained to identify target MS locations by the wireless signal patterns produced constitute a particularly novel aspect of the present invention. It is well known in the wireless telephony art that the phenomenon of signal multipath and shadow fading renders most analytical location computational techniques such as time-of-arrival (TOA) or time-difference-of-arrival (TDOA) substantially useless in urban areas and particularly in dense urban areas without further statistical correlation processing such as such super resolution as disclosed in U.S. Pat. No. 5,890,068 by Fattouche et. al. issued on Mar. 30, 1999 and incorporated herein by reference. Moreover, it may be the case that even though such additional processing is performed, the multipath phenomenon may still be problematic. However, this same multipath phenomenon also may produce substantially distinct or peculiar signal measurement patterns, wherein such a pattern coincides with a relatively small geographical area. Thus, the present invention utilizes multipath as an advantage for increasing accuracy where for previous location systems multipath has been a source of substantial inaccuracies. Moreover, it is worthwhile to note that the utilization of classification FOMs in high multipath environments is especially advantageous in that high multipath environments are typically densely populated. Thus, since such environments are also capable of yielding a greater density of MS location signal data from MSs whose actual locations can be obtained, there can be a substantial amount of training or calibration data captured by the present invention for tracing or calibrating such classification FOMs and for progressively improving the MS location accuracy of such models.

Moreover, it is also an aspect of the present invention that classification FOMs may be utilized that determine target MS locations by correlating and/or associating network anomalous behavior with geographic locations where such behavior occurs. That is, network behaviors that are problematic for voice and/or data communication may be used advantageously for locating a target MS. For example, it is well known that wireless networks typically have within their coverage areas persistent subareas where voice quality is problematic due to, e.g., measurements related to high total errors, a high error rate, or change in error rate. In particular, such measurements may be related to frame error rates, redundancy errors, co-channel interference, excessive handoffs between base stations, and/or other call quality measurements. Additionally, measurements may be used that are related to subareas where wireless communication between the network and a target MS is not sufficient to maintain a call (i.e., "deadzones"). Thus, information about such so called problematic behaviors may used by, e.g., a location estimator (FOM) to generate a more accurate estimate of a target MS. For example, such network behavioral measurements may be provided for training an artificial neural network and/or for providing to a statistical regression analysis technique and/or statistical prediction models (e.g., using principle decomposition, partial least squares, or other regression techniques for associating or correlating such measurements with the geographic area for which they likely derive. Moreover, note that such network behavioral measurements can also be used to reduce the likelihood of a target MS being in an area if such measurements are not what would be expected for the area.

It is also a related aspect of the present invention to include a plurality of stationary, low cost, low power "location detection base stations" (LBS), each such LBS having both restricted range MS detection capabilities, and a built-in MS. Accordingly, a grid of such LBSs can be utilized for providing wireless signaling characteristic data (from their built-in MSs) for: (a) (re)training such classification FOMs, and (b) calibrating the FOMs so that each generated location hypothesis has a reliable confidence value (probability) indicative of the likeliness of the target MS being in an area represented by the location hypothesis.

It is a further aspect of the present invention that the personal communication system (PCS) infrastructures currently being developed by telecommunication providers offer an appropriate localized infrastructure base upon which to build various personal location systems (PLS) employing the present invention and/or utilizing the techniques disclosed herein. In particular, the present invention is especially suitable for the location of people and/or objects using code division multiple access (CDMA) wireless infrastructures, although other wireless infrastructures, such as, time division multiple access (TDMA) infrastructures and GSM are also contemplated. Note that CDMA personal communications systems are described in the Telephone Industries Association standard IS-95, for frequencies below 1 GHz, and in the Wideband Spread-Spectrum Digital Cellular System Dual-Mode Mobile Station-Base Station Compatibility Standard, for frequencies in the 1.8–1.9 GHz frequency bands, both of which are incorporated herein by reference. Furthermore, CDMA general principles have also been described, for example, in U.S. Pat. No. 5,109,390, to Gilhausen, et al, and CDMA Network Engineering Handbook by Qualcomm, Inc., each of which is also incorporated herein by reference.

As mentioned in (1.7) and in the discussion of classification FOMs above, embodiments of the present invention can substantially automatically retrain itself to compensate for variations in wireless signal characteristics (e.g., multipath) due to environmental and/or topographic changes to a geographic area serviced by the present invention. For example, in one embodiment, the present invention optionally includes low cost, low power base stations, denoted location base stations (LBS) above, providing, for example, CDMA pilot channels to a very limited area about each such LBS. The location base stations may provide limited voice traffic capabilities, but each is capable of gathering sufficient wireless signal characteristics from an MS within the location base station's range to facilitate locating the MS. Thus, by positioning the location base stations at known locations in a geographic region such as, for instance, on street lamp poles and road signs, additional MS location accuracy can be obtained. That is, due to the low power signal output by such location base stations, for there to be signaling control communication (e.g., pilot signaling and other control signals) between a location base station and a target MS, the MS must be relatively near the location base station. Additionally, for each location base station not in communication with the target MS, it is likely that the MS is not near to this location base station. Thus, by utilizing information received from both location base stations in communication with the target MS and those that are not in communication with the target MS, the present invention may substantially narrow the possible geographic areas within which the target MS is likely to be. Further, by providing each location base station (LBS) with a co-located stationary wireless transceiver (denoted a built-in MS above) having similar functionality to an MS, the following advantages are provided:

(6.1) assuming that the co-located base station capabilities and the stationary transceiver of an LBS are such that the base station capabilities and the stationary transceiver communicate with one another, the stationary transceiver can be signaled by another component(s) of the present invention to activate or deactivate its associated base station capability, thereby conserving power for the LBS that operate on a restricted power such as solar electrical power;

(6.2) the stationary transceiver of an LBS can be used for transferring target MS location information obtained by the LBS to a conventional telephony base station;

(6.3) since the location of each LBS is known and can be used in location processing, the present invention is able to (re)train itself in geographical areas having such LBSs. That is, by activating each LBS stationary transceiver so that there is signal communication between the stationary transceiver and surrounding base stations within range, wireless signal characteristic values for the location of the stationary transceiver are obtained for each such base station. Accordingly, such characteristic values can then be associated with the known location of the stationary transceiver for training various of the location processing modules of the present invention such as the classification FOMs discussed above. In particular, such training and/or calibrating may include:

(i) (re)training FOMs;

(ii) adjusting the confidence value initially assigned to a location hypothesis according to how accurate the generating FOM is in estimating the location of the stationary transceiver using data obtained from wireless signal characteristics of signals between the stationary transceiver and base stations with which the stationary transceiver is capable of communicating;

(iii) automatically updating the previously mentioned historical data base (i.e., the location signature data base), wherein the stored signal characteristic data for each stationary transceiver can be used for detecting environmental and/or topographical changes (e.g., a newly built high rise or other structures capable of altering the multipath characteristics of a given geographical area); and (iv) tuning of the location system parameters, wherein the steps of: (a) modifying various system parameters and (b) testing the performance of the modified location system on verified mobile station location data (including the stationary transceiver signal characteristic data), these steps being interleaved and repeatedly performed for obtaining better system location accuracy within useful time constraints.

One embodiment of the present invention utilizes a mobile (location) base station (MBS) that can be, for example, incorporated into a vehicle, such as an ambulance, police car, or taxi. Such a vehicle can travel to sites having a transmitting target MS, wherein such sites may be randomly located and the signal characteristic data from the transmitting target MS at such a location can consequently be archived with a verified location measurement performed at the site by the mobile location base station. Moreover, it is important to note that such a mobile location base station as its name implies also includes base station electronics for communicating with mobile stations, though not necessarily in the manner of a conventional infrastructure base station. In particular, a mobile location base station may only monitor signal characteristics, such as MS signal strength, from a target MS without transmitting signals to the target MS. Alternatively, a mobile location base station can periodically be in bi-directional communication with a target MS for determining a signal time-of-arrival (or time-difference-of-arrival) measurement between the mobile location base station and the target MS. Additionally, each such mobile location base station includes components for estimating the location of the mobile location base station, such mobile location base station location estimates being important when the mobile location base station is used for locating a target MS via, for example, time-of-arrival or time-difference-of-arrival measurements as one skilled in the art will appreciate. In particular, a mobile location base station can include:

(7.1) a mobile station (MS) for both communicating with other components of the present invention (such as a location processing center included in the present invention);

(7.2) a GPS receiver for determining a location of the mobile location base station;

(7.3) a gyroscope and other dead reckoning devices; and (7.4) devices for operator manual entry of a mobile location base station location.

Furthermore, a mobile location base station includes modules for integrating or reconciling distinct mobile location base station location estimates that, for example, can be obtained using the components and devices of (7.1) through (7.4) above. That is, location estimates for the mobile location base station may be obtained from: GPS satellite data, mobile location base station data provided by the location processing center, dead reckoning data obtained from the mobile location base station vehicle dead reckoning devices, and location data manually input by an operator of the mobile location base station.

The location estimating system of the present invention offers many advantages over existing location systems. The system of the present invention, for example, is readily adaptable to existing wireless communication systems and can accurately locate people and/or objects in a cost effective manner. The present invention employs a number of distinctly different location estimators which provide a greater degree of accuracy and reliability than is possible with existing wireless location systems. For instance, the location models provided may include not only the radius-radius/TOA and TDOA techniques but also adaptive artificial neural net techniques.

Further, the present invention is able to adapt to the topography of an area in which location service is desired. The present invention is also able to adapt to environmental changes substantially as frequently as desired. Thus, the present invention is able to take into account changes in the location topography over time without extensive manual data manipulation. Moreover, the present invention can be utilized with varying amounts of signal measurement inputs. Thus, if a location estimate is desired in a very short time interval (e.g., less than approximately one to two seconds), then the present location estimating system can be used with only as much signal measurement data as is possible to acquire during an initial portion of this time interval. Subsequently, after a greater amount of signal measurement data has been acquired, additional more accurate location estimates may be obtained. Note that this capability can be useful in the context of 911 emergency response in that a first quick coarse wireless mobile station location estimate can be used to route a 911 call from the mobile station to a 911 emergency response center that has responsibility for the area containing the mobile station and the 911 caller. Subsequently, once the 911 call has been routed according to this first quick location estimate, by continuing to receive additional wireless signal measurements, more reliable and accurate location estimates of the mobile station can be obtained.

Moreover, there are numerous additional advantages of the system of the present invention when applied in CDMA communication systems. The location system of the present invention readily benefits from the distinct advantages of the CDMA spread spectrum scheme. Namely, these advantages include the exploitation of radio frequency spectral efficiency and isolation by (a) monitoring voice activity, (b) management of two-way power control, (c) provisioning of advanced variable-rate modems and error correcting signal encoding, (d) inherent resistance to fading, (e) enhanced privacy, and (f) multiple "rake" digital data receivers and searcher receivers for correlation of signal multipaths.

At a more general level, it is an aspect of the present invention to demonstrate the utilization of various novel computational paradigms such as:

(8.1) providing a multiple hypothesis computational architecture (as illustrated best in FIG. 8) wherein the hypotheses may be:

(8.1.1) generated by modular independent hypothesizing computational models (FOMs), wherein the FOMs have been calibrated to thereby output confidence values (probabilities) related to the likelihood of correspondingly generated hypotheses being correct;

(8.1.2) the FOMs are embedded in the computational architecture in a manner wherein the architecture allows for substantial amounts of application specific processing common or generic to a plurality of the models to be straightforwardly incorporated into the computational architecture;

(8.1.3) the computational architecture enhances the hypotheses generated by the models both according to past performance of the models and according to application specific constraints and heuristics without requiring complex feedback loops for recalibrating one or more of the FOMs;

(8.1.4) the FOMs are relatively easily integrated into, modified and extracted from the computational architecture;

(8.2) providing a computational paradigm for enhancing an initial estimated solution to a problem by using this initial estimated solution as, effectively, a query or index into an historical data base of previous solution estimates and corresponding actual solutions for deriving an enhanced solution estimate based on past performance of the module that generated the initial estimated solution.

Further, note that the present multiple model (FOM) architecture provides additional advantages in that large software systems may be developed more easily. For example, if for a given application (e.g., wireless location, or another application such as those listed hereinbelow), there are a plurality of computational models that may be used, but each model in and of itself is less than completely satisfactory, then by integrating two or more such models into the architecture of the present invention, at least the following advantages are provided:

(a) the models themselves may be integrated into the desired application embodiment as substantially a "black box" thus reducing the development effort;

(b) the models may be easily added and deleted as appropriate. Thus, if an enhanced version of a model and/or an entirely new model becomes available, these models can be straightforwardly incorporated into the application;

(c) a generic embodiment of the architecture of the present invention may be provided wherein, e.g., messages (having a common structure regardless of the application) passed between various components of an architecture embodiment, an application development system can be provided that is based on the architecture of the present invention which may be used in a number of different technical fields (d) the models may be activated in parallel on different computational devices. Thus, the architecture of the present invention lends itself to parallel computing.

Thus, the multiple hypothesis architecture provided herein is useful in implementing solutions in a wide range of applications. In fact, most of the Detailed Description hereinbelow can be immediately translated into other application areas, as one skilled in the art of computer application architectures will come to appreciate. For example, the following additional applications are within the scope of the present invention:

(9.1) document scanning applications for transforming physical documents in to electronic forms of the documents. Note that in many cases the scanning of certain documents (books, publications, etc.) may have a 20% character recognition error rate. Thus, the novel computation architecture of the present invention can be utilized by (i) providing a plurality of document scanning models as the first order models, (ii) building a character recognition data base for archiving a correspondence between characteristics of actual printed character variations and the intended characters (according to, for example, font types), and additionally archiving a correspondence of performance of each of the models on previously encountered actual printed character variations (note, this is analogous to the Signature Data Base of the MS location application described herein), and (iii) determining any generic constraints and/or heuristics that are desirable to be satisfied by a plurality of the models. Accordingly, by comparing outputs from the first order document scanning models, a determination can be made as to whether further processing is desirable due to, for example, discrepancies between the output of the models. If further processing is desirable, then an embodiment of the multiple hypothesis architecture provided herein may be utilized to correct such discrepancies. Note that in comparing outputs from the first order document scanning models, these outputs may be compared at various granularities; e.g., character, sentence, paragraph or page;

(9.2) diagnosis and monitoring applications such as medical diagnosis/monitoring, communication network diagnosis/monitoring. Note that in many cases, the domain wherein a diagnosis is to be performed has a canonical hierarchical order among the components within the domain. For example, in automobile diagnosis, the components of an auto may be hierarchically ordered according to ease of replacement in combination within function. Thus, within an auto's electrical system (function), there may be a fuse box, and within the fuse box there will be fuses. Thus, these components may be ordered as follows (highest to lowest): auto, electrical system, fuse box, fuses. Thus, if different diagnostic FOMs provided different hypotheses as to a problem with an auto, the confidence values for each component and its subcomponents maybe summed together to provide a likelihood value that the problem within the component. Accordingly, the lowest component having, for example, at least a minimum threshold of summed confidences can be selected as the most likely component for either further analysis and/or replacement. Note that such summed confidences may be normalized by dividing by the number of hypotheses generated from the same input so that the highest summed confidence is one and the lowest is zero. Further note that this example is merely representative of a number of different diagnosis and/or prediction applications to which the present invention is applicable, wherein there are components that have canonical hierarchical decompositions. For example, a technique similar to the auto illustration above may be provided for the diagnosis of computer systems, networks (LANs, WANs, Internet and telephony networks), medical diagnosis from, e g., x-rays, MRIs, sonograms, etc;

(9.3) robotics applications such as scene and/or object recognition That is, various FOMs may process visual image input differently, and it may be that for expediency, an object is recognized if the summed confidence values for the object being recognized is above a certain threshold;

(9.4) seismic and/or geologic signal processing applications such as for locating oil and gas deposits;

(9.5) recognition of terrestrial and/or airborne objects from satellites, wherein there may be various spectral bands monitored.

(9.6) Additionally, note that this architecture need not have all modules co-located. In particular, it is an additional aspect of the present invention that various modules can be remotely located from one another and communicate with one another via telecommunication transmissions such as telephony technologies and/or the Internet. Accordingly, the present invention is particularly adaptable to such distributed computing environments. For example, some number of the first order models may reside in remote locations and communicate their generated hypotheses via the Internet.

For instance, in weather prediction applications it is not uncommon for computational models to require large amounts of computational resources. Thus, such models running at various remote computational facilities can transfer weather prediction hypotheses (e.g., the likely path of a hurricane) to a site that performs hypothesis adjustments according to: (i) past performance of the each model; (ii) particular constraints and/or heuristics, and subsequently outputs a most likely estimate for a particular weather condition.

In an alternative embodiment of the present invention, the processing following the generation of location hypotheses (each having an initial location estimate) by the first order models may be such that this processing can be provided on Internet user nodes and the first order models may reside at Internet server sites. In this configuration, an Internet user may request hypotheses from such remote first order models and perform the remaining processing at his/her node.

In other embodiments of the present invention, a fast, albeit less accurate location estimate may be initially performed for very time critical location applications where approximate location information may be required. For example, less than 1 second response for a mobile station location embodiment of the present invention may be desired for 911 emergency response location requests. Subsequently, once a relatively coarse location estimate has been provided, a more accurate most likely location estimate can be performed by repeating the location estimation processing a second time with, e.g., additional with measurements of wireless signals transmitted between a mobile station to be located and a network of base stations with which the mobile station is communicating, thus providing a second, more accurate location estimate of the mobile station.

Additionally, note that it is within the scope of the present invention to provide one or more central location development sites that may be networked to, for example, geographically dispersed location centers providing location services according to the present invention, wherein the FOMs may be accessed, substituted, enhanced or removed dynamically via network connections (via, e.g., the Internet) with a central location development site. Thus, a small but rapidly growing municipality in substantially flat low density area might initially be provided with access to, for example, two or three FOMs for generating location hypotheses in the municipality's relatively uncluttered radio signaling environment. However, as the population density increases and the radio signaling environment becomes cluttered by, for example, thermal noise and multipath, additional or alternative FOMs may be transferred via the network to the location center for the municipality.

Note that in some embodiments of the present invention, since there is a lack of sequencing between the FOMs and subsequent processing of location hypotheses, the FOMs can be incorporated into an expert system, if desired. For example, each FOM may be activated from an antecedent of an expert system rule. Thus, the antecedent for such a rule can evaluate to TRUE if the FOM outputs a location hypothesis, and the consequent portion of such a rule may put the output location hypothesis on a list of location hypotheses occurring in a particular time window for subsequent processing by the location center. Alternatively, activation of the FOMs may be in the consequents of such expert system rules. That is, the antecedent of such an expert system rule may determine if the conditions are appropriate for invoking the FOM(s) in the rule's consequent.

The present invention may also be configured as a blackboard system with intelligent agents (FOMs). In this embodiment, each of the intelligent agents is calibrated using archived data so that for each of the input data sets provided either directly to the intelligent agents or to the blackboard, each hypothesis generated and placed on the blackboard by the intelligent agents has a corresponding confidence value indicative of an expected validity of the hypothesis.

Of course, other software architectures may also to used in implementing the processing of the location center without departing from scope of the present invention. In particular, object-oriented architectures are also within the scope of the present invention. For example, the FOMs may be object methods on an MS location estimator object, wherein the estimator object receives substantially all target MS location signal data output by the signal filtering subsystem. Alternatively, software bus architectures are contemplated by the present invention, as one skilled in the art will understand, wherein the software architecture may be modular and facilitate parallel processing.

Further features and advantages of the present invention are provided by the figures and detailed description accompanying this invention summary.

BRIEF DESCRIPTION OF THE DRAWINGS

FIGS. 9A and 9B are a high level data structure diagram describing the fields of a location hypothesis object generated by the first order models 1224 of the location center.

DETAILED DESCRIPTION

Detailed Description Introduction

Various digital wireless communication standards have been introduced such as Advanced Mobile Phone Service (AMPS), Narrowband Advanced Mobile Phone Service (NAMPS), code division multiple access (CDMA) and Time Division Multiple Access (TDMA) (e.g., Global Systems Mobile (GSM). These standards provide numerous enhancements for advancing the quality and communication capacity for wireless applications. Referring to CDMA, this standard is described in the Telephone Industries Association standard IS-95, for frequencies below 1 GHz, and in J-STD-008, the Wideband Spread-Spectrum Digital Cellular System Dual-Mode Mobile Station-Base station Compatibility Standard, for frequencies in the 1.8–1.9 GHz frequency bands. Additionally, CDMA general principles have been described, for example, in U.S. Pat. No. 5,109,390, "Diversity Receiver in a CDMA Cellular Telephone System" by Gilhousen. There are numerous advantages of such digital wireless technologies such as CDMA radio technology. For example, the CDMA spread spectrum scheme exploits radio frequency spectral efficiency and isolation by monitoring voice activity, managing two-way power control, provisioning of advanced variable-rate modems and error correcting signal design. Moreover, CDMA digital wireless technologies have: (a) an inherent resistance to fading, (b) an enhanced privacy capability, and (c) provide for multiple "rake" digital data receivers and searcher receivers for both correlating multiple physical propagation paths, and reassembling signals according to a maximum likelihood detection Additionally, such wireless technologies provide support for multiple base station communication with a mobile station, i.e., soft or softer hand-off capability.

When performing wireless location as described herein, substantial improvements in radio location can be achieved since CDMA and other advanced radio communication infrastructures can be used for enhancing radio location. For example, the capabilities of IS-41 and advanced intelligent network (AIN) already provide a coarse-granularity of wireless location, as is necessary to, for example, properly direct a terminating call to an MS. Such information, originally intended for call processing usage, can be re-used in conjunction with the wireless location processing described herein to provide wireless location in the large (i.e., to determine which country, state and city a particular MS is located), and wireless location in the small (i.e., which location, plus or minus a few hundred feet a given MS is located).

Figure 4:
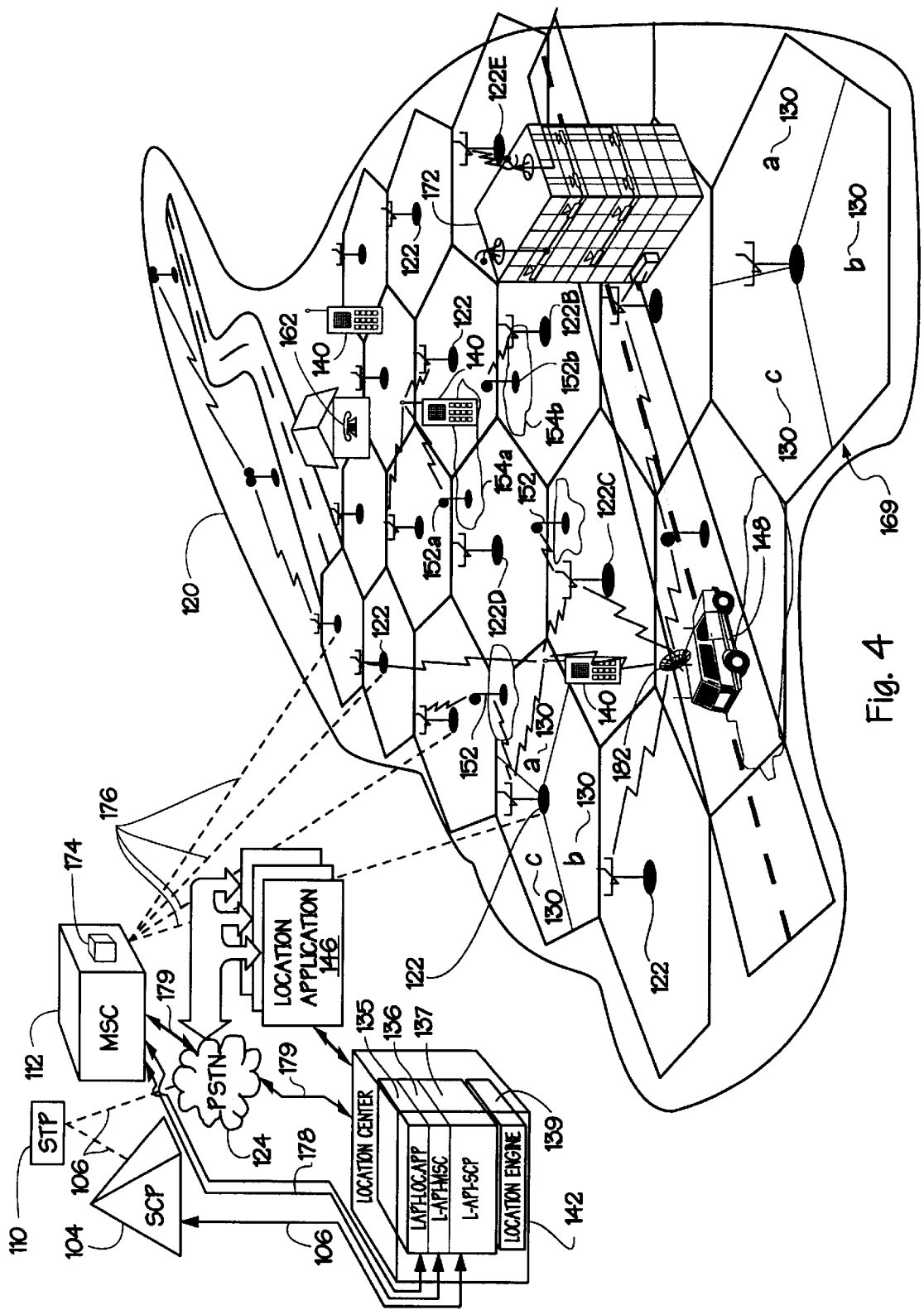
FIG. 4 illustrates an overall view of a wireless radio location network architecture, based on advanced intelligent network (AIN) principles.

FIG. 4 is a high level diagram of one embodiment of a wireless digital radiolocation intelligent network architecture useful for the present invention. Accordingly, this figure illustrates the interconnections between the components, for example, of a typical PCS network configuration and various components that are specific to the present invention. In particular, as one skilled in the art will understand, a typical wireless (PCS) network includes:

(a) a (large) plurality of conventional wireless mobile stations (MSs) 140 for at least one of voice related communication, visual (e.g., text) related communication, and according to present invention, location related communication;

(b) a mobile switching center (MSC) 112;

(c) a plurality of wireless cell sites in a radio coverage area 120, wherein each cell site includes an infrastructure base station such as those labeled 122 (or variations thereof such as 122A–122D). In particular, the base stations 122 denote the standard high traffic, fixed location base stations used for voice and data communication with a plurality of MSs 140, and, according to the present invention, also used for communication of information related to locating such MSs 140. Additionally, note that the base stations labeled 152 are more directly related to wireless location enablement. For example, as described in greater detail hereinbelow, the base stations 152 may be low cost, low functionality transponders that are used primarily in communicating MS location related information to the location center 142 (via base stations 122 and the MSC 112). Note that unless stated otherwise, the base stations 152 will be referred to hereinafter as location base station(s) 152 or simply LBS(s) 152;

(d) a public switched telephone network (PSTN) 124 (which may include signaling system links 106 having network control components such as: a service control point (SCP) 104, one or more signaling transfer points (STPs) 110.

Added to this wireless network, the present invention provides the following additional components:

(10.1) a location center 142 which is used for determining a location of a target MS 140 using signal characteristic values for this target MS;

(10.2) one or more mobile base stations 148 (MBS) which are optional, for physically traveling toward the target MS 140 or tracking the target MS;

(10.3) a plurality of location base stations 152 (LBS) which are optional, distributed within the radio coverage areas 120, each LBS 152 having a relatively small MS 140 detection area 154;

Since location base stations 152 can be located on potentially each floor of a multi-story building, the wireless location technology described herein can be used to perform location in terms of height as well as by latitude and longitude.

In operation, the MS 140 may utilize one of the wireless technologies, CDMA, TDMA, AMPS, NAMPS or GSM techniques for radio communication with: (a) one or more infrastructure base stations 122, (b) mobile base station(s) 148, or (c) an LBS 152.

Referring to FIG. 4 again, additional detail is provided of typical base station coverage areas, sectorization, and high level components within a radio coverage area 120, including the MSC 112. Although base stations may be placed in any configuration, a typical deployment configuration is approximately in a cellular honeycomb pattern, although many practical tradeoffs exist, such as site availability, versus the requirement for maximal terrain coverage area. To illustrate, three such exemplary base stations (BSs) are 122A, 122B and 122C, each of which radiate referencing signals within their area of coverage 169 to facilitate mobile station (MS) 140 radio frequency connectivity, and various timing and synchronization functions. Note that some base stations may contain no sectors 130 (e.g. 122E), thus radiating and receiving signals in a 360 degree omnidirectional coverage area pattern, or the base station may contain "smart antennas" which have specialized coverage area patterns. However, the generally most frequent base stations 122 have three sector 130 coverage area patterns. For example, base station 122A includes sectors 130, additionally labeled a, b and c. Accordingly, each of the sectors 130 radiate and receive signals in an approximate 120 degree arc, from an overhead view. As one skilled in the art will understand, actual base station coverage areas 169 (stylistically represented by hexagons about the base stations 122) generally are designed to overlap to some extent, thus ensuring seamless coverage in a geographical area. Control electronics within each base station 122 are used to communicate with a mobile stations 140. Information regarding the coverage area for each sector 130, such as its range, area, and "holes" or areas of no coverage (within the radio coverage area 120), may be known and used by the location center 142 to facilitate location determination. Further, during communication with a mobile station 140, the identification of each base station 122 communicating with the MS 140 as well, as any sector identification information, may be known and provided to the location center 142.

In the case of the base station types 122, 148, and 152 communicating of location information, a base station or mobility controller 174 (BSC) controls, processes and provides an interface between originating and terminating telephone calls from/to mobile station (MS) 140, and the mobile switch center (MSC) 112. The MSC 122, on-the-other-hand, performs various administration functions such as mobile station 140 registration, authentication and the relaying of various system parameters, as one skilled in the art will understand.

The base stations 122 may be coupled by various transport facilities 176 such as leased lines, frame relay, T-Carrier links, optical fiber links or by microwave communication links. When a mobile station 140 (such as a CDMA, AMPS, NAMPS mobile telephone) is powered on and in the idle state, it constantly monitors the pilot signal transmissions from each of the base stations 122 located at nearby cell sites. Since base station/sector coverage areas may often overlap, such overlapping enables mobile stations 140 to detect, and, in the case of certain wireless technologies, communicate simultaneously along both the forward and reverse paths, with multiple base stations 122 and/or sectors 130. In FIG. 4, the constantly radiating pilot signals from base station sectors 130, such as sectors a, b and c of BS 122A, are detectable by mobile stations 140 within the coverage area 169 for BS 122A That is, the mobile stations 140 scan for pilot channels, corresponding to a given base station/sector identifiers (IDs), for determining in which coverage area 169 (i.e., cell) it is contained. This is performed by comparing signal strengths of pilot signals transmitted from these particular cell-sites.

The mobile station 140 then initiates a registration request with the MSC 112, via the base station controller 174. The MSC 112 determines whether or not the mobile station 140 is allowed to proceed with the registration process (except, e.g., in the case of a 911 call, wherein no registration process is required). Once any required registration is complete, calls may be originated from the mobile station 140 or calls or short message service messages can be received from the network. Note that the MSC 112 communicates as appropriate, with a class 4/5 wireline telephony circuit switch or other central offices, connected to the PSTN 124 network. Such central offices connect to wireline terminals, such as telephones, or any communication device compatible with a wireline. The PSTN 124 may also provide connections to long distance networks and other networks.

The MSC 112 may also utilize IS/41 data circuits or trunks connecting to signal transfer point 110, which in turn connects to a service control point 104, via Signaling System #7 (SS7) signaling links (e.g., trunks) for intelligent call processing, as one skilled in the art will understand. In the case of wireless AIN services such links are used for call routing instructions of calls interacting with the MSC 112 or any switch capable of providing service switching point functions, and the public switched telephone network (PSTN) 124, with possible termination back to the wireless network.

Referring still to FIG. 4, the location center (LC) 142 interfaces with the MSC 112 either via dedicated transport facilities 178, using for example, any number of LAN/WAN technologies, such as Ethernet, fast Ethernet, frame relay, virtual private networks, etc., or via the PSTN 124. The LC 142 may receive autonomous (e.g., unsolicited) command/ response messages regarding, for example: (a) the state of the wireless network of each commercial radio service provider utilizing the LC 142 for wireless location services, (b) MS 140 and BS 122 radio frequency (RF) measurements, (c) communications with any MBSs 148, and (d) location applications requesting MS locations using the location center. Conversely, the LC 142 may provide data and control information to each of the above components in (a)–(d). Additionally, the LC 142 may provide location information to an MS 140, via a BS 122. Moreover, in the case of the use of a mobile base station (MBS) 148, several communications paths may exist with the LC 142.

The MBS 148 may act as a low cost, partially-functional, moving base station, and is, in one embodiment, situated in a vehicle where an operator may engage in MS 140 searching and tracking activities. In providing these activities using CDMA, the MBS 148 provides a forward link pilot channel for a target MS 140, and subsequently receives unique BS pilot strength measurements from the MS 140. The MBS 148 also includes a mobile station 140 for data communication with the LC 142, via a BS 122. In particular, such data communication includes telemetering the geographic position of the MBS 148 as well as various RF measurements related to signals received from the target MS 140. In some embodiments, the MBS 148 may also utilize multiple-beam fixed antenna array elements and/or a moveable narrow beam antenna, such as a microwave dish 182. The antennas for such embodiments may have a known orientation in order to further deduce a radio location of the target MS 140 with respect to an estimated current location of the MBS 148. As will be described in more detail herein below, the MBS 148 may further contain a global positioning system (GPS), distance sensors, dead-reckoning electronics, as well as an on-board computing system and display devices for locating both the MBS 148 itself as well as tracking and locating the target MS 140. The computing and display provides a means for communicating the position of the target MS 140 on a map display to an operator of the MBS 148.

Each location base station (LBS) 152 is a low cost location device. Each such LBS 152 communicates with one or more of the infrastructure base stations 122 using one or more wireless technology interface standards. In some embodiments, to provide such LBS's cost effectively, each LBS 152 only partially or minimally supports the air-interface standards of the one or more wireless technologies used in communicating with both the BSs 122 and the MSs 140. Each LBS 152, when put in service, is placed at a fixed location, such as at a traffic signal, lamp post, etc., wherein the location of the LBS may be determined as accurately as, for example, the accuracy of the locations of the infrastructure BSs 122. Assuming the wireless technology, CDMA, is used, each BS 122 uses a time offset of the pilot PN sequence to identify a forward CDMA pilot channel. In one embodiment, each LBS 152 emits a unique, time-offset pilot PN sequence channel in accordance with the CDMA standard in the RF spectrum designated for BSs 122, such that the channel does not interfere with neighboring BSs 122 cell site channels, nor would it interfere with neighboring LBSs 152. However, as one skilled in the art will understand, time offsets, in CDMA chip sizes, may be re-used within a PCS system, thus providing efficient use of pilot time offset chips, thereby achieving spectrum efficiency. Each LBS 152 may also contain multiple wireless receivers in order to monitor transmissions from a target MS 140. Additionally, each LBS 152 contains mobile station 140 electronics, thereby allowing the LBS to both be controlled by, e.g., the LC 142, and to transmit information to the LC 142, via, e.g., at least one neighboring BS 122.

As mentioned above, when the location of a particular target MS 140 is desired, the LC 142 can request location information about the target MS 140 from, for instance, one or more activated LBSs 152 in a geographical area of interest. Accordingly, whenever the target MS 140 is in an LBS coverage area, or is suspected of being in the coverage area, either upon command from the LC 142, or in a substantially continuous (or periodic) fashion, the LBS's pilot channel appears to the target MS 140 as a potential neighboring base station channel, and consequently, is placed, for example, in the CDMA neighboring set, or the CDMA remaining set of the target MS 140 (as one familiar with the CDMA standards will understand).

During the normal CDMA pilot search sequence of the mobile station initialization state (n the target MS), the target MS 140 will, if within range of such an activated LBS 152, detect the LBS pilot presence during the CDMA pilot channel acquisition substate. Consequently, the target MS 140 performs RF measurements on the signal from each detected LBS 152. Similarly, an activated LBS 152 can perform RF measurements on the wireless signals from the target MS 140. Accordingly, each LBS 152 detecting the target MS 140 may subsequently telemeter back to the LC 142 measurement results related to signals from/to the target MS 140. Moreover, upon command, the target MS 140 will telemeter back to the LC 142 its own measurements of the detected LBSs 152, and consequently, this new location information, in conjunction with location related information received from the BSs 122, can be used to locate the target MS 140.

It should be noted that an LBS 152 will normally deny hand-off requests, since typically the LBS does not require the added complexity of handling voice or traffic bearer channels, although economics and peak traffic load conditions may dictate preference here. Note that GPS timing information, needed by any CDMA base station, is either achieved via a the inclusion of a local GPS receiver or via a telemetry process from a neighboring conventional BS 122, which contains a GPS receiver and timing information. Since energy requirements are minimal in such an LBS 152, (rechargeable) batteries or solar cells may be used to power the LBSs. Further, no expensive terrestrial transport link is typically required since two-way communication is provided by an included MS 140 (or an electronic variation thereof) within each LBS. Thus, LBSs 152 may be placed in numerous locations, such as:

(a) in dense urban canyon areas (e.g., where signal reception may be poor and/or very noisy);

(b) in remote areas (e.g., hiking, camping and skiing areas);

(c) along highways (e.g., for emergency as well as monitoring traffic flow), and their rest stations; or (d) in general, wherever more location precision is required than is obtainable using other wireless infrastructure network components.

Location Center—Network Elements API Description

A location application programming interface 136 (FIG. 4), denoted L-API, is may be provided between the location center 142 (LC) and the mobile switch center (MSC) network element type, in order to send and receive various control, signals and data messages. The L-API may be implemented using a preferably high-capacity physical layer communications interface, such as IEEE standard 802.3 (10 baseT Ethernet), although other physical layer interfaces could be used, such as fiber optic ATM frame relay, etc. At least two forms of L-API implementation are possible. In a first case, the signal control and data messages are provided using the MSC 112 vendor's native operations messages inherent in the product offering, without any special modifications. In a second case, the L-API includes a full suite of commands and messaging content specifically optimized for wireless location purposes, which may require some, although minor development on the part of an MSC vendor.

Signal Processor Description

Figure 17:
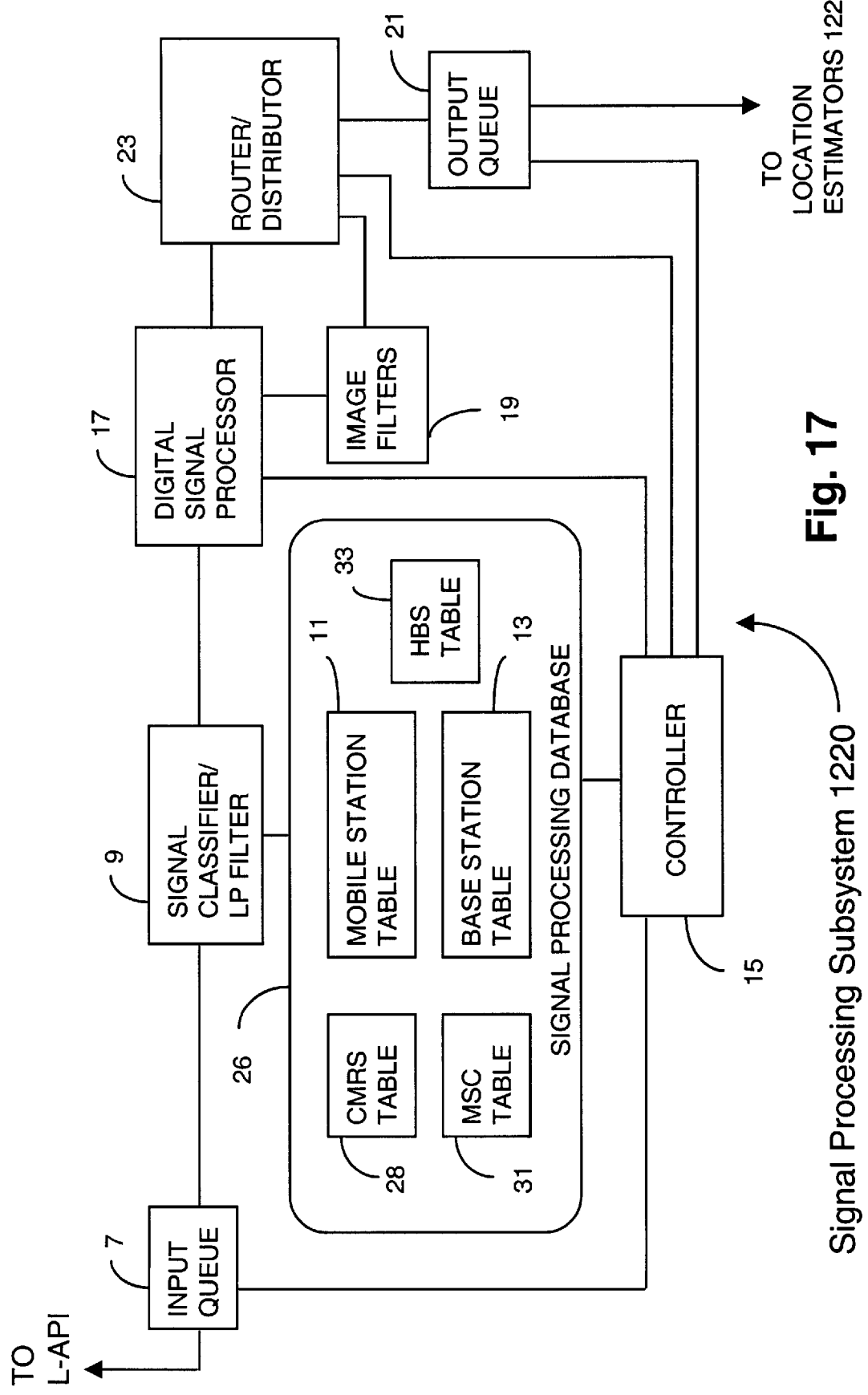
FIG. 17 illustrates the primary components of the signal processing subsystem.

Referring to FIG. 17, the signal processing subsystem (labeled 1220 in other figures) of the LC 142: (a) receives control messages and signal measurements from one or more wireless service provider networks, and (b) transmits appropriate control messages to such wireless networks via the location applications programming interface 136 referenced earlier, for wireless location purposes. The signal processing subsystem 1220 additionally provides various signal identification, conditioning and pre-processing functions, including buffering, signal type classification, signal filtering, message control and routing functions to the location estimating modules or FOMs.

Figure 1:
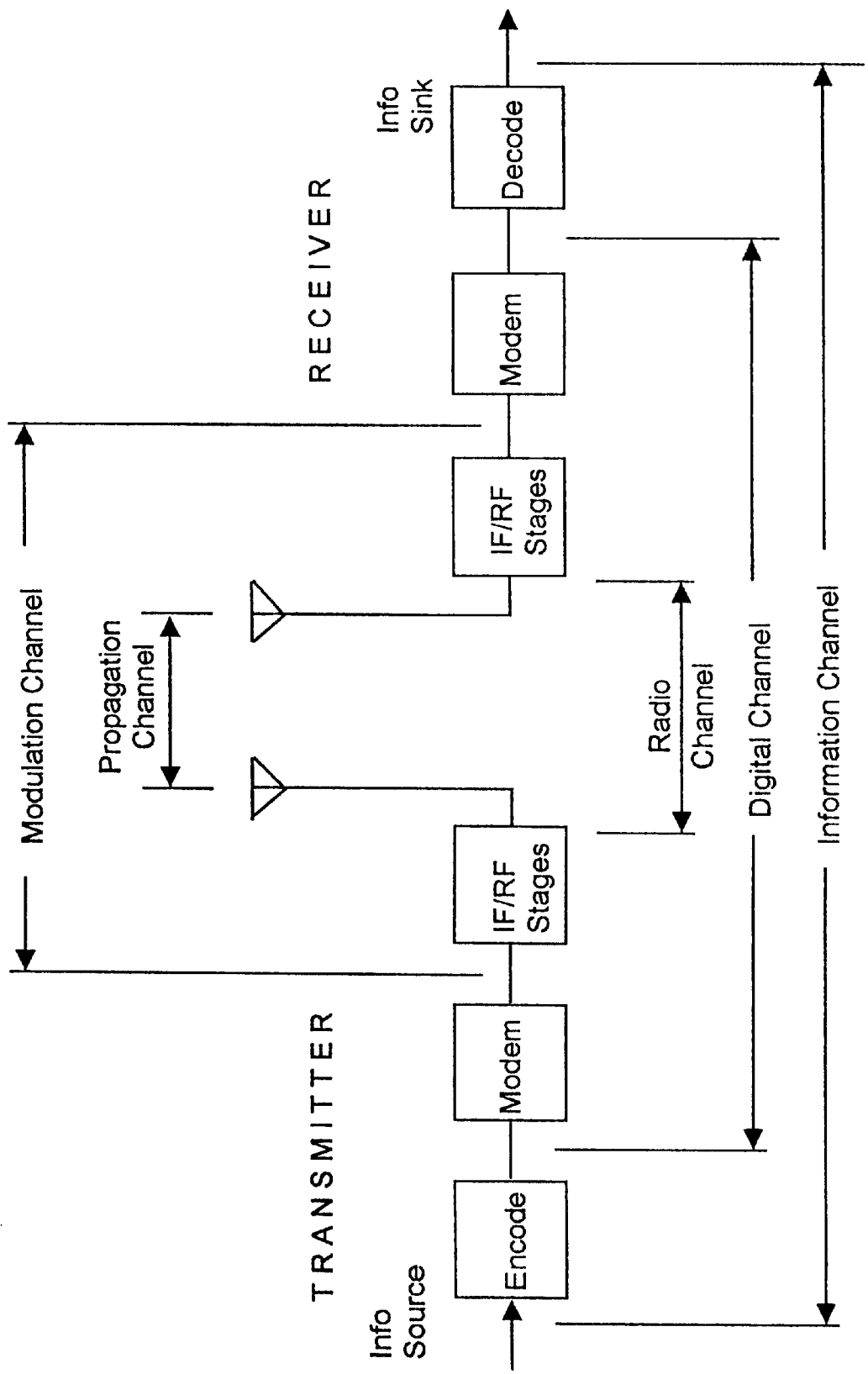
FIG. 1 illustrates various perspectives of radio propagation opportunities which may be considered in addressing correlation with mobile to base station ranging.

There can be several combinations of Delay Spread/ Signal Strength sets of measurements made available to the signal processing subsystem 1220 In some cases the mobile station 140 (FIG. 1) may be able to detect up to three or four Pilot Channels representing three to four base stations, or as few as one Pilot Channel, depending upon the environment and wireless network configuration. Similarly, possibly more than one BS 122 can detect a mobile station 140 transmitter signal, as provided by the provision of cell diversity or soft hand-off in the CDMA standards, and the fact that multiple CMRS' base station equipment commonly will overlap coverage areas.

For each mobile station 140 or BS 122 transmitted signal that is detected by a receiver group at a base or mobile station, respectively, multiple delayed signals, or "fingers" may be detected and tracked resulting from multipath radio propagation conditions from a given transmitter. In typical spread spectrum diversity CDMA receiver design, the "first" finger represents the most direct, or least delayed multipath signal. Second or possibly third or fourth fingers may also be detected and tracked, assuming the detecting base station and/or mobile station 140 contains a sufficient number of data receivers for doing so. Although traditional TOA and TDOA methods discard such subsequent fingers related to the same transmitted signal, collection and use of these additional values can prove useful to reduce location ambiguity, and are thus collected by the signal processing subsystem 1220 in the location center 142. Accordingly, the present invention may utilize various wireless signal measurements of transmissions between a target mobile station 140 and a network of base stations 122, 152 and/or 148. Such additional measurements can be important in effectively estimating the location of mobile stations 140 in that it is well known that measurements of wireless signal propagation characteristics, such as signal strength (e.g., RSSI), time delay, angle of arrival, and any number other measurements, can individually lead to gross errors in MS 140 location estimates. For example, terrestrial triangulation systems (e.g., TOA/TDOA location systems) have experienced large location estimation errors in certain environments due to a reliance on one or two types of wireless signal measurements and not having capability to use additional wireless signal measurements to assist in determining at least an indication as to the error in a location estimate, if not compensate for such errors. For instance, for an urban area, in a subarea of less than 500 square feet, the RF signals capable of detection (by an MS and/or a BS) may be so distorted via multipath, building attenuation, etc that such terrestrial triangulation systems may generate MS location estimates that vary by over 100% in size and/or distance from the base stations used for triangulating (or trilaterating or, more generally, angulating).

Accordingly, one aspect of the present invention is directed to utilizing a larger number of wireless signal measurements, and utilizing a plurality of MS 140 estimation techniques to compensate for location estimation errors generated by some such techniques. For example, due to the large capital outlay costs associated with providing three or more overlapping base station coverage signals in every possible location, most practical digital PCS deployments result in fewer than three base station pilot channels being reportable in the majority of location areas, thus resulting in a larger, more amorphous location estimates by terrestrial triangulation systems. Thus, by utilizing wireless signal measurements from a variety of sources substantially simultaneously and/or "greedily" (i.e., use whatever signal measurements can be obtained from any of the signal sources as they are obtained), additional location enhancements can be obtained. For example, by enhancing a mobile station 140 with electronics for detecting satellite transmissions (as done with mobile base stations 148 described in detail hereinbelow and which also can be viewed as such an enhanced mobile station 140) additional location related signals maybe obtained from:

(a) the GPS satellite system, (b) the Global Navigation Satellite System (GLONASS) satellite system, a Russian counterpart to the U.S. GPS system, and/or (c) the numerous low earth orbit satellite systems (LEOs) and medium earth orbit satellite systems (MEOs) such as the IRDIUM system being developed by Motorola Corp., the GLOBALSTAR system by Loral and Qualcomm, and the ICO satellite system by ICO Global Communications.

Thus, by combining even insufficient wireless location measurements from divergent wireless communication systems, accurate location of an MS 140 is possible. For example, by if only two GPS satellites are detectable, but there is an additional reliable wireless signal measurement from, e.g., a terrestrial base station 122, then by triangulating using wireless signal measurements derived from transmissions from each of these three sources, a potentially reliable and accurate MS location can be obtained.

Moreover, the transmissions from the MS 140 used for determining the MS's location need not be transmitted to terrestrial base stations (e.g., 122). It is within the scope of the present invention that a target MS 140 may transmit location related information to satellites as well. For example, if a target MS 140 detects two GPS satellite transmissions and is able to subsequently transmit the GPS signal measurements (e.g., timing measurements) to an additional satellite capable of determining additional MS location measurements according to the signals received, then by performing a triangulation process at the location center 142 (which may be co-located with the additional satellite, or at a remote terrestrial site), a potentially reliable and accurate MS location can be obtained. Accordingly, the present invention is capable of resolving wireless location ambiguities due to a lack of location related information of one type by utilizing supplemental location related information of a different type. Note that by "type" as used here it is intended to be interpreted broadly as, e.g., (a) a data type of location information, and/or (b) communications from a particular commercial wireless system as opposed to an alternative system, each such system having distinct groups of known or registered users.

Thus, location information of different types can be, for example, GPS signal data and terrestrial base station IDOAI-TOA signal data, or TDOA data from two different wireless networks. Moreover, it can be that different FOMs are provided for at least some wireless location computational models utilizing different types of location related information. For example, in certain contexts wireless networks based on different wireless signaling technologies may be used to locate an MS 140 during the time period of a single emergency call such as E911. Moreover, in other contexts it may be possible for the target MS 140 to use one or more of a plurality of wireless communication networks, possibly based on different wireless communication technologies, depending on availability the of technology in the coverage area. In particular, since so called "dual mode" mobile stations 140 are available, wherein such mobile stations are capable of wireless communication in a plurality of wireless communication technologies, such as digital (e.g., CDMA, and/or TDMA) as well as analog or AMP/NAMPS, such mobile stations may utilize a first (likely a default) wireless communication technology whenever possible, but switch to another wireless communication technology when, e.g., coverage of the first wireless technology becomes poor. Moreover, since such different technologies are typically provided by different wireless networks, wherein the term "network" is understood to include a network of communication supporting nodes geographically spaced apart that provide a communications infrastructure having access to information regarding subscribers to the network prior to a request to access the network by the subscribers, such a mobile identification number, MIN, and/or signaling characteristics of the MS itself, such as: (a) the wireless communication technologies it is capable of utilizing. (b) it maximum transmission power, (c) its make/model. Accordingly, the present invention may include FOMs for providing mobile station location estimates wherein the target MS 140 communicates with various networks using different wireless communication technologies. Moreover, such FOMs may be activated according to the wireless signal measurements received from various wireless networks and/or wireless technologies supported by a target MS 140 and to which there is a capability of communicating measurements of such varied wireless signals to the FOM(s) that can perform a location estimate on such wireless signals. Thus, in one embodiment of the present invention, there may be a triangulation (or trilateration) based FOM for each of CDMA, TDMA and AMP/NAMPS which may be singly, serially, or concurrently for obtaining a particular location of an MS 140 at a particular time (e.g., for an E911 call). Thus, when locating a target MS 140 may, if there is overlapping coverage of two wireless communication technologies and the MS supports communications with both, repeatedly switch back and forth between the two thereby providing additional wireless signal measurements for use in locating the target MS 140.

In one embodiment of the present invention, wherein multiple computational location models (FOMs) may be activated substantially simultaneously (or alternatively, wherever appropriate input is received that allow particular FOMs to be activated). Note that at least some of the FOMs may provide "inverse" estimates of where a target MS 140 is not instead of where it is. Such inverse analysis can be very useful in combination with location estimates indicating where the target MS is in that the accuracy of a resulting MS location estimate may be substantially decreased in size when such inverse estimates are utilized to rule out areas that otherwise appear to be likely possibilities for containing the target MS 140. Note that one embodiment of a FOM that can provide such reverse analysis is a location computational model that generates target MS location estimates based on archived knowledge of base station coverage areas (such an archive being the result of; e.g., the compilation a RF coverage database—either via RF coverage area simulations or field tests). In particular, such a model may provide target MS location inverse estimates having a high confidence or likelihood that that the target MS 140 is not in an area since either a base station 122 (or 152) can not detect the target MS 140, or the target MS can not detect a particular base station. Accordingly, the confidences or likelihoods on such estimates may be used by diminishing a likelihood that the target MS is in an area for the estimate, or alternatively the confidence or likelihood of all areas of interest outside of the estimate can increased.

Note that in some embodiments of the present invention, both measurements of forward wireless signals to a target MS 140, and measurements of reverse wireless signals transmitted from the target MS to a base station can be utilized by various FOMS. In some embodiments of the present invention, the received relative signal strength ($RRSS_{BS}$) of detected nearby base station transmitter signals along the forward link to the target mobile station can be more readily used by the location estimate modules (FOMs) since the transmission power of the base stations 122 typically changes little during a communication with a mobile station. However, the relative signal strength ($RRSS_{MS}$) of target mobile station transmissions received by the base stations on the reverse link may require more adjustment prior to location estimate model use, since the mobile station transmitter power level changes nearly continuously. In the CDMA air interface case, to perform such adjustments for wireless signal measurements of the reverse link, one adjustment variable and one factor value may be required by the signal processing subsystem 1220, i.e., (a) an instantaneous relative power level in dBm (IRPL) of the target mobile station transmitter, and (b) the mobile station 140 Power Class. By adding the IRPL to the $RRSS_{MS}$, a synthetic or derived relative signal strength ($SRSS_{MS}$) of the target mobile station 140 signal detected at the BSs 122 can be derived, as shown below:

$$SRSS_{MS} = RRSS_{MS} + IRPL \quad \text{(in dBm)}$$

Accordingly, $SRSS_{MS}$ is a corrected indication of the effective path loss in the reverse direction (mobile station to BS), and therefore is now comparable with $RRSS_{BS}$ and can be used to provide a correlation with either distance or shadow fading because it now accounts for the change of the mobile station transmitter's power level. Note that the two signal measurements $RRSS_{BS}$ and $SRSS_{MS}$ can now be processed in a variety of ways to achieve a more robust correlation with distance or shadow fading.

It is well known that Rayleigh fading appears as a generally random noise generator in wireless signals. Thus, Rayleigh fading can substantially degrade the correlation of either $RRSS_{BS}$ or $SRSS_{MS}$ measurements with distance. Several mathematical operations or signal processing functions, however, can be performed on the $RRSS_{BS}$ or $SRSS_{MS}$ measurements to derive more robust relative signal strength values, thereby overcoming or substantially compensating for the adverse Rayleigh fading effects. Examples of such signal processing functions include averaging, taking the strongest value and weighting the strongest value with a greater coefficient than the weaker value, then averaging the results. This signal processing technique takes advantage of the fact that although a Rayleigh fade may often exist in either the forward or reverse path, it is much less probable that a Rayleigh fade exists simultaneously on both the reverse and forward link.

Figure 2:
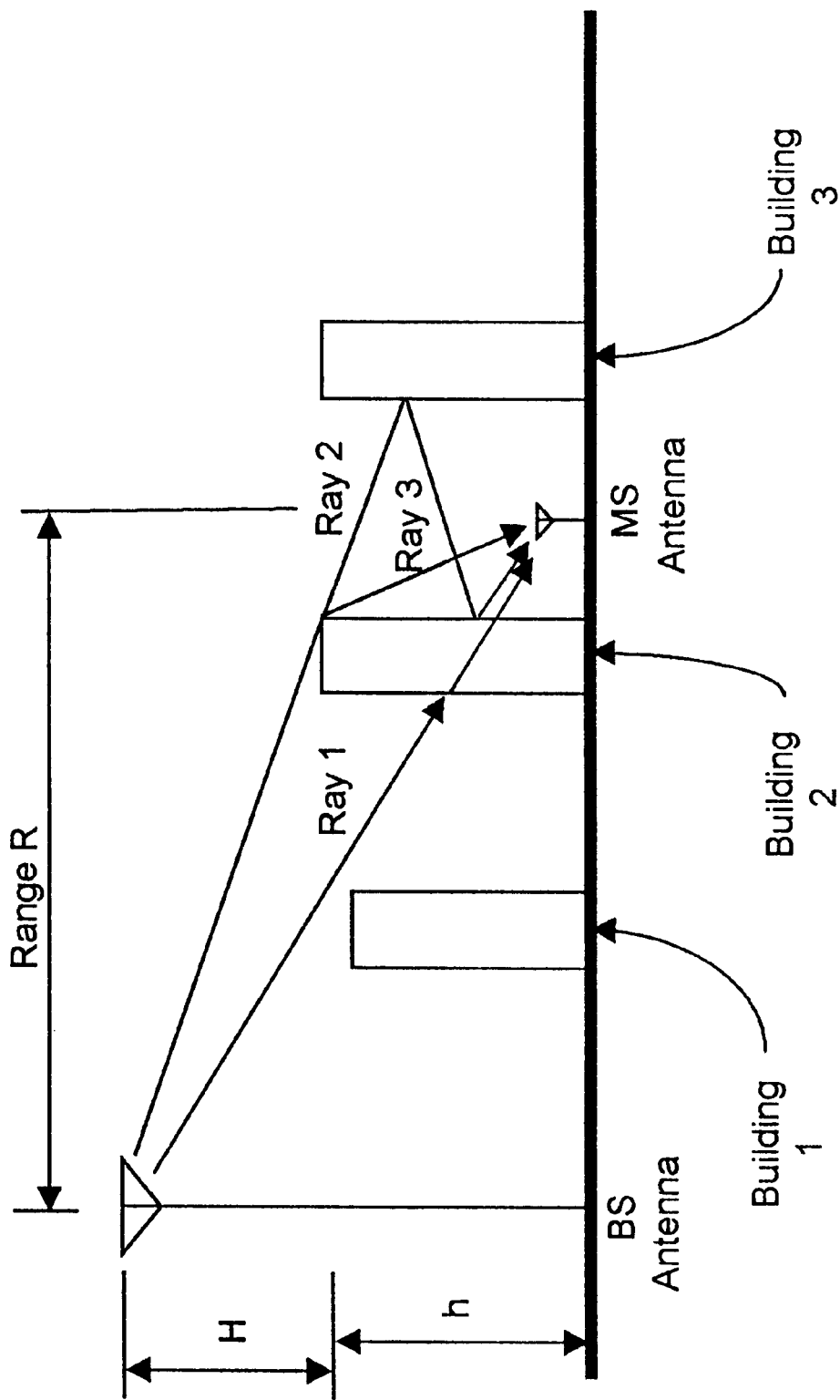
FIG. 2 shows aspects of the two-ray radio propagation model and the effects of urban clutter.
Figure 3:
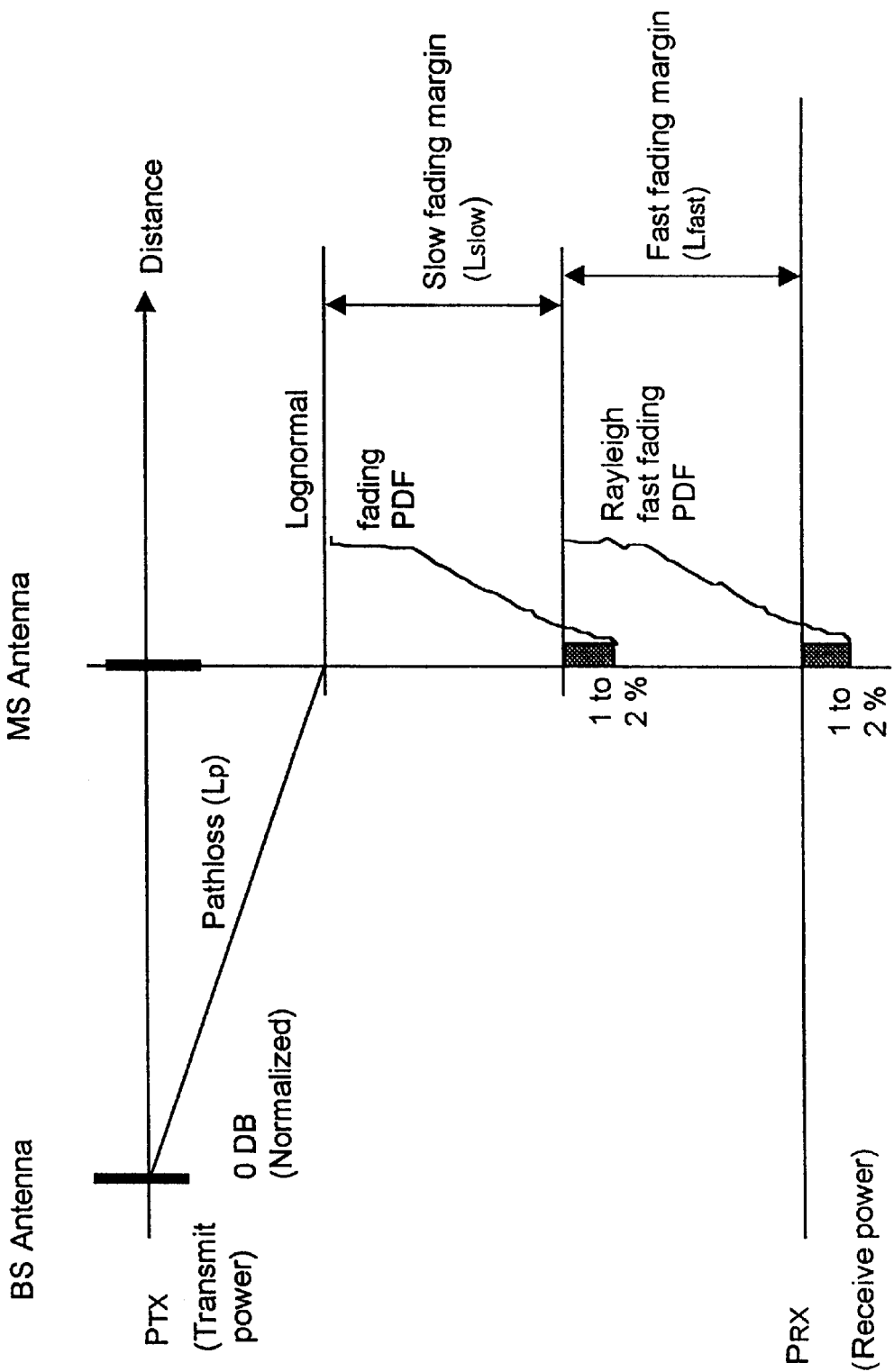
FIG. 3 provides a typical example of how the statistical power budget is calculated in design of a Commercial Mobile Radio Service Provider network.

Although Rayleigh fading distortions in wireless signal measurements can ameliorated, shadow fading may still present difficulties in using such measurements to determine reliable and accurate distances of a target MS 140 from the base stations. When utilizing the present invention with one or more CDMA wireless networks, shadow fading between the target MS 140 and a BS 122 (e.g., FIG. 2) may be detected. For example, shadow fading of the first finger of a CDMA delay spread signal is most likely to be a relatively smaller than the case where the target MS 140 and another BS 122 are separated by a greater distance. Thus, since shadow fading does not materially affect the arrival time delay of the wireless signal, a second CDMA delay spread finger having a longer time delay may be detected with a greater signal strength.

LOCATION CENTER HIGH LEVEL FUNCTIONALITY

Figure 5:
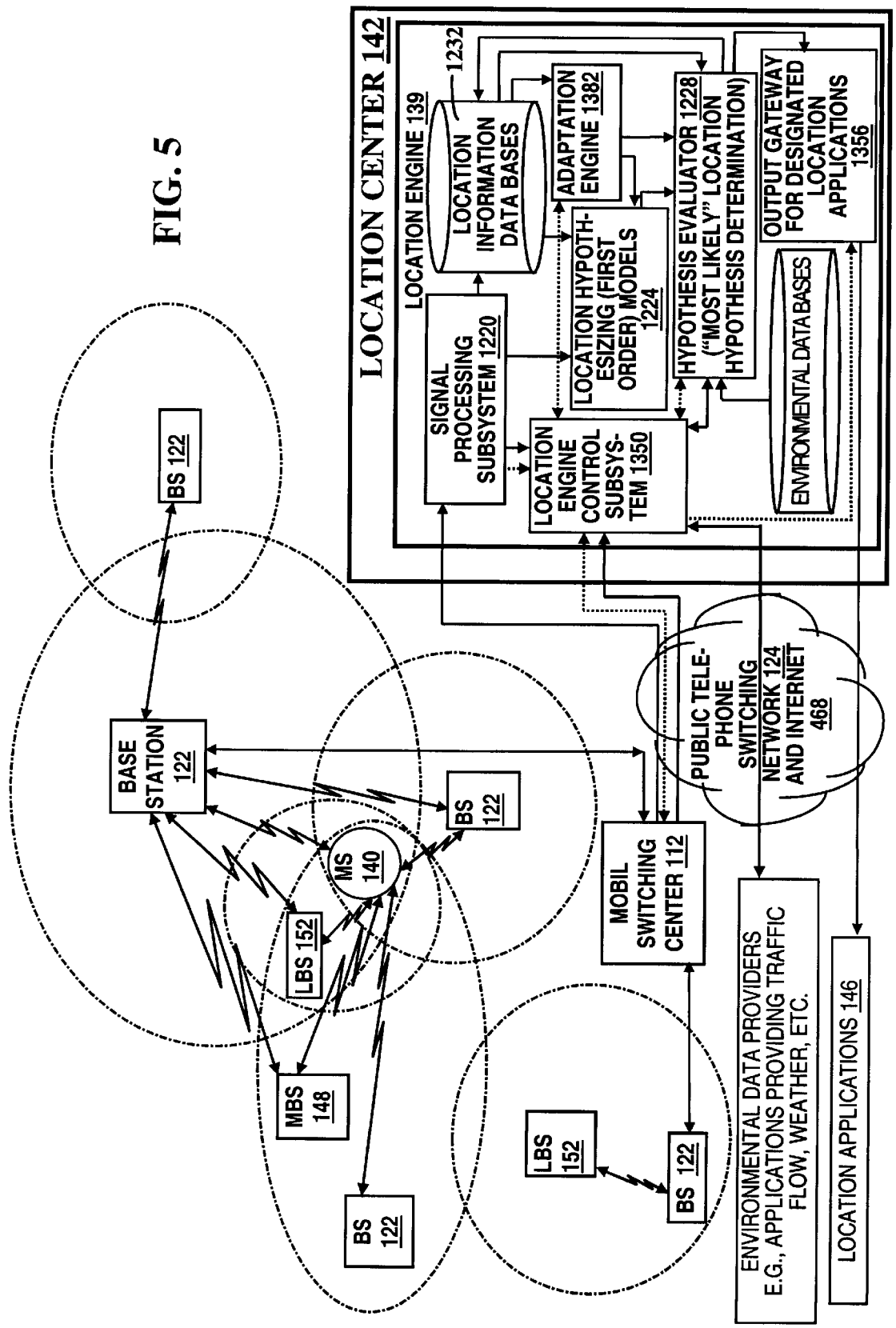
FIG. 5 is a high level block diagram of an embodiment of the present invention for locating a mobile station (MS) within a radio coverage area for the present invention.

At a very high level the location center 142 computes location estimates for a wireless mobile station 140 (denoted the "target MS" or "MS") by performing the following steps:

(23.1) receiving measurements of signal transmission characteristics of communications communicated between the target MS 140 and one or more wireless infrastructure base stations 122;

(23.2) filtering the received signal transmission characteristics (by a signal processing subsystem 1220 illustrated in, e.g., FIG. 5) as needed so that target MS location data can be generated that is uniform and consistent with location data generated from other target MSs 140. In particular, such uniformity and consistency is both in terms of data structures and interpretation of signal characteristic values provided by the MS location data, as will be described hereinbelow;

(23.3) inputting the generated target MS location data to one or more MS location estimating models (denoted First order models or FOMs, and labeled collectively as 1224 in FIG. 5), so that each such model may use the input target MS location data for generating a "location hypothesis" providing an estimate of the location of the target MS 140;

(23.4) providing the generated location hypotheses to an hypothesis evaluation module (denoted the hypothesis evaluator 1228 in FIG. 5) for:

(a) (optionally) adjusting the target MS location estimates of the generated location hypotheses and/or adjusting confidence values of the location hypotheses, wherein for each location hypothesis, its confidence value indicates the confidence or likelihood that the target MS is located in the location estimate of the location hypothesis. Moreover, note that such adjusting uses archival information related to the accuracy and/or reliability of previously generated location hypotheses;

(b) (optionally) evaluating the location hypotheses according to various heuristics related to, for example, the radio coverage area 120 terrain, the laws of physics, characteristics of likely movement of the target MS 140; and (c) (necessarily) determining a most likely location area for the target MS 140, wherein the measurement of confidence associated with each input MS location area estimate is used for determining a "most likely location area"; and (23.5) outputting a most likely target MS location estimate to one or more applications 146 (FIG. 5) requesting an estimate of the location of the target MS 140.

Location Hypothesis Data Representation

In order to describe how the steps (23.1) through (23.5) are performed in the sections below, some introductory remarks related to the data denoted above as location hypotheses will be helpful Additionally, it will also be helpful to provide introductory remarks related to historical location data and the data base management programs associated therewith.

For each target MS location estimate generated and utilized by the present invention, the location estimate is provided in a data structure (or object class) denoted as a "location hypothesis" (illustrated in Table LH-1). Brief descriptions of the data fields for a location hypothesis is provided in the Table LH-1.

TABLE LH-1

| | |
|---|---|
| FOM_ID | First order model ID providing this Location Hypothesis); note, since it is possible for location hypotheses to be generated by other than the FOMs 1224, in general, this field identifies the module that generated this location hypothesis. |
| MS_ID | The identification of the target MS 140 to this location hypothesis applies. |
| pt_est | The most likely location point estimate of the target MS 140. |
| valid_pt | Boolean indicating the validity of "pt_est". |
| area_est | Location Area Estimate of the target MS 140 provided by the FOM. This area estimate will be used whenever "image_area" below is NULL. |
| valid_area | Boolean indicating the validity of "area_est" (one of "pt_est" and "area_est" must be valid). |
| adjust | Boolean (true if adjustments to the fields of this location hypothesis are to be performed in the Context adjuster Module). |
| pt_covering | Reference to a substantially minimal area (e.g., mesh cell) covering of "pt_est". Note, since this MS 140 may be substantially on a cell boundary, this covering may, in some cases, include more than one cell. |
| image_area | Reference to a substantially minimal area (e.g., mesh cell) covering of "pt_covering" (see detailed description of the function, "confidence_adjuster"). Note that if this field is not NULL, then this is the target MS location estimate used by the location center 142 instead of "area_est". |
| extrapolation_area | Reference to (if non-NULL) an extrapolated MS target estimate area provided by the location extrapolator submodule 1432 of the hypothesis analyzer 1332. That is, this field, if non-NULL, is an extrapolation of the "image_area" field if it exists, otherwise this field is an extrapolation of the "area_est" field. Note other extrapolation fields may also be provided depending on the of the present invention, such as an extrapolation embodiment of the "pt_covering". |
| confidence | In one embodiment, this is a probability indicating a likelihood that the target MS 140 is in (or out) of a particular area. If "image_area" exists, then this is a measure of the likelihood that the target MS 140 is within the area represented by "image_area", or if "image_area" has not been computed (e.g., "adjust" is FALSE), then "area_est" must be valid and this is a measure of the likelihood that the target MS 140 is within the area represented by "area_est". Other embodiments, are also within the scope of the present invention that are not probabilities; e.g., translations and/or expansions of the [0, 1] probability range as one skilled in the art will understand. |
| Original_Timestamp | Date and time that the location signature cluster (defined hereinbelow) for this location hypothesis was received by the signal processing subsystem 1220. |
| Active_Timestamp | Run-time field providing the time to which this location hypothesis has had its MS location estimate(s) extrapolated (in the location extrapolator 1432 of the hypothesis analyzer 1332). Note that this field is initialized with the value from the "Original_Timestamp" field. |
| Processing Tags and environmental categorizations | For indicating particular types of environmental classifications not readily determined by the "Original_Timestamp" field (e.g., weather, traffic), and restrictions on location hypothesis processing. |
| loc_sig_cluster | Provides access to the collection of location signature signal characteristics derived from communications between the target MS 140 and the base station(s) detected by this MS (discussed in detail hereinbelow); in particular, the location data accessed here is provided to the first order models by the signal processing subsystem 1220; i.e., access to the "loc sigs" (received at "timestamp" regarding the location of the target MS) |

TABLE LH-1-continued

| descriptor | Original descriptor (from the First order model indicating why/how the Location Area Estimate and Confidence Value were determined). |
|---|---|

As can be seen in the Table LH-1, each location hypothesis data structure includes at least one measurement, denoted hereinafter as a confidence value (or simply confidence), that is a measurement of the perceived likelihood that an MS location estimate in the location hypothesis is an accurate location estimate of the target MS 140. Since such confidence values are an important aspect of the preset invention, much of the description and use of such confidence values are described below; however, a brief description is provided here.

In one embodiment, each confidence value is a probability indicative of a likeliness that the target MS 140 resides within an geographic area represented by the hypothesis to which the confidence value applies. Accordingly, each such confidence value is in the range [0, 1]. Moreover, for clarity of discussion, it is assumed that unless stated otherwise that the probabilistic definition provided here is to be used when confidence values are discussed.

Note, however, other definitions of confidence values are within the scope of the present invention that may be more general than probabilities, and/or that have different ranges other than [0, 1]. For example, one such alternative is that each such confidence value is in the range −1.0 to 1.0, wherein the larger the value, the greater the perceived likelihood that the target MS 140 is in (or at) a corresponding MS location estimate of the location hypothesis to which the confidence value applies. As an aside, note that a location hypothesis may have more than one MS location estimate (as will be discussed in detail below) and the confidence value will typically only correspond or apply to one of the MS location estimates in the location hypothesis. Further, values for the confidence value field may be interpreted as: (a) −1.0 may be interpreted to mean that the target MS 140 is NOT in such a corresponding MS area estimate of the location hypothesis area, (b) 0 may be interpreted to mean that it is unknown as to the likelihood of whether the MS 140 in the corresponding MS area estimate, and (c) +1.0 may be interpreted to mean that the MS 140 is perceived to positively be in the corresponding MS area estimate.

Additionally, note that it is within the scope of the present invention that the location hypothesis data structure may also include other related "perception" measurements related to a likelihood of the target MS 140 being in a particular MS location area estimate. For example, it is within the scope of the present invention to also utilize measurements such as, (a) "sufficiency factors" for indicating the likelihood that an MS location estimate of a location hypothesis is sufficient for locating the target MS 140; (b) "necessity factors" for indicating the necessity that the target MS be in an particular area estimate. However, to more easily describe the present invention, a single confidence field is used having the interpretation given above.

Additionally, in utilizing location hypotheses in, for example, the location evaluator 1228 as in (23.4) above, it is important to keep in mind that each location hypothesis confidence value is a relative measurement. That is, for confidences, $cf_1$ and $cf_2$, if $cf_1 \leftarrow cf_2$, then for a location hypotheses $H_1$ and $H_2$ having $cf_1$ and $cf_2$, respectively, the target MS 140 is expected to more likely reside in a target MS estimate of $H_2$ than a target MS estimate of $H_1$. Moreover, if an area, A, is such that it is included in a plurality of location hypothesis target MS estimates, then a confidence score, $CS_A$, can be assigned to A, wherein the confidence score for such an area is a function of the confidences for all the location hypotheses whose (most pertinent) target MS location estimates contain A. That is, in order to determine a most likely target MS location area estimate for outputting from the location center 142, a confidence score is determined for areas within the location center service area. More particularly, if a function, "f", is a function of the confidence(s) of location hypotheses, and f is a monotonic function in its parameters and $f(cf_1, cf_2, cf_3, \ldots, cf_N) = CS_A$ for confidences $cf_i$ of location hypotheses $H_i$, $i=1,2,\ldots,N$, with A confined in the area estimate for $H_i$, then "f" is denoted a confidence score function. Accordingly, there are many embodiments for a confidence score function that may be utilized in computing confidence scores with the present invention; e.g., where $\Sigma$ is the summation of corresponding terms i=1 to N:

(a) $f(cf_1, cf_2, \ldots, cf_N) = \Sigma cf_i = CS_A$;

(b) $f(cf_1, cf_2, \ldots, cf_N) = \Sigma cf_i^n = CS_A$, n=1, 2, 3, 4, 5, . . . ;

(c) $f(cf_1, cf_2, \ldots, cf_N) = \Sigma(K_i * cf_i) = CS_A$, wherein $K_i$, i=1, 2, . . . N are positive system (tunable) constants (possibly dependent on environmental characteristics such as topography, time, date, traffic, weather, and/or the type of base station(s) 122 from which location signatures with the target MS 140 are being generated, etc.).

For the present description of the invention, the function f as defined in (c) immediately above is utilized. However, for obtaining a general understanding of the present invention, the simpler confidence score function of (a) may be more useful. It is important to note, though, that it is within the scope of the present invention to use other functions for the confidence score function.

Coverage Area: Area Types And Their Determination

The notion of "area type" as related to wireless signal transmission characteristics has been used in many investigations of radio signal transmission characteristics. Some investigators, when investigating such signal characteristics of areas have used somewhat naive area classifications such as urban, suburban, rural, etc. However, it is desirable for the purposes of the present invention to have a more operational definition of area types that is more closely associated with wireless signal transmission behaviors.

To describe embodiments of the an area type scheme used in the present invention, some introductory remarks are first provided. Note that the wireless signal transmission behavior for an area depends on at least the following criteria:

(23.8.1) substantially invariant terrain characteristics (both natural and man-made) of the area; e.g., mountains, buildings, lakes, highways, bridges, building density;

(23.8.2) time varying environmental characteristics (both natural and man-made) of the area; e.g., foliage, traffic, weather, special events such as baseball games;

(23.8.3) wireless communication components or infracture in the area; e.g., the arrangement and signal communication characteristics of the base stations 122 in the area (e.g., base station antenna downtilt). Further, the antenna characteristics at the base stations 122 may be important criteria.

Accordingly, a description of wireless signal characteristics for determining area types could potentially include a characterization of wireless signaling attributes as they relate to each of the above criteria. Thus, an area type might be: hilly, treed, suburban, having no buildings above 50 feet, with base stations spaced apart by two miles. However, a categorization of area types is desired that is both more closely tied to the wireless signing characteristics of the area, and is capable of being computed substantially automatically and repeatedly over time. Moreover, for a wireless location system, the primary wireless signaling characteristics for categorizing areas into at least minimally similar area types are: thermal noise and, more importantly, multipath characteristics (e.g., multipath fade and time delay).

Focusing for the moment on the multipath characteristics, it is believed that (23.8.1) and (23.8.3) immediately above are, in general, more important criteria for accurately locating an MS 140 than (23.8.2). That is, regarding (23.8.1), multipath tends to increase as the density of nearby vertical area changes increases. For example, multipath is particularly problematic where there is a high density of high rise buildings and/or where there are closely spaced geographic undulations. In both cases, the amount of change in vertical area per unit of area in a horizontal plane (for some horizontal reference plane) may be high. Regarding (23.8.3), the greater the density of base stations 122, the less problematic multipath may become in locating an MS 140. Moreover, the arrangement of the base stations 122 in the radio coverage area 120 in FIG. 4 may affect the amount and severity of multipath.

Accordingly, it would be desirable to have a method and system for straightforwardly determining area type classifications related to multipath, and in particular, multipath due to (23.8.1) and (23.8.3). The present invention provides such a determination by utilizing a novel notion of area type, hereinafter denoted "transmission area type" (or, "area type" when both a generic area type classification scheme and the transmission area type discussed hereinafter are intended) for classifying "similar" areas, wherein each transmission area type class or category is intended to describe an area having at least minimally similar wireless signal transmission characteristics. That is, the novel transmission area type scheme of the present invention is based on: (a) the terrain area classifications; e.g., the terrain of an area surrounding a target MS 140, (b) the configuration of base stations 122 in the radio coverage area 120, and (c) characterizations of the wireless signal transmission paths between a target MS 140 location and the base stations 122.

In one embodiment of a method and system for determining such (transmission) area type approximations, a partition (denoted hereinafter as $P_0$) is imposed upon the radio coverage area 120 for partitioning for radio coverage area into subareas, wherein each subarea is an estimate of an area having included MS 140 locations that are likely to have is at least a minimum amount of similarity in their wireless signaling characteristics. To obtain the partition $P_0$ of the radio coverage area 120, the following steps are performed:

(23.8.4.1) Partition the radio coverage area 120 into subareas, wherein in each subarea is:
(a) connected, (b) the subarea is not too oblong, e.g., the variations in the lengths of chords sectioning the subarea through the centroid of the subarea are below a predetermined threshold, (c) the size of the subarea is below a predetermined value, and (d) for most locations (e.g., within a first or second deviation) within the subarea whose wireless signaling characteristics have been verified, it is likely (e.g., within a first or second deviation) that an MS 140 at one of these locations will detect (forward transmission path) and/or will be detected (reverse transmission path) by a same collection of base stations 122. For example, in a CDMA context, a first such collection may be (for the forward transmission path) the active set of base stations 122, or, the union of the active and candidate sets, or, the union of the active, candidate and/or reman sets of base stations 122 detected by "most" MSs 140 in. Additionally (or alternatively), a second such collection may be the base stations 122 that are expected to detect MSs 140 at locations within the subarea. Of course, the union or intersection of the first and second collections is also within the scope of the present invention for partitioning the radio coverage area 120 according to (d) above. It is worth noting that it is believed that base station 122 power levels will be substantially constant. However, even if this is not the case, one or more collections for (d) above may be determined empirically and/or by computationally simulating the power output of each base station 122 at a predetermined level. Moreover, it is also worth mentioning that this step is relatively straightforward to implement using the data stored in the location signature data base 1320 (i.e., the verified location signature clusters discussed in detail hereinbelow). Denote the resulting partition here as $P_1$.

(23.8.4.2) Partition the radio coverage area 120 into subareas, wherein each subarea appears to have substantially homogeneous terrain characteristics. Note, this may be performed periodically substantially automatically by scanning radio coverage area images obtained from aerial or satellite image. For example, EarthWatch Inc. of Longmont, Co. can provide geographic with 3 meter resolution from satellite imaging data. Denote the resulting partition here as $P_2$.

(23.8.4.3) Overlay both of the above partitions, $P_1$ and $P_2$ of the radio coverage area 120 to obtain new subareas that are intersections of the subareas from each of the above partitions. This new partition is $P_0$ (i.e., $P_0 = P_1$ intersect $P_2$), and the subareas of it are denoted as "$P_0$ subareas".

Now assuming $P_0$ has been obtained, the subareas of $P_0$ are provided with a first classification or categorization as follows:

(23.8.4.4) Determine an area type categorization scheme for the subareas of $P_1$. For example, a subarea, A, of $P_1$, may be categorized or labeled according to the number of base stations 122 in each of the collections used in (23.8.4.1)(d) above for determining subareas of $P_1$. Thus, in one such categorization scheme, each category may correspond to a single number x (such as 3), wherein for a subarea, A, of this category, there is a group of x (e.g., three) base stations 122 that are expected to be detected by a most target MSs 140 in the area A. Other embodiments are also possible, such as a categorization scheme wherein each category may correspond to a triple: of numbers such as (5, 2, 1), wherein for a subarea A of this category, there is a common group of 5 base stations 122 with two-way signal detection expected with most locations (e.g., within a first or second deviation) win A, there are 2 base stations that are expected to be detected by a target MS 140 in A but these base stations can not detect the target MS, and there is one base station 122 that is expected to be able to detect a target MS in A but not be detected.

(23.8.4.5) Determine an area type categorization scheme for the subareas of $P_2$. Note that the subareas of $P_2$ may be categorized according to their similarities. In one embodiment, such categories may be somewhat similar to the naive area types mentioned above (e.g., dense urban, urban, suburban, rural, mountain, etc.). However, it is also an aspect of the present invention that more precise categorizations may be used, such as a category for all areas having between 20,000 and 30,000 square feet of vertical area change per 11,000 square feet of horizontal area and also having a high traffic volume (such a category likely corresponding to a "moderately dense urban" area type).

(23.8.4.6) Categorize subareas of $P_0$ with a categorization scheme denoted the "$P_0$ categorization," wherein for each $P_0$ subarea, A, a "$P_0$ area type" is determined for A according to the following substep(s):

(a) Categorize A by the two categories from (23.8.4.4) and (23.8.5) with which it is identified. Thus, A is categorized (in a corresponding $P_0$ area type) both according to its terrain and the base station infrastucture configuration in the radio coverage area 120.

(23.8.4.7) For each $P_0$ subarea, A, of $P_0$ perform the following step(s):

(a) Determine a centroid, C(A), for A;

(b) Determine an approximation to a wireless transmission path between C(A) and each base station 122 of a predetermined group of base stations expected to be in (one and/or two-way) signal communication with most target MS 140 locations in A. For example, one such approximation is a straight line between C(A) and each of the base stations 122 in the group. However, other such approximations are within the scope of the present invention, such as, a generally triangular shaped area as the transmission path, wherein a first vertex of this area is at the corresponding base station for the transmission path, and the sides of the generally triangular shaped defining the first vertex have a smallest angle between them that allows A to be completely between these sides.

(c) For each base station 122, $BS_i$, in the group mentioned in (b) above, create an empty list, $BS_i$-list, and put on this list at least the $P_0$ area types for the "significant" $P_0$ subareas crossed by the transmission path between C(A) and $BS_i$. Note that "significant" $P_0$ subareas may be defined as, for example, the $P_0$ subareas through which at least a minimal length of the transmission path traverses. Alternatively, such "significant" $P_0$ subareas may be defined as those $P_0$ subareas that additionally are know or expected to generate substantial multipath.

(d) Assign as the transmission area type for A as the collection of $BS_i$-lists. Thus, any other $P_0$ subarea having the same (or substantially similar) collection of lists of $P_0$ area types will be viewed as having approximately the same radio transmission characteristics.

Note that other transmission signal characteristics may be incorporated into the transmission area types. For example, thermal noise characteristics may be included by providing a third radio coverage area 120 partition, $P_3$, in addition to the partitions of $P_1$ and $P_2$ generated in (23.8.4.1) and (23.8.4.2) respectively. Moreover, the time varying characteristics of (23.8.2) may be incorporated in the transmission area type frame work by generating multiple versions of the transmission area types such that the transmission area type for a given subarea of $P_0$ may change depending on the combination of time varying environmental characteristics to be considered in the transmission area types. For instance, to account for seasonality, four versions of the partitions $P_1$ and $P_2$ may be generated, one for each of the seasons, and subsequently generate a (potentially) different partition $P_0$ for each season. Further, the type and/or characteristics of base station 122 antennas may also be included in an embodiment of the transmission area type.

Other embodiments of area types are also within the scope of the present invention. As mentioned above, each of the first order models 1224 have default confidence values associated therewith, and these confidence values may be probabilities. More precisely, such probability confidence values can be determined as follows. Assume there is a partition of the coverage area into subareas, each subarea being denoted a "partition area." For each partition area, activate each first order model 1224 with historical location data in the Location Signature Data Base 1320 (FIG. 6), wherein the historical location data has been obtained from corresponding known mobile station locations in the partition area. For each first order model, determine a probability of the first order model generating a location hypothesis whose location estimate contains the corresponding known mobile station location. To accomplish this, assume the coverage area is partitioned into partition areas A, wherein each partition area A is specified as the collection of coverage area locations such that for each location, the detected wireless transmissions between the network base stations and a target mobile station at the location can be straightforwardly equated with other locations of area A. For example, one such partition, $P_0$, can be defined wherein each partition area A is specified in terms of three sets of base station identifiers, namely, (a) the base station identifiers of the base stations that can be both detected at each location of A and can detect a target mobile station at each location, (b) the identifiers for base stations that can detect a target mobile station at each location of A, but can not be detected by the target mobile station and (c) the identifiers for base stations that can be detected by a target mobile station at each location of A, but these base stations can not detect the target mobile station. That is, two locations, $l_1$ and $l_2$. are identified as being in A if and only if the three sets of (a), (b), and (c) for $l_1$ are, respectively, identical to the three sets of (a), (b), and (c) for $l_2$.

Accordingly, assuming the partition $P_0$ is used, a description can be given as to how probabilities may be assigned as the confidence values of location hypotheses generated by the first order models 1224. For each partition area A, a first order model 1224 is supplied with wireless measurements of archived location data in the Location Signature Data Base associated with corresponding verified mobile station locations. Thus, a probability can be determined as to how likely the first order model is to generate a location hypothesis having a location estimate containing the corresponding verified mobile station location. Accordingly, a table of partition area probabilities can be determined for each first order model 1224. Thus, when a location hypothesis is generated and identified as belonging to one of the partition areas, the corresponding probability for that partition area may be assigned as the confidence value for the location hypothesis. The advantages to using actual probabilities here is that, as will be discussed below, the most likelihood estimator 1344 can compute a straightforward probability for each distinct intersection of the multiple location hypotheses generated by the multiple first order models, such that each such probability indicates a likelihood that the target mobile station is in the corresponding intersection.

Location Information Data Bases And Data
Location Data Bases Introduction

It is an aspect of the present invention that MS location processing performed by the location center 142 should become increasingly better at locating a target MS 140 both by (a) building an increasingly more detailed model of the signal characteristics of locations in the service area for the present invention, and also (b) by providing capabilities for the location center processing to adapt to environmental changes.

One way these aspects of the present invention are realized is by providing one or more data base management systems and data bases for (a) storing and associating wireless MS signal characteristics with known locations of MSs 140 used in providing the signal characteristics. Such stored associations may not only provide an increasingly better model of the signal characteristics of the geography of the service area, but also provide an increasingly better model of more changeable signal characteristic affecting environmental factors such as weather, seasons, and/or traffic patterns;

(b) adaptively updating the signal characteristic data stored so that it reflects changes in the environment of the service area such as, for example, a new high rise building or a new highway.

Referring again to FIG. 5 of the collective representation of these data bases is the location information data bases 1232. Included among these data bases is a data base for providing training and/or calibration data to one or more trainable/calibratable FOMs 1224, as well as an archival data base for archiving historical MS location information related to the performance of the FOMs. These data bases will be discussed as necessary hereinbelow. However, a further brief introduction to the archival data base is provided here. Accordingly, the term, "location signature data base" is used hereinafter to denote the archival data base and/or data base management system depending on the context of the discussion. The location signature data base (shown in, for example, FIG. 6 and labeled 1320) is a repository for wireless signal characteristic data derived from wireless signal communications between an MS 140 and one or more base stations 122, wherein the corresponding location ofthe MS 140 is known and also stored in the location signature data base 1320. More particularly, the location signature data base 1320 associates each such known MS location with the wireless signal characteristic data derived from wireless signal communications between the MS 140 and one or more base stations 122 at this MS location. Accordingly, it is an aspect of the present invention to utilize such historical MS signal location data for enhancing the correctness and/or confidence of certain location hypotheses as will be described in detail in other sections below.

Data Representations for the Location Signature Data Base

There are four fundamental entity types (or object classes in an object oriented programming paradigm) utilized in the location signature data base 1320. Briefly, these data entities are described in the items (24.1) through (24.4) that follow:

(24.1) (verified) location signatures: Each such (verified) location signature describes the wireless signal characteristic measurements between a given base station (e.g., BS 122 or LBS 152) and an MS 140 at a (verified or known) location associated with the (verified) location signature. That is, a verified location signature corresponds to a location whose coordinates such as latitude-longitude coordinates are known, while simply a location signature may have a known or unknown location corresponding with it. Note that the term (verified) location signature is also denoted by the abbreviation, "(verified) loc sig" hereinbelow;

(24.2) (verified) location signature clusters: Each such (verified) location signature cluster includes a collection of (verified) location signatures corresponding to all the location signatures between a target MS 140 at a (possibly verified) presumed substantially stationary location and each BS (e.g., 122 or 152) from which the target MS 140 can detect the BS's pilot channel regardless of the classification of the BS in the target MS (i.e., for CDMA, regardless of whether a BS is in the MS's active, candidate or remaining base station sets, as one skilled in the art will understand). Note that for simplicity here, it is presumed that each location signature cluster has a single fixed primary base station to which the target MS 140 synchronizes or obtains its timing;

(24.3) "composite location objects (or entities)": Each such entity is a more general entity than the verified location signature cluster. An object of this type is a collection of (verified) location signatures that are associated with the same MS 140 at substantially the same location at the same time and each such loc sig is associated with a different base station. However, there is no requirement that a loc sig from each BS 122 for which the MS 140 can detect the BS's pilot channel is included in the "composite location object (or entity)"; and (24.4) MS location estimation data that includes MS location estimates output by one or more MS location estimating first order models 1224, such MS location estimate data is described in detail hereinbelow.

It is important to note that a loc sig is, in one embodiment, an instance of the data structure containing the signal characteristic measurements output by the signal filtering and normalizing subsystem also denoted as the signal processing subsystem 1220 describing the signals between: (i) a specific base station 122 (BS) and (ii) a mobile station 140 (MS), wherein the BS's location is known and the MS's location is assumed to be substantially constant (during a 2–5 second interval in one embodiment of the present invention), during communication with the MS 140 for obtaining a single instance of loc sig data, although the MS location may or may not be known Further, for notational purposes, the BS 122 and the MS 140 for a loc sig hereinafter will be denoted the "BS associated with the loc sig", and the "MS associated with the loc sig" respectively. Moreover, the location of the MS 140 at the time the loc sig data is obtained will be denoted the "location associated with the loc sig" (this location possibly being unknown).

Note that additional description of this aspect of the present invention can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the location signature data base 1320.

Location Center Architecture
Overview of Location Center Functional Components

FIG. 5 presents a high level diagram of the location center 142 and the location engine 139 in the context of the infrastructure for the entire location system of the present invention.

It is important to note that the architecture for the location center 142 and the location engine 139 provided by the present invention is designed for extensibility and flexibility so that MS 140 location accuracy and reliability may be enhanced as further location data become available and as enhanced MS location techniques become available. In addressing the design goals of extensibility and flexibility, the high level architecture for generating and processing MS location estimates may be considered as divided into the following high level functional groups described hereinbelow.

Low Level Wireless Signal Processing Subsystem for Receiving and Conditioning Wireless Signal Measurements A first functional group of location engine 139 modules is for performing signal processing and filtering of MS location signal data received from a conventional wireless (e.g., CDMA) infrastructure, as discussed in the steps (23.1) and (23.2) above. This group is denoted the signal processing subsystem 1220 herein One embodiment of such a subsystem is described in the U.S. copending patent application titled, "Wireless Location Using A Plurality of Commercial Network Infrastructures," by F. W LeBlanc, Dupray and Karr filed Jan. 22, 1999 and having application Ser. No. 09/230,109. Note that this copending patent application is incorporated herein entirely by reference since it may contain essential material for the present invention. In particular, regarding the signal processing subsystem 20. However, various other portions of this copending patent application may also provide essential material for the present invention.

Initial Location Estimators: First Order Models

Figure 8:
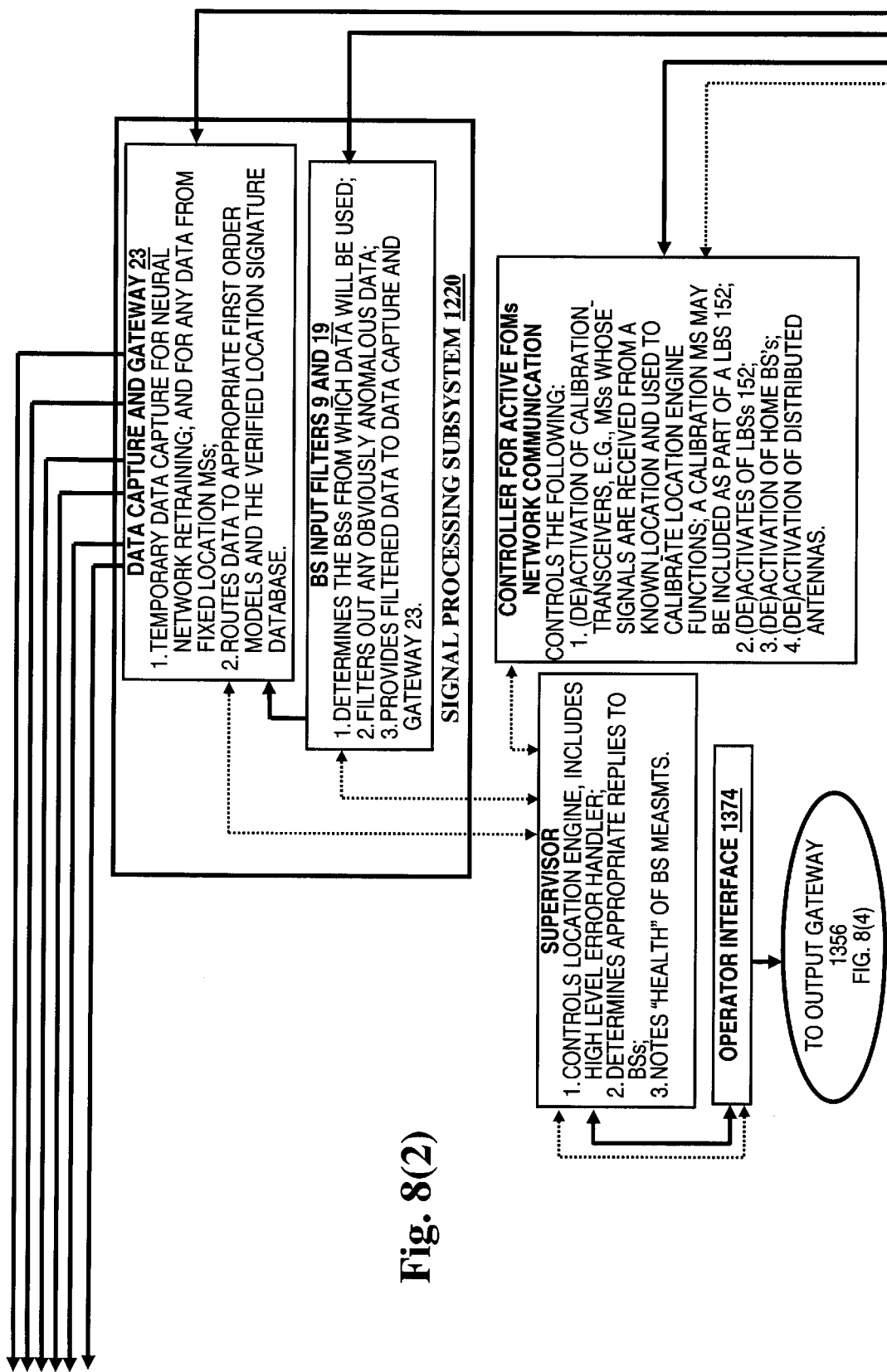
FIGS. 8(1), 8(2), 8(3) and 8(4) are a substantially comprehensive high level block diagram illustrating data and control flows between the components of the location center, as well the functionality of the components.
Figure 8:
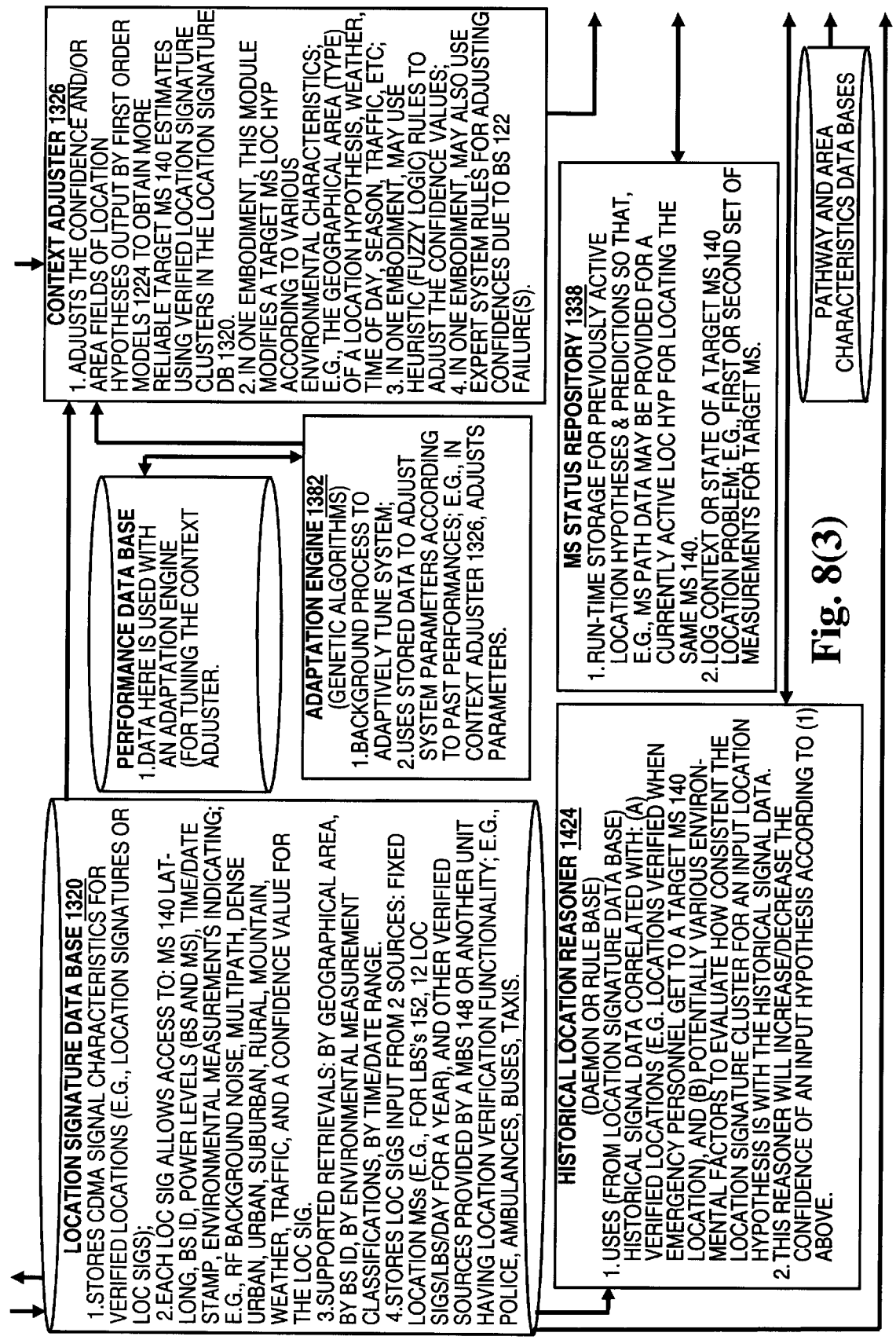
Figure 8:
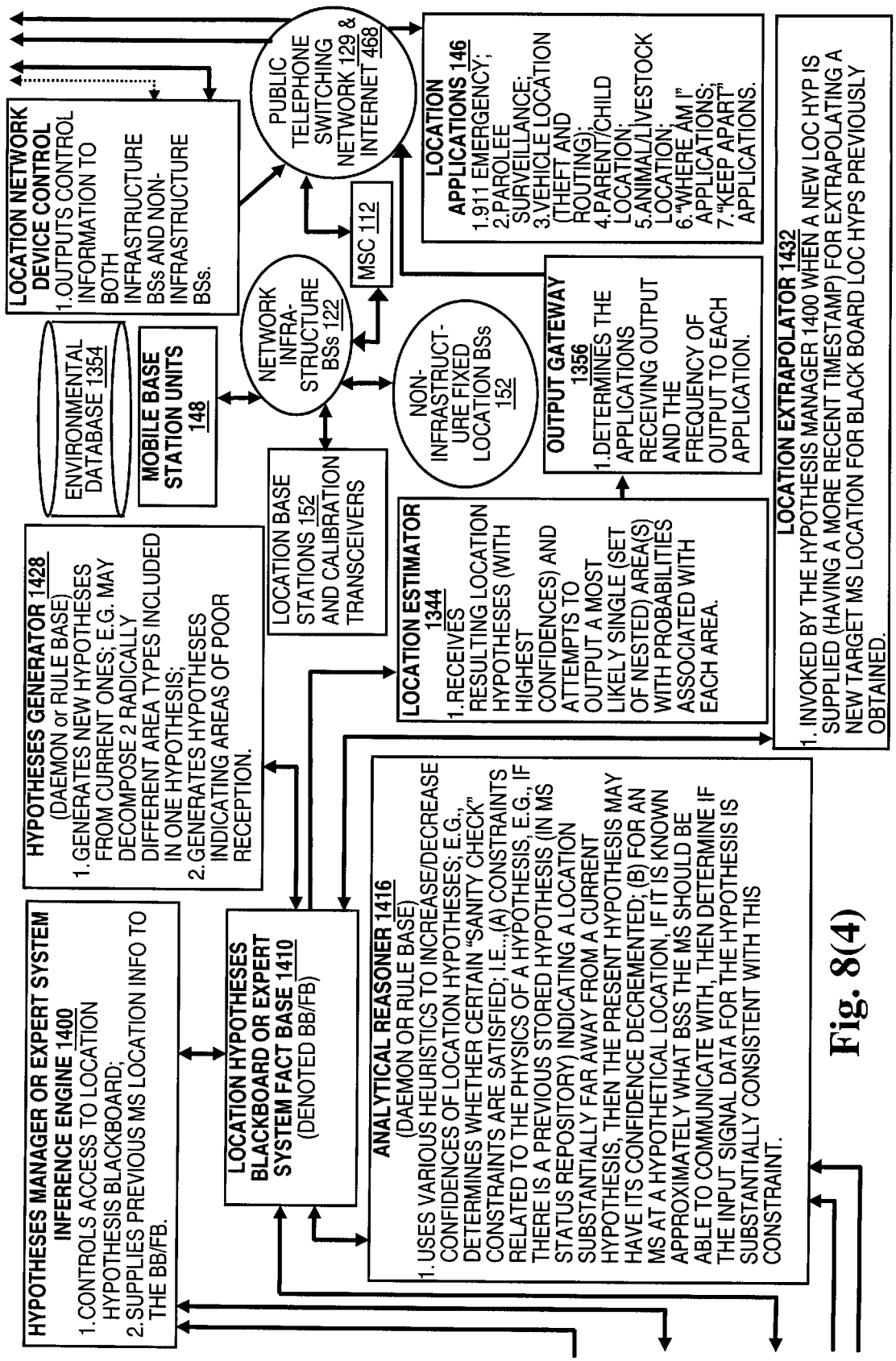
Figure 10:
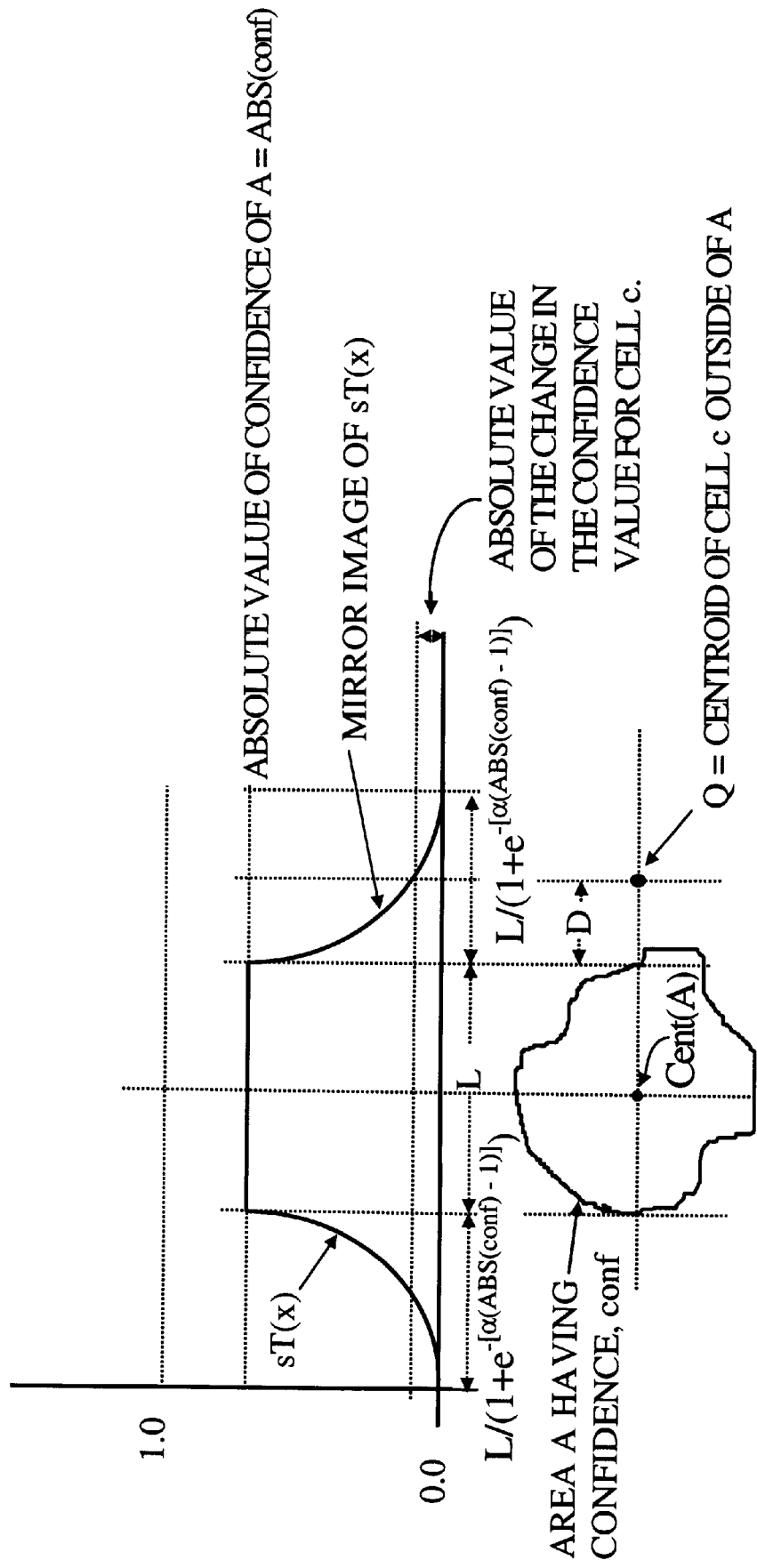
FIG. 10 is a graphical illustration of the computation performed by the most likelihood estimator 1344 of the hypothesis evaluator.

A second functional group of location engine 139 modules is for generating various target MS 140 location initial estimates, as described in step (23.3). Accordingly, the modules here use input provided by the signal processing subsystem 1220. This second functional group includes one or more signal analysis modules or models, each hereinafter denoted as a first order model 1224 (FOM), for generating location hypotheses for a target MS 140 to be located. Note that it is intended that each such FOM 1224 use a different technique for determining a location area estimate for the target MS 140. A brief description of some types of first order models is provided immediately below. Note that FIG. 8 illustrates another, more detail view of the location system for the present invention. In particular, this figure illustrates some of the FOMs 1224 contemplated by the present invention, and additionally illustrates the primary communications with other modules of the location system for the present invention. However, it is important to note that the present invention is not limited to the FOMs 1224 shown and discussed herein. That is, it is a primary aspect of the present invention to easy incorporate FOMs using other signal processing and/or computational location estimating techniques than those presented herein. Further, note that each FOM type may have a plurality of its models incorporated into an embodiment of the present invention.

For example, (as will be described in further detail below), one such type of model or FOM 1224 (hereinafter models of this type are referred to as "distance models") may be based on a range or distance computation and/or on a base station signal reception angle determination between the target MS 140 from each of one or more base stations. Basically, such distance models 1224 determine a location estimate of the target MS 140 by determining a distance offset from each of one or more base stations 122, possibly in a particular direction from each (some of) the base stations, so that an intersection of each area locus defined by the base station offsets may provide an estimate of the location of the target MS. Distance model FOMs 1224 may compute such offsets based on:

(a) signal timing measurements between the target mobile station 140 and one or more base stations 122; e.g., timing measurements such as time difference of arrival (TDOA), or time of arrival (TOA). Note that both forward and reverse signal path timing measurements may be utilized;

(b) signal strength measurements (e.g., relative to power control settings of the MS 140 and/or one or more BS 122); and/or (c) signal angle of arrival measurements, or ranges thereof at one or more base stations 122 (such angles and/or angular ranges provided by, e.g., base station antenna sectors having angular ranges of 120° or 60°, or, so called "SMART antennas" with variable angular transmission ranges of 2° to 120°.

Accordingly, a distance model may utilize triangulation or trilateration to compute a location hypothesis having either an area location or a point location for an estimate of the target MS 140. Additionally, in some embodiments location hypothesis may include an estimated error Another type of FOM 1224 is a statistically based first order model 1224, wherein a statistical technique, such as regression techniques (e.g., least squares, partial least squares, principle decomposition), or e.g., Bollenger Bands (e.g., for computing minimum and max base station offsets). In general, models of this type output location hypotheses determined by performing one or more statistical techniques or comparisons between the verified location signatures in location signature data base 1320, and the wireless signal measurements from a target MS. Models of this type are also referred to hereinafter as a "stochastic signal (first order) model" or a "stochastic FOM" or a "statistical model."

Still another type of FOM 1224 is an adaptive learning model, such as an artificial neural net or a genetic algorithm, wherein the FOM may be trained to recognize or associate each of a plurality of locations with a corresponding set of signal characteristics for communications between the target MS 140 (at the location) and the base stations 122. Moreover, typically such a FOM is expected to accurately interpolate/extrapolate target MS 140 location estimates from a set of signal characteristics from an unknown target MS 140 location Models of this type are also referred to hereinafter variously as "artificial neural net models" or "neural net models" or "trainable models" or "learning models." Note that a related type of FOM 1224 is based on pattern recognition. These FOMs can recognize patterns in the signal characteristics of communications between the target MS 140 (at the location) and the base stations 122 and thereby estimate a location area of the target MS. However, such FOMs may not be trainable.

Yet another type of FOM 1224 can be based on a collection of dispersed low power, low cost fixed location wireless transceivers (also denoted "location base stations 152" hereinabove) that are provided for detecting a target MS 140 in areas where, e.g., there is insufficient base station 122 infrastucture coverage for providing a desired level of MS 140 location accuracy. For example, it may uneconomical to provide high traffic wireless voice coverage of a typical wireless base station 122 in a nature preserve or at a fair ground that is only populated a few days out of the year. However, if such low cost location base stations 152 can be directed to activate and deactivate via the direction of a FOM 1224 ofthe present type, then these location base stations can be used to both location a target MS 140 and also provide indications of where the target MS is not. For example, if there are location base stations 152 populating an area where the target MS 140 is presumed to be, then by activating these location base stations 152, evidence may be obtained as to whether or not the target MS is actually in the area; e.g., if the target MS 140 is detected by a location base station 152, then a corresponding location hypothesis having a location estimate corresponding to the coverage area of the location base station may have a very high confidence value. Alternatively, if the target MS 140 is not detected by a location base station 152, then a corresponding location hypothesis having a location estimate corresponding to the coverage area of the location base station may have a very low confidence value. Models of this type are referred to hereinafter as "location base station models."

Yet another type of FOM 1224 can be based on input from a mobile base station 148, wherein location hypotheses may be generated from target MS 140 location data received from the mobile base station 148.

Still other types of FOM 1224 can be based on various techniques for recognizing wireless signal measurement patterns and associating particular patterns with locations in the coverage area 120. For example, artificial neural networks or other learning models can used as the basis for various FOMs.

Note that the FOM types mentioned here as well as other FOM types are discussed in detail hereinbelow. Moreover, it is important to keep in mind that in one embodiment of the present invention, the substantially simultaneous use or activation of a potentially large number of such first order models 1224, is able to enhance both the reliability of location estimates and the accuracy of such estimates. Additionally, note that in some embodiments of the present invention, the first order models 1224 can be activated when appropriate signal measurements are obtained. For example, a TDOA FOM may be activated when only a single signal time delay measurement is obtained from some plurality of base station 122. However, if, for instance, additional time delay values are obtained (and assuming such additional values are necessary), then one or more wireless signal pattern matching FOM may also be activated in conjunction with the TDOA FOM. Additionally, a FOM using satellite signals (e.g., GPS) to perform a triangulation may be activated whenever appropriate measurements are received regardless of whether additional FOMs are capable of being substatially simultaneously activated or not. Accordingly, since such satellite signal FOMs are generally more accurate, output from such a FOM may dominate any other previous or simultaneous estimates unless there is evidence to the contrary.

Moreover, the present invention provides a framework for incorporating MS location estimators to be subsequently provided as new FOMs in a straightforward manner. For example, a FOM 1224 based on wireless signal time delay measurements from a distributed antenna system for wireless communication may be incorporated into the present invention for locating a target MS 140 in an enclosed area serviced by the distributed antenna system. Accordingly, by using such a distributed antenna FOM, the present invention may determine the floor of a multi-story building from which a target MS is transmitting. Thus, MSs 140 can be located in free dimensions using such a distributed antenna FOM. Additionally, FOMs for detecting certain registration changes within, for example, a public switched telephone network can also be used for locating a target MS 140. For example, for some MSs 140 there may be an associated or dedicated device for each such MS that allows the MS to function as a cordless phone to a line based telephone network when the device detects that the MS is within signaling range. In one use of such a device (also denoted herein as a "home base station"), the device registers with a home location register of the public switched telephone network when there is a status change such as from not detecting the corresponding MS to detecting the MS, or visa versa, as one skilled in the art will understand. Accordingly, by providing a FOM that accesses the MS status in the home location register, the location engine 139 can determine whether the MS is within signaling range of the home base station or not, and generate location hypotheses accordingly. Moreover, other FOMs based on, for example, chaos theory and/or fractal theory are also within the scope of the present invention.

It is important to note the following aspects of the present invention relating to FOMs 1224:

(28.1) Each such first order model 1224 may be relatively easily incorporated into and/or removed from the present invention. For example, assuming that the signal processing subsystem 1220 provides uniform input to the FOMS, and there is a uniform FOM output interface, it is believed that a large majority (if not substatially all) viable MS location estimation strategies may be accommodated. Thus, it is straightforward to add or delete such FOMs 1224.

(28.2) Each such first order model 1224 may be relatively simple and still provide significant MS 140 locating functionality and predictability. For example, much of what is believed to be common or generic MS location processing has been coalesced into, for example: a location hypothesis evaluation subsystem, denoted the hypotheses evaluator 1228 and described immediately below. Thus, the present invention is modular and extensible such that, for example, (and importantly) different first order models 1224 may be utilized depending on the signal transmission characteristics of the geographic region serviced by an embodiment of the present invention. Thus, a simple configuration of the present invention may have a small number of FOMs 1224 for a simple wireless signal environment (e.g., flat terrain, no urban canyons and low population density). Alternatively, for complex wireless signal environments such as in cities like San Francisco, Tokyo or New York a large number of FOMs 1224 may be simultaneously utilized for generating MS location hypotheses.

An Introduction to an Evaluator for Location Hypotheses: Hypothesis Evaluator

A third functional group of location engine 139 modules evaluates location hypotheses output by the first order models 1224 and thereby provides a "most likely" target MS location estimate. The modules for this functional group are collectively denoted the hypothesis evaluator 1228.

Hypothesis Evaluator

A primary purpose of the hypothesis evaluator 1228 is to mitigate conflicts and ambiguities related to location hypotheses output by the first order models 1224 and thereby output a "most likely" estimate of an MS for which there is a request for it to be located. In providing this capability, there are various related embodiments of the hypothesis evaluator that are within the scope of the present invention. Since each location hypothesis includes both an MS location area estimate and a corresponding confidence value indicating a perceived confidence or likelihood of the target MS being within the corresponding location area estimate, there is a monotonic relationship between MS location area estimates and confidence values. That is, by increasing an MS location area estimate, the corresponding confidence value may also be increased (in an extreme case, the location area estimate could be the entire coverage area 120 and thus the confidence value may likely correspond to the highest level of certainty i.e., +1.0). Accordingly, given a target MS location area estimate (of a location hypothesis), an adjustment to its accuracy may be performed by adjusting the MS location area estimate and/or the corresponding confidence value. Thus, if the confidence value is, for example, excessively low then the area estimate may be increased as a technique for increasing the confidence value. Alternatively, if the estimated area is excessively large, and there is flexibility in the corresponding confidence value, then the estimated area may be decreased and the confidence value also decreased. Thus, if at some point in the processing of a location hypothesis, if the location hypothesis is judged to be more (less) accurate than initially determined, then (i) the confidence value of the location hypothesis may be increased (decreased), and/or (ii) the MS location area estimate can be decreased (increased). Moreover, note that when the confidence values are probabilities, such adjustments are may require the reactivation of one or more FOMs 1224 with requests to generate location hypotheses having location estimates of different sizes. Alternatively, adjuster modules 1436 and/or 1440 (FIG. 16 discussed hereinbelow) may be invoked for generating location hypotheses having area estimates of different sizes. Moreover, the confidence value on such an adjusted location hypothesis (actually a new location hypothesis corresponding to the originally generated hypothesis) may also be a probability in that combinations of FOMs 1224 and adjuster modules 1436 and 1440 can also be calibrated for thereby yielding probabilities as confidence values to the resulting location hypotheses.

In a first class of embodiments (typically wherein the confidence values are not maintained as probabilities), the hypothesis evaluator 1228 evaluates location hypotheses and adjusts or modifies only their confidence values for MS location area estimates and subsequently uses these MS location estimates with the adjusted confidence values for determining a "most likely" MS location estimate for outputting. Alternatively, in a second class of embodiments for the hypothesis evaluator 1228 (also typically wherein the confidence values are not maintained as probabilities), MS location area estimates can be adjusted wile confidence values remain substantially fixed. However, in one preferred embodiment of the present embodiment, both location hypothesis area estimates and confidence values are modified.

The hypothesis evaluator 1228 may perform any or most of the following tasks depending on the embodiment of the hypothesis evaluator. That is, (30.1) it may enhance the accuracy of an initial location hypothesis generated by an FOM by using the initial location hypothesis as, essentially, a query or index into the location signature data base 1320 for obtaining one or more corresponding enhanced location hypotheses, wherein the enhanced location hypotheses have both an adjusted target MS location area estimates and an adjusted confidences based on past performance of the FOM in the location service surrounding the target MS location estimate of the initial location hypothesis;

Additionally, for embodiments of the hypothesis evaluator 1228 wherein the confidence values for location hypotheses are not maintained as probabilities, the following additional tasks (30.2) through (30.7) may be performed:

(30.2) the hypothesis evaluator 1228 may utilize environmental information to improve and reconcile location hypotheses supplied by the first order models 1224. A basic premise in this context is that the accuracy of the individual first order models may be affected by various environmental factors such as, for example, the season of the year, the time of day, the weather conditions, the presence of buildings, base station failures, etc.;

(30.3) the hypothesis evaluator 1228 may determine how well the associated signal characteristics used for locating a target MS compare with particular verified loc sigs stored in the location signature data base 1320 (see the location signature data base section for further discussion regarding this aspect of the invention). That is, for a given location hypothesis, verified loc sigs (which were previously obtained from one or more verified locations of one or more MS's) are retrieved for an area corresponding to the location area estimate of the location hypothesis, and the signal characteristics of these verified loc sigs are compared with the signal characteristics used to generate the location hypothesis for determining their similarities and subsequently an adjustment to the confidence of the location hypothesis (and/or the size of the location area estimate);

(30.4) the hypothesis evaluator 1228 may determine if (or how well) such location hypotheses are consistent with well known physical constraints such as the laws of physics. For example, if the difference between a previous (most likely) location estimate of a target MS and a location estimate by a current location hypothesis requires the MS to:

(a1) move at an unreasonably high rate of speed (e.g., 200 mph), or (b1) move at an unreasonably high rate of speed for an area (e.g., 80 mph in a corn patch), or (c1) make unreasonably sharp velocity changes (e.g., from 60 mph in one direction to 60 mph in the opposite direction in 4 sec), then the confidence in the current Location Hypothesis is likely to be reduced.

Alternatively, if for example, the difference between a previous location estimate of a target MS and a current location hypothesis indicates that the MS is:

(a2) moving at an appropriate velocity for the area being traversed, or (b2) moving along an established path (e.g., a freeway), then the confidence in the current location hypothesis may be increased.

(30.5) the hypothesis evaluator 1228 may determine consistencies and inconsistencies between location hypotheses obtained from different first order models. For example, if two such location hypotheses, for substantially the same timestamp, have estimated location areas where the target MS is likely to be and these areas substantially overlap, then the confidence in both such location hypotheses may be increased. Additionally, note that a velocity of an MS may be determined (via deltas of successive location hypotheses from one or more first order models) even when there is low confidence in the location estimates for the MS, since such deltas may, in some cases, be more reliable than the actual target MS location estimates;

(30.6) the hypothesis evaluator 1228 determines new (more accurate) location hypotheses from other location hypotheses. For example, this module may generate new hypotheses from currently active ones by decomposing a location hypothesis having a target MS location estimate intersecting two radically different area types. Additionally, this module may generate location hypotheses indicating areas of poor reception; and (30.7) the hypothesis evaluator 1228 determines and outputs a most likely location hypothesis for a target MS.

Note that additional description of the hypothesis evaluator 1228 can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to their descriptions of the hypothesis evaluator.

Context Adjuster Introduction.

The context adjuster (alternatively denoted "location adjuster modules) 1326 module enhances both the comparability and predictability of the location hypotheses output by the first order models 1224. In one embodiment (typically where confidence values of location hypotheses are not maintained as probabilities), this module modifies location hypotheses received from the FOMs 1224 so that the resulting location hypotheses output by the context adjuster 1326 may be further processed uniformly and substantially without concern as to differences in accuracy between the first order models from which location hypotheses originate. Further, embodiments of the context adjuster may determine those factors that are perceived to impact the perceived accuracy (e.g., confidence) of the location hypotheses. For instance, environmental characteristics may be taken into account here, such as time of day, season, month, weather, geographical area categorizations (e.g., dense urban, urban, suburban, rural, mountain, etc.), area subcategorizations (e.g., heavily treed, hilly, high traffic area, etc.).

Figure 16:
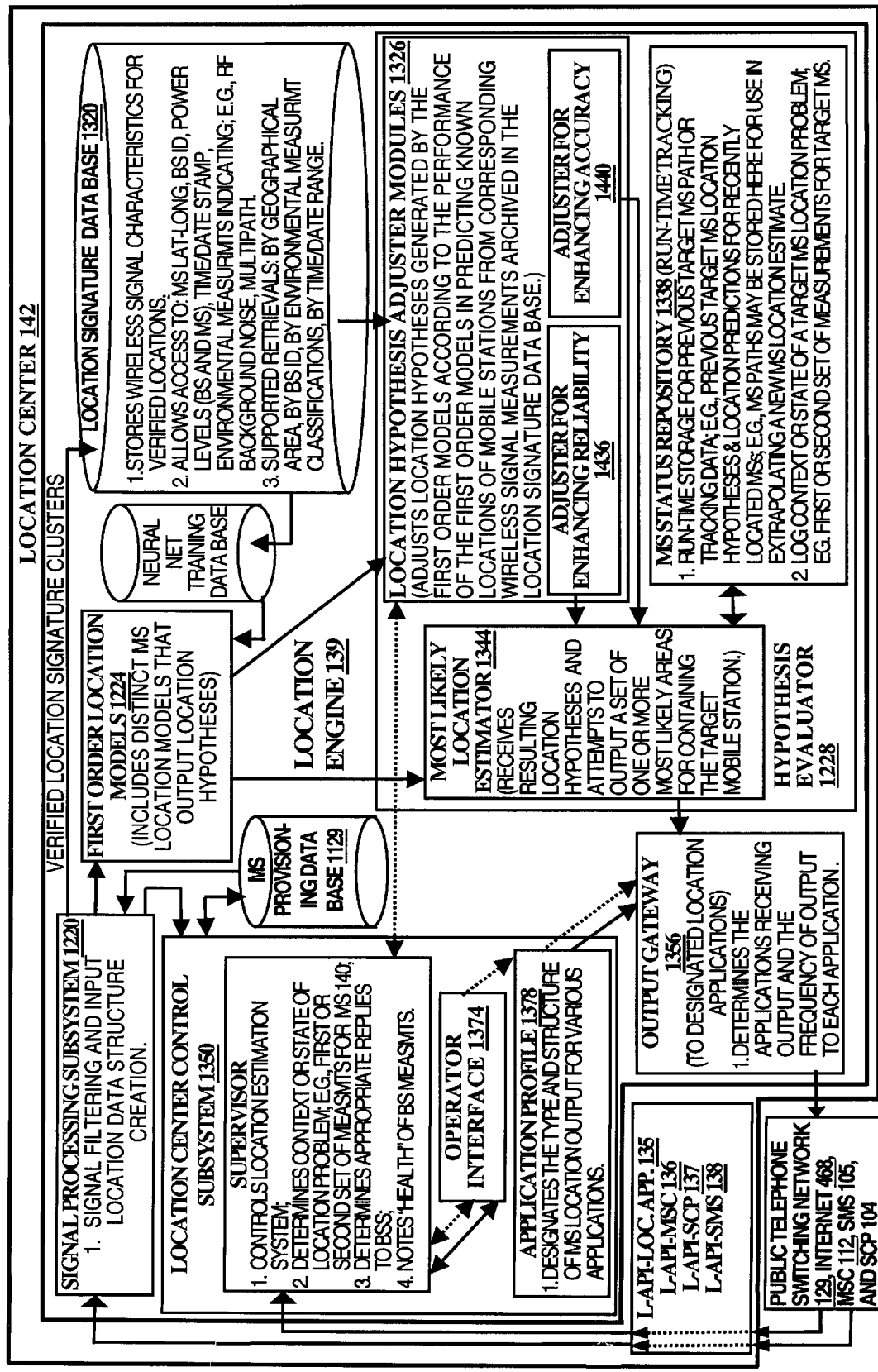
FIG. 16 illustrates another embodiment of the location engine 139, wherein the context adjuster 1326 (denoted in this figure as "location hypothesis adjuster modules") includes a module (1436) that is capable of adjusting location hypotheses for reliability, and another module (1440) that is capable of adjusting location hypotheses for accuracy.

In FIG. 16, two such adjuster modules are shown, namely, an adjuster for enhancing reliability 1436 and an adjuster for enhancing accuracy 1440. Both of these adjusters perform their location hypothesis adjustments in the manner described above. The difference between these two adjuster modules 1436 and 1440 is primarily the size of the localized area "nearby" the newly generated location estimate. In particular, since it is believed that the larger (smaller) the localized nearby area is, the more likely (less likely) the corresponding adjusted image is to contain the target mobile station location, the adjuster for enhancing reliability 1436 may determine its localized areas "nearby" a newly generated location estimate as, for example, having a 40% larger diameter (alternatively, area) than the location area estimate generated by a first order model 1224. Alternatively, the adjuster for enhancing accuracy 1444 may determine its localized areas "nearby" a newly generated location estimate as, for example, having a 30% smaller diameter (alternatively, area) than the location area estimate generated by a first order model 1224. Thus, each newly generated location hypothesis can potentially be used to derive at least two additional adjusted location hypotheses with some of these adjusted location hypotheses being more reliable and some being more accurate than the location hypotheses generated directly from the first order models 1224.

Note that additional description of context adjuster aspects of the present invention can be found in the following two copending U.S. patent applications which are incorporated herein by reference: (a) "Location Of A Mobile Station" filed Nov. 24, 1999 having application Ser. No. 09/194,367 whose inventors are D. J Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the context adjuster 1326.

MS Status Repository Introduction

The MS status repository 1338 is a run-time storage manager for storing location hypotheses from previous activations of the location engine 139 (as well as for storing the output "most likely" target MS location estimate(s)) so that a target MS 140 may be tracked using target MS location hypotheses from previous lation engine 139 activations to determine, for example, a movement of the target MS 140 between evaluations ofthe target MS location.

Location Hypothesis Analyzer Introduction.

The location hypothesis analyzer 1332, may adjust confidence values ofthe location hypotheses, according to:

(a) heuristics and/or statistical methods related to how well the signal characteristics for the generated target MS location hypothesis matches with previously obtained signal characteristics for verified MS locations.

(b) heuristics related to how consistent the location hypothesis is with physical laws, and/or highly probable reasonableness conditions relating to the location of the target MS and its movement caacteristics. For example, such heuristics may utilize knowledge of the geographical terrain in which the MS is esmated to be, and/or, for instance, the MS velocity, acceleration or extrapolation of an MS position, velocity, or acceleration.

(c) generation of additional location hypotheses whose MS locations are consistent with, for example, previous estimated locations for the target MS.

Note that additional description of this aspect of the present invention can be found in one of the following copending U.S. patent application which is incorporated herein by reference: "Location Of A Mobile Station" filed Nov. 24, 1999 having application Ser. No. 09/194,367 whose inventors are D. J. Dupray and C. L. Karr, wherein this copending patent application may have essential material for the present invention. In particular, this copending patent application may have essential material relating to the location hypothesis analyzer 1332.

Most Likelihood Estimator

The most likelihood estimator 1344 is a module for determining a "most likely" location estimate for a target MS being located by the location engine 139. The most likelihood estimator 1344 receives a collection of active or relevant location hypotheses from the hypothesis analyzer 1332 and uses these location hypotheses to determine one or more most likely estiates for the target MS 140.

There are various embodiments ofthe most likelihood estimator 1344 that may be utilized with the present invention One such embodiment will now be described. At a high level, an area of interest is first determined which contains the target MS 140 whose location is desired. This can be straightforwardly determined by identifying the base stations 122 that can be detected by the target MS 140 and/or the base stations 140 that can detect the target MS. Subsequently, assuming that this area of interest has been previously partioned into "cells" (e.g., small rectangular areas of, for example, 50 to 200 feet per side) and that the resulting location hypotheses for estimating the location of the target MS 140 each have a likelihood probability associated therewith, then for each such location hypothesis, a probability (more generally confidence value) is capable of being assigned to each cell intersecting and/or included in the associated target MS location estimate. In particular, for each location hypothesis, a portion of the probability value, P, for the associated location estimate, A, can be assigned to each cell C, intersecting the estimate. One simple way to perform this is to divide P by the number of cells C, and increment, for each cell C, a corresponding probability indicative of the target MS 140 being in C with the result from the division. One killed in the art will readily recognize numerous other ways of incrementing such cell probabilities, including: providing a Gaussian or other probabilistic distribution of probability values according to, e.g., the distance of the cell from the centroid of the location estimate. Accordingly, assuming all such probability increments have been assigned to all such cells C from all location hypotheses generated for locating the target MS 140, then the following is one embodiment of a program for determining one or more most likely locations of the target MS.

```
Desired_rel ← get the desired reliability for the resulting location
               estimate;
Max_size ← get the desired maximum extent for the resulting location
           estimate;
Binned_cells ← sort the cells of the area of interest by their probabilities
               into bins where each successive bin includes those
               cells whose confidence values are within a smaller
               (non-overlapping) range from that of any preceding
               bin. Further, assume there are, e.g., 100 bins B_I
               wherein B_1 has cells with confidences within the range
               [0, 0.1], and B_I has cells with confidences within the
               range [(i - 1) * 0.01,i * 0.01].
Result ← nil;
Cur_rel ← 0;/* current likelihood of target MS 140 being in the area
           represented by "Result"
           */
Done ← FALSE;
Repeat
    Cell_bin ← get first (next) bin of cells from Binned_cells;
    While (there are cells in Cell_bin) do
        Curr_cell ← get a next cell from Cell_bin that is
                    closest to the centroid of
                    "Result";
        Result ← Result + Curr_cell;
        /* now determine a new reliability value corresponding
        to adding "Curr_cell" to the most likely location
        estimate being built in "Result" */
        Curr_rel ← Curr_rel +
        confidence_of_MS_in(Curr_cell);
        If(Curr_rel > Desired_rel) then
            Done ← TRUE;
Until Done;
/* reliability that the target MS is in "Result" is sufficient */
Curr_size ← current maximum geographic extent (i.e., dimension) of the
area represented by
            "Result";
If(Curr_size <= Max_size) then output(Result);
Else Determine whether "Result" has one or more outlying cells that can
     be replaced by other cells closer to the centroid of "Result"
     and still have a reliability >= "Desired_rel";
     If(there are replaceable outlier cells) then
         replace them in Result and output(Result);
     Else output(Result);
```

Note that numerous similar embodiments of the above program maybe used, as one skilled in the art will understand. For instance, instead of "building" Result as provided in the above program, Result can be "whitted" from the area of interest. Accordingly Result would be initalized to the entire area of interest, and cells would be selected for removal from Result. Additionally, note that the above program determines a fast approximation to the optimal most likely area containing the target MS 140 having at least a particular desired confidence. However, a similar program may be readily provided where a most likely area having less than a desired extent or dimension is output; e.g., such a program would could be used to provide an answer to the question: "What city block is the target MS most likely in?".

Additionally, note that a center of gravity type of computation for obtaining the most likely location estimate ofthe target MS 140 may be used as described in U.S. Pat. No. 5,293,642 ('642 patent) filed Dec. 19, 1990 having an issue data of Mar. 8, 1994 with inventor Lo which is incorporated by reference herein and may contain essential material for the present invention.

Still referring to the hypothesis evaluator 1228, it is important to note that not all the above mentioned modules are required in all embodiments of the present invention. In particular, the hypothesis analyzer 1332 may be unnecessary. Accordingly, in such an embodiment, the enhanced location hypotheses output by the context adjuster 1326 are provided directly to the most likelihood estimator 1344.

Control and Output Gating Modules

A fourth functional group of location engine 139 modules is the control and output gating modules which includes the location center control subsystem 1350, and the output gateway 1356. The location control subsystem 1350 provides the highest level of control and monitoring of the data processing performed by the location center 142. In particular, this subsystem performs the following functions:

(a) controls and monitors location estimating processing for each target MS 140. Note that this includes high level exception or error handling functions;

(b) receives and routes external information as necessary. For instance, this subsystem may receive (via, e.g., the public telephone switching network and Internet 468) such environmental information as increased signal noise in a particular service area due to increase traffic, a change in weather conditions, a base station 122 (or other infrastructure provisioning), change in operation status (e.g., operational to inactive);

(c) receives and directs location processing requests from other location centers 142 (via, e.g., the Internet);

(d) performs accounting and billing procedures;

(e) interacts with location center operators by, for example, receiving operator commands and providing output indicative of processing resources being utilized and malfunctions;

(f) provides access to output requirements for various applications requesting location estimates. For example, an Internet location request from a trucking company in Los Angeles to a location center 142 in Denver may only want to know if a particular truck or driver is within the Denver area. Alternatively, a local medical rescue unit is likely to request a precise a location estimate as possible.

Figure 6:
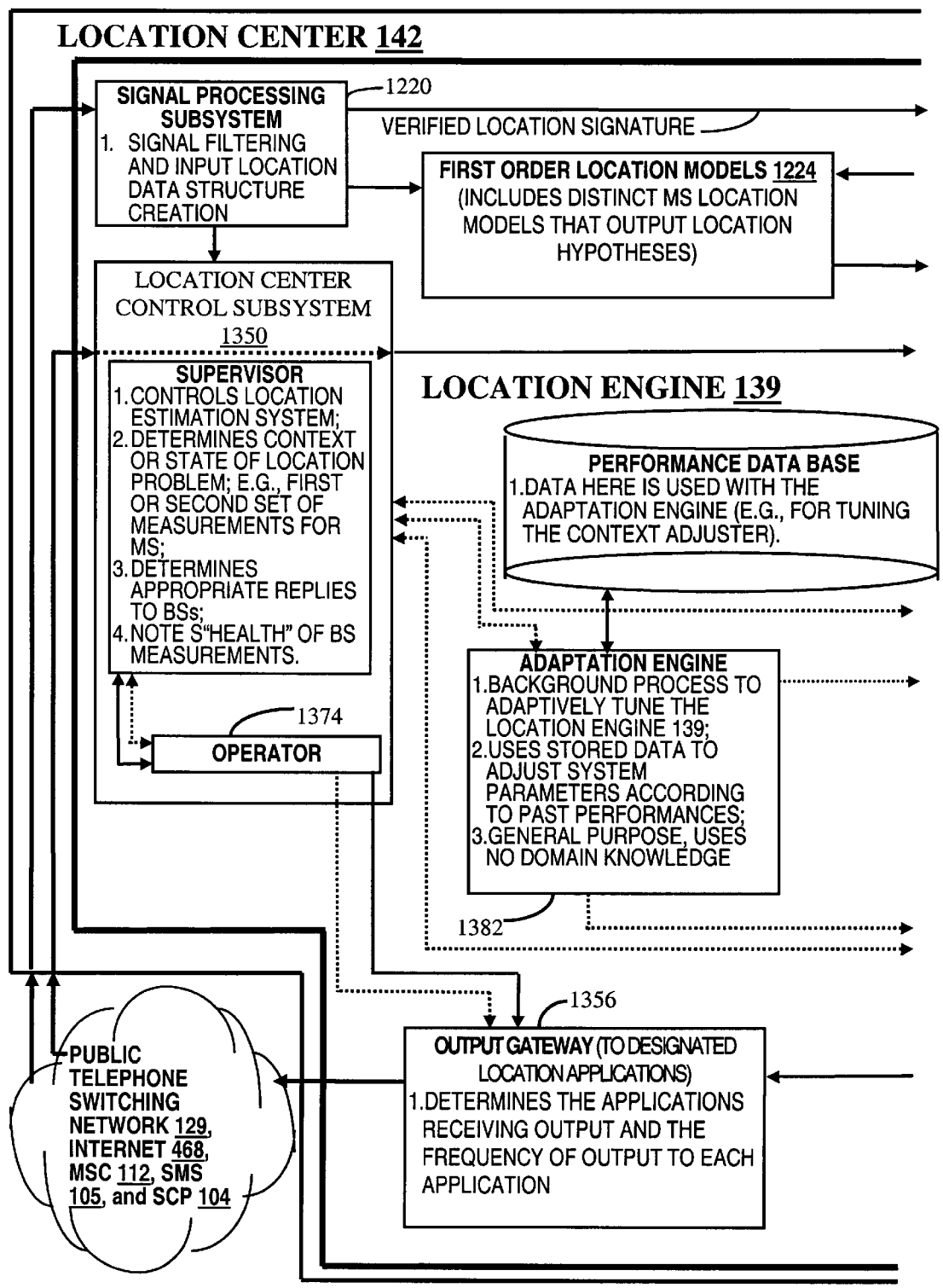
FIGS. 6(1), 6(2), and 6(3) are a high level block diagram of the location center 142.
Figure 6:
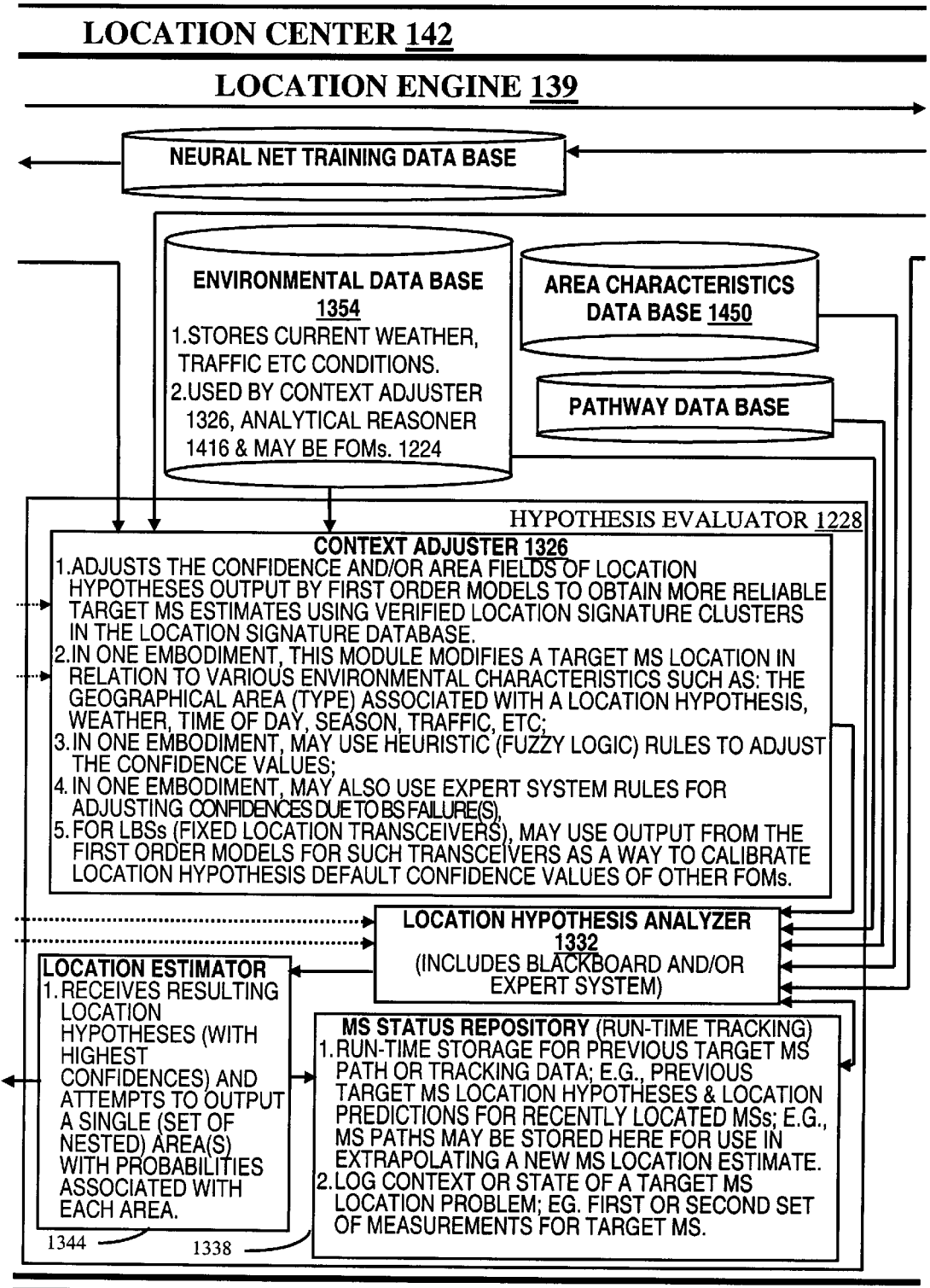
Figure 6:
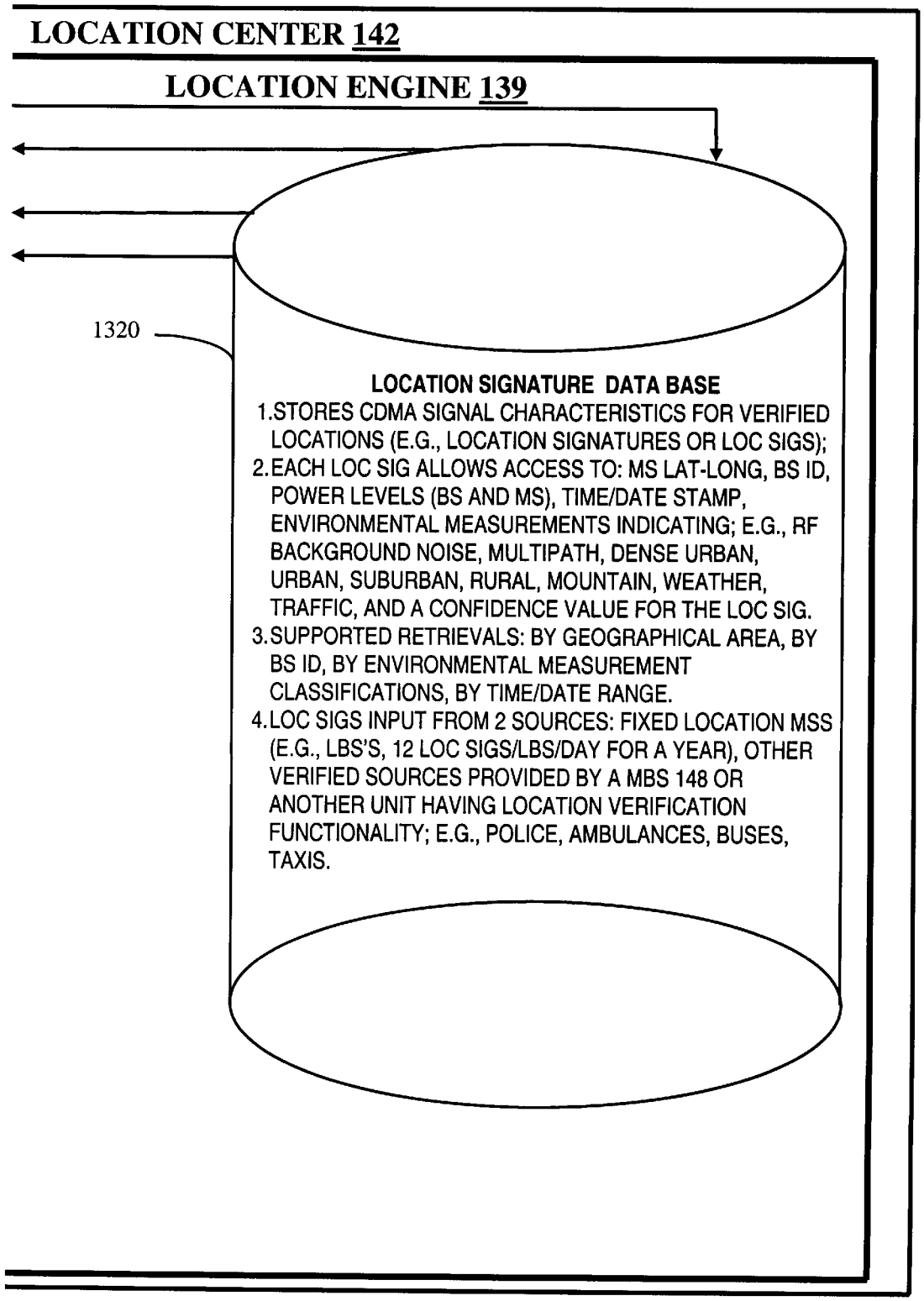
Figure 7:
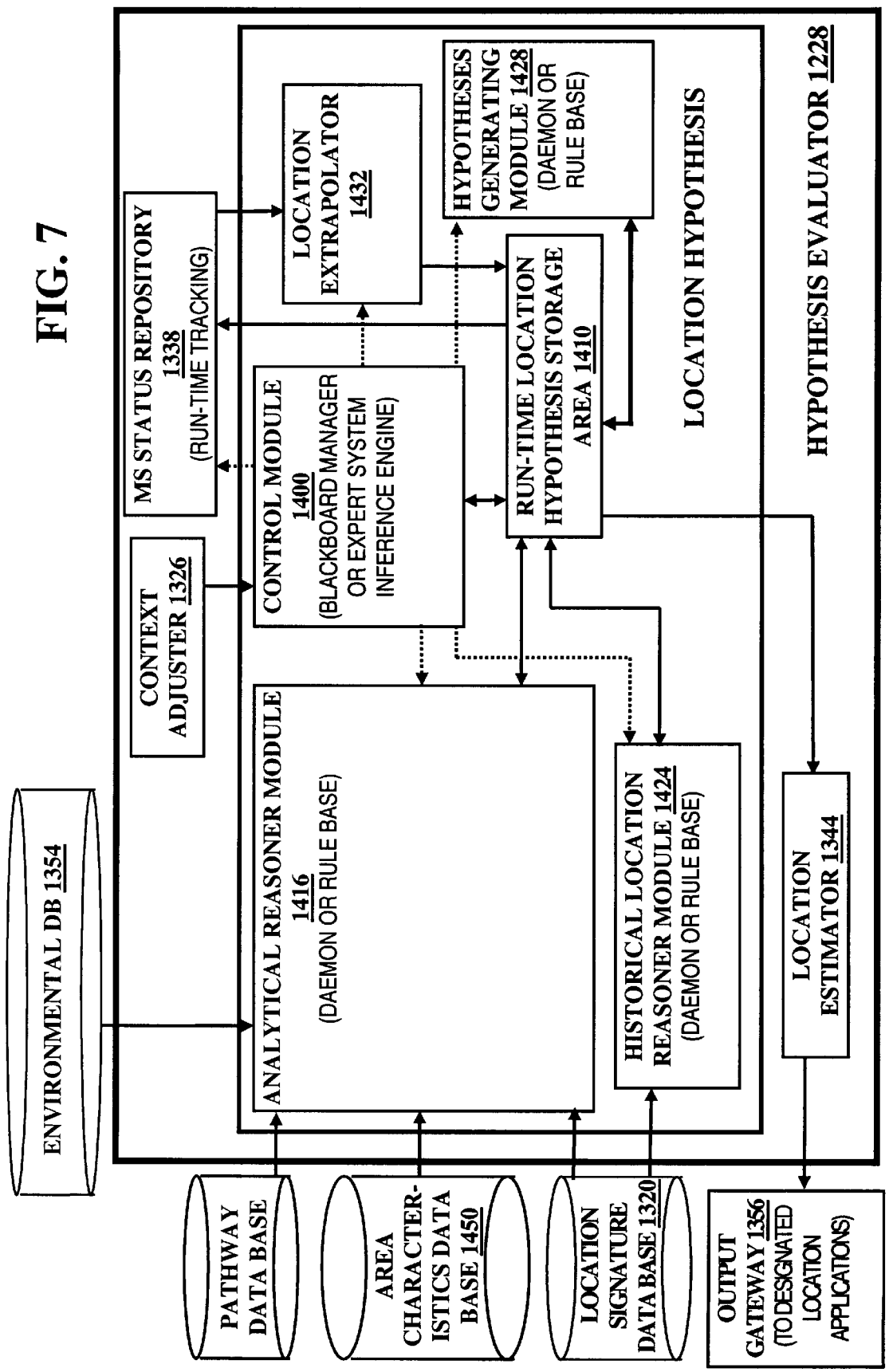
FIG. 7 is a high level block diagram of the hypothesis evaluator for the location center.

Note that in FIGS. 6, (a)–(d) above are, at least at a high level, performed by utilizing the operator interface 1374.

Referring now to the output gateway 1356, this module routes target MS 140 location estimates to the appropriate location application(s). For instance, upon receiving a location estimate from the most likelihood estimator 1344, the output gateway 1356 may determine that the location estimate is for an automobile being tracked by the police and therefore must be provided must be provided according to the particular protocol.

System Tuning and Adaptation: The Adaptation Engine

A fifth functional group of location engine 139 modules provides the ability to enhance the MS locating reliability and/or accuracy of the present invention by providing it with the capability to adapt to particular operating configurations, operating conditions and wireless signaling environments without performing intensive manual analysis of the perforce of various embodiments of the location engine 139. That is, this functional group automatically enhances the performance of the location engine for locating MSs 140 within a particular coverage area 120 using at least one wireless network infrastructure therein. More precisely, this functional group allows the present invention to adapt by tuning or optimizing certain system parameters according to location engine 139 location estimate accuracy and reliability.

There are a number location engine 139 system parameters whose values affect location estimation, and it is an aspect of the present invention that the MS location processing performed should become increasingly better at locating a target MS 140 not only through building an increasingly more detailed model of the signal characteristics of location in the coverage area 120 such as discussed above regarding the location signature data base 1320, but also by providing automated capabilities for the location center processing to adapt by adjusting or "tuning" the values of such location center system parameters.

Accordingly, the present invention may include a module, denoted herein as an "adaptation engine" 1382, that performs an optimization procedure on the location center 142 system parameters either periodically or concurrently with the operation of the location center in estimating MS locations. That is, the adaptation engine 1382 directs the modifications of the system parameters so that the location engine 139 increases in overall accuracy in locating target MSs 140. In one embodiment, the adaptation engine 1382 includes an embodiment of a genetic algorithm as the mechanism for modifying the system parameters. Genetic algorithms are basically search algorithms based on the mechanics of natural genetics.

Note that additional description of this aspect of the present invention can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the use of genetic algorithm implementations for adaptively tuning system parameters of a particular embodiment of the present invention.

Implementations of First Order Models

Further descriptions of various first order models 1224 are provided in this section. However, it is important to note that these are merely representative embodiments of location estimators that are within the scope of the present invention. In particular, two or more of the wireless location technologies described hereinbelow may be combined to created additional First Order Models. For example, various triangulation techniques between a target MS 140 and the base station infrastructure (e.g., time difference of arrival (TDOA) or time of arrival (TOA)), may be combined with an angle of arrival (AOA) technique. For instance, if a single direct line of sight angle measurement and a single direct line of sight distance measurement determined by, e.g., TDOA or TOA can effectively location the target MS 140.

In such cases, the resulting First Order Models may be more complex. However, location hypotheses may generated from such models where individually the triangulation techniques and the AOA techniques would be unable to generate effective location estimates.

Triangulation or Distance First Order Models (TOA/TDOA)

As discussed in the Location Center Architecture Overview section herein above, distance models determine a presumed direction and/or distance that a target MS 140 is from one or more base stations 122. In some embodiments of distance models, the target MS location estimate(s) generated are obtained using radio signal analysis techniques that are quite general and therefore are not capable of taking into account the peculiarities of the topography of a particular radio coverage area. For example, substantially all radio signal analysis techniques using conventional procedures (or formulas) are based on "signal characteristic measurements" such as:

(a) signal timing measurements (e.g., TOA and TDOA), and/or (b) signal strength measurements.

Furthermore, such signal analysis techniques are likely predicated on certain very general assumptions that can not fully account for signal attenuation and multipath due to a particular radio coverage area topography.

Taking CDMA or TDMA base station network as an example, each base station (BS) 122 is required to emit a constant signal-strength pilot channel pseudo-noise (PN) sequence on the forward link channel identified uniquely in the network by a pilot sequence offset and frequency assignment. It is possible to use the pilot channels of the active, candidate, neighboring and remaining sets, maintained in the target MS, for obtaining signal characteristic measurements (e.g., TOA and/or TDOA measurements) between the target MS 140 and the base stations in one or more of these sets.

Based on such signal characteristic measurements and the speed of signal propagation, signal characteristic ranges or range differences related to the location of the target MS 140 can be calculated. Using TOA and/or TDOA ranges as exemplary, these ranges can then be input to either the radius-radius multilateration or the time difference multilateration algorithms along with the known positions of the corresponding base stations 122 to thereby obtain one or more location estimates of the target MS 140. For example, if there are, four base stations 122 in the active set, the target MS 140 may cooperate with each of the base stations in this set to provide signal arrival time measurements. Accordingly, each of the resulting four sets of three of these base stations 122 may be used to provide an estimate of the target MS 140 as one skilled in the art will understand. Thus, potentially (assuming the measurements for each set of three base stations yields a feasible location solution) there are four estimates for the location of the target MS 140. Further, since such measurements and BS 122 positions can be sent either to the network or the target MS 140, location can be determined in either entity.

Since many of the signal measurements utilized by embodiments of distance models are subject to signal attenuation and multipath due to a particular area topography. Many of the sets of base stations from which target MS location estimates are desired may result in either no location estimate, or an inaccurate location estimate.

Accordingly, some embodiments of distance FOMs may attempt to mitigate such ambiguity or inaccuracies by, e.g., identifying discrepancies (or consistencies) between arrival time measurements and other measurements (e.g., signal strength), these discrepancies (or consistencies) may be used to filter out at least those signal measurements and/or generated location estimates that appear less accurate. In particular, such identifying may filtering can be performed by, for example, an expert system residing in the distance FOM.

Another approach for enhancing certain location techniques such as TDOA or angle or arrival (AOA) is that of super resolution as disclosed in U.S. Pat. No. 5,890,068 filed on Oct. 3, 1996 having an issue date of Mar. 30, 1999 with inventors Fattouche et. al. which is incorporated by reference herein and which may contain essential material for the present invention. In particular, the following portions of the '068 patent are particularly important: the Summary section, the Detailed Description portion regarding FIGS. 12–17, and the section titled "Description Of The Preferred Embodiments Of The Invention."

A another approach, regardless of the FOM utilized, for mitigating such ambiguity or conflicting MS location estimates is particularly novel in that each of the target MS location estimates is used to generate a location hypothesis regardless of its apparent accuracy. Accordingly, these location hypotheses are input to an embodiment of the context adjuster 1326. In particular, in one context adjuster 1326 embodiment each location hypothesis is adjusted according to past performance of its generating FOM 1224 in an area of the initial location estimate of the location hypothesis (the area, e.g., determined as a function of distance from this initial location estimate), this alternative embodiment adjusts each of the location hypotheses generated by a distance first order model according to a past performance of the model as applied to signal characteristic measurements from the same set of base stations 122 as were used in generating the location hypothesis. That is, instead of only using only an identification of the distance model (i.e., its FOM_ID) to, for example, retrieve archived location estimates generated by the model in an area of the location hypothesis' estimate (when determining the model's past performance), the retrieval retrieves only the archived location estimates that are, in addition, derived from the signal characteristics measurement obtained from the same collection of base stations 122 as was used in generating the location hypothesis. Thus, the adjustment performed by this embodiment of the context adjuster 1326 adjusts according to the past performance of the distance model and the collection of base stations 122 used.

Angle Of Arrival First Order Model

Various mobile station location estimating models can be based on the angle or arrival (AOA) of wireless signals transmitted from a target MS 140 to the base station infrastructure as one skilled in the art will understand. Such AOA models typically require precise angular measurements of the wireless signals, and accordingly utilize specialized antennas at the base stations 122. The determined signal transmission angles are subject to multipath aberrations. Therefore, AOA is most effective when there is an unimpeded line-of-sight simultaneous transmission between the target MS 140 and at least two base stations 122.

Coverage Area First Order Model

Radio coverage area of individual base stations 122 may be used to generate location estimates of the target MS 140. Although a first order model 1224 based on this notion may be less accurate than other techniques, if a reasonably accurate RF coverage area is known for each (or most) of the base stations 122, then such a FOM (denoted hereinafter as a "coverage area first order model" or simply "coverage area model") may be very reliable. To determine approximate maximum radio frequency (RF) location coverage areas, with respect to BSs 122, antennas and/or sector coverage areas, for a given class (or classes) of (e.g., CDMA or TDMA) mobile station(s) 140, location coverage should be based on an MS's ability to adequately detect the pilot channel, as opposed to adequate signal quality for purposes of carrying user-acceptable traffic in the voice channel. Note that more energy is necessary for traffic channel activity (typically on the order of at least –94 to –104 dBm received signal strength) to support voice, than energy needed to simply detect a pilot channel's presence for location purposes (typically a maximum weakest signal strength range of between –104 to –110 dBm), thus the "Location Coverage Area" will generally be a larger area than that of a typical "Voice Coverage Area", although industry studies have found some occurrences of "no-coverage" areas within a larger covered area The approximate maximum RF coverage area for a given sector of (more generally angular range about) a base station 122 may be represented as a set of points representing a polygonal area (potentially with, e.g., holes therein to account for dead zones and/or notches). Note that if such polygonal RF coverage area representations can be reliably determined and maintained over time (for one or more BS signal power level settings), then such representations can be used in providing a set theoretic or Venn diagram approach to estimating the location of a target MS 140. Coverage area first order models utilize such an approach.

One embodiment, a coverage area model utilizes both the detection and non-detection of base stations 122 by the target MS 140 (conversely, of the MS by one or more base stations 122) to define an area where the target MS 140 may likely be. A relatively straightforward application of this technique is to:

(a) find all areas of intersection for base station RF coverage area representations, wherein: (i) the corresponding base stations are on-line for communicating with MSs 140; (ii) the RF coverage area representations are deemed reliable for the power levels of the on-line base stations; (iii) the on-line base stations having reliable coverage area representations can be detected by the target MS; and (iv) each intersection must include a predetermined number of the reliable RF coverage area representations (e.g., 2 or 3); and (b) obtain new location estimates by subtracting from each of the areas of intersection any of the reliable RF coverage area representations for base stations 122 that can not be detected by the target MS.

Accordingly, the new areas may be used to generate location hypotheses.

Satellite Signal Triangulation First Order Models

As mentioned hereinabove, there are various satellite systems that may be used to provide location estimates of a target MS 140 (e.g., GPS, GLONASS, LEOs, and MEOs). In many cases, such location estimates can be very accurate, and accordingly such accuracy would be reflected in the present invention by relatively high confidence values for the location hypotheses generated from such models in comparison to other FOMs. However, it may be difficult for the target MS 140 to detect and/or lock onto such satellite signals sufficiently well to provide a location estimate. For example, it may be very unlikely that such satellite signals can be detected by the MS 140 in the middle of high rise concrete buildings or parking structures having very reduced exposure to the sky.

Location Base Station First Order Model

In the location base station (LBS) model (FOM 1224), a database is accessed which contains electrical, radio propagation and coverage area characteristics of each of the location base stations in the radio coverage area. The LBS model is an active model, in that it can probe or excite one or more particular LBSs 152 in an area for which the target MS 140 to be located is suspected to be placed. Accordingly, the LBS model may receive as input a most likely target MS 140 location estimate previously output by the location engine 139 of the present invention, and use this location estimate to determine which (if any) LBSs 152 to activate and/or deactivate for enhancing a subsequent location estimate of the target MS. Moreover, the feedback from the activated LBSs 152 may be provided to other FOMs 1224, as appropriate, as well as to the LBS model. However, it is an important aspect of the LBS model that when it receives such feedback, it may output location hypotheses having relatively small target MS 140 location area estimates about the active LBSs 152 and each such location hypothesis also has a high confidence value indicative of the target MS 140 positively being in the corresponding location area estimate (e.g., a confidence value of 0.9 to +1), or having a high confidence value indicative of the target MS 140 not being in the corresponding location area estimate (i.e., a confidence value of −0.9 to −1). Note that in some embodiments of the LBS model, these embodiments may have functionality similar to that of the coverage area first order model described above. Further note that for LBSs within a neighborhood of the target MS wherein there is a reasonable chance that with movement of the target MS may be detected by these LBSs, such LBSs may be requested to periodically activate. (Note, that it is not assumed that such LBSs have an on-line external power source; e.g., some may be solar powered). Moreover, in the case where an LBS 152 includes sufficient electronics to carry voice communication with the target MS 140 and is the primary BS for the target MS (or alternatively, in the active or candidate set), then the LBS model will not deactivate this particular LBS during its procedure of activating and deactivating various LBSs 152.

Stochastic First Order Model

The stochastic first order models may use statistical prediction techniques such as principle decomposition, partial least squares, partial least squares, or other regression techniques for predicting, for example, expected minimum and maximum distances of the target MS from one or more base stations 122, e.g., Bollenger Bands. Additionally, some embodiments may use Markov processes and Random Walks (predicted incremental MS movement) for determining an expected area within which the target MS 140 is likely to be. That is, such a process measures the incremental time differences of each pilot as the MS moves for predicting a size of a location area estimate using past MS estimates such as the verified location signatures in the location signature database 1320.

Pattern Recognition and Adaptive First Order Models

It is a particularly important aspect of the present invention to provide:

(a) one or more FOMs 1224 that generate target MS 140 location estimates by using pattern recognition or associativity techniques, and/or (b) one or more FOMs 1224 that are adaptive or trainable so that such FOMs may generate increasingly more accurate target MS location estimates from additional training.

Statistically Based Pattern Recognition First Order Models

Regarding FOMs 1224 using pattern recognition or associativity techniques, there are many such techniques available. For example, there are statistically based systems such as "CART" (acronym for Classification and Regression Trees) by ANGOSS Software International Limited of Toronto, Canada that may be used for automatically for detecting or recognizing patterns in data that were not provided (and likely previously unknown). Accordingly, by imposing a relatively fine mesh or grid of cells of the radio coverage area, wherein each cell is entirely within a particular area type categorization such as the transmission area types (discussed in the section, "Coverage Area: Area Types And Their Determination" above), the verified location signature clusters within the cells of each area type may be analyzed for signal characteristic patterns. If such patterns are found, then they can be used to identify at least a likely area type in which a target MS is likely to be located. That is, one or more location hypotheses may be generated having target MS 140 location estimates that cover an area having the likely area type wherein the target MS 140 is located. Further note that such statistically based pattern recognition systems as "CART" include software code generators for generating expert system software embodiments for recognizing the patterns detected within a training set (e.g., the verified location signature clusters).

Accordingly, although an embodiment of a FOM as described here may not be exceedingly accurate, it may be very reliable. Thus, since a fundamental aspect of the present invention is to use a plurality of MS location techniques for generating location estimates and to analyze the generated estimates (likely after being adjusted) to detect patterns of convergence or clustering among the estimates, even large MS location area estimates are useful. For example, it can be the case that four different and relatively large MS location estimates, each having very high reliability, have an area of intersection that is acceptably precise and inherits the very high reliability from each of the large MS location estimates from which the intersection area was derived.

A similar statistically based FOM 1224 to the one above may be provided wherein the radio coverage area is decomposed substantially as above, but addition to using the signal characteristics for detecting useful si patterns, the specific identifications of the base station 122 providing the signal characteristics may also be used. Thus, assuming there is a sufficient density of verified location signature clusters in some of the mesh cells so that the statistical pattern recognizer can detect patterns in the signal characteristic measurements, an expert system may be generated that outputs a target MS 140 location estimate that may provide both a reliable and accurate location estimate of a target MS 140.

Adaptive/Trainable First Order Models

Adaptive/Trainable First Order Models

The term adaptive is used to describe a data processing component that can modify its data processing behavior in response to certain inputs that are used to change how subsequent inputs are processed by the component. Accordingly, a data processing component may be "explicitly adaptive by modifying its behavior according to the input of explicit instructions or control data that is input for changing the component's subsequent behavior in ways that are predictable and expected. That is, the input encodes explicit instructions that are known by a user of the component. Alternatively, a data processing component may be "implicitly adaptive" in that its behavior is modified by other than instructions or control data whose meaning is known by a user of the component. For example, such implicitly adaptive data processors may learn by training on examples, by substantially unguided exploration of a solution space, or other data driven adaptive strategies such as statistically generated decision trees. Accordingly, it is an aspect of the present invention to utilize not only explicitly adaptive MS location estimators within FOMs 1224, but also implicitly adaptive MS location estimators. In particular, artificial neural networks (also denoted neural nets and ANNs herein) are used in some embodiments as implicitly adaptive MS location estimators within FOMs. Thus, in the sections below, neural net architectures and their application to locating an MS is described.

Artificial Neural Networks For MS Location

Artificial neural networks may be particularly useful in developing one or more first order models 1224 for locating an MS 140, since, for example, ANNs can be trained for classifying and/or associatively pattern matching of various RF signal measurements such as the location signatures. That is, by training one or more artificial neural nets using RF signal measurements from verified locations so that RF signal transmissions characteristics indicative of particular locations are associated with their corresponding locations, such trained artificial neural nets can be used to provide additional target MS 140 location hypotheses. Moreover, it is an aspect of the present invention that the training of such artificial neural net based FOMs (ANN FOMs) is provided without manual intervention as will be discussed hereinbelow. Additional description of this aspect of the present invention can be found in the copending U.S. patent application titled "Location Of A Mobile Station" filed Nov. 24, 1999 having application Ser. No. 09/194,367 whose inventors are D. J. Dupray and C. L. Karr, which is incorporated herein by reference and wherein this copending patent application may have essential material for the present invention. In particular, this copending patent application may have essential material relating to the use of ANNs as mobile station location estimators 1224.

Other First Order Models

U.S. Pat. No. 5,390,339 ('339 patent) filed Oct. 23, 1991 having an issue date of Feb. 14, 1995 with inventor being Bruckert et. al. provides number of embodiments of wireless location estimators for estimating the location of a "remote unit." In particular, various location estimator embodiments are described in relation to FIGS. 1B and 2B therein. The location estimators in the '339 patent are, in general, directed to determining weighted or adjusted distances of the "remote unit" (e.g., MS 140) from one or more "transceivers" (e.g., base stations 122). The distances are determined using signal strength measurements of wireless signals transmitted between the "remote unit" and the "transceivers." However, adjustments are in the signal strengths according to various signal transmission anomalies (e.g., co-channel interference), impairments and/or errors. Additionally, a signal RF propagation model may be utilized, and a likelihood of the "remote unit" being in the designated coverage areas (cells) of particular transceivers (e.g., base stations 122) is determined using probabilistic techniques such as posterior probabilities. Accordingly, the Bruckert '339 patent is incorporated by reference herein and may contain essential material for the present invention.

U.S. Pat. No. 5,570,412 ('412 patent) filed Sep. 28, 1994 having an issue date of Oct. 29, 1996 with inventors LeBlanc et. al. provide further embodiments of wireless location estimators that may be used as First Order Models 1224. The location estimating techniques of the LeBlanc '412 patent are described with reference to FIG. 8 and succeeding figures therein. At a high level, wireless location techniques of the '412 patent can be characterized by the following quote therefrom:

"The location processing of the present invention focuses on the ability to predict and model RF contours using actual RF measurements, then performing data reduction techniques such as curve fitting technique, Bollinger Bands, and Genetic Algorithms, in order to locate a mobile unit and disseminate its location."

Accordingly, the LeBlanc '412 patent is incorporated by reference herein and may contain essential material for the present invention.

U.S. Pat. No. 5,293,645 ('645 patent) filed Oct. 4, 1991 having an issue date of Mar. 8, 1994 with inventor Sood. provide further embodiments of wireless location estimators that may be used as First Order Models 1224. In particular, the '645 patent describes wireless location estimating techniques using triangulations or other geographical intersection techniques. Further, one such technique is described in column 6, line 42 through column 7, line 7. Accordingly, the Sood '645 patent is incorporated by reference herein and may contain essential material for the present invention.

U.S Pat. No. 5,293,642 ('642 patent) filed Dec. 19, 1990 having an issue data of Mar. 8, 1994 with inventor Lo provide further embodiments of wireless location estimators that may be used as First Order Models 1224. In particular, the '642 patent determines a corresponding probability density function (pdf) about each of a plurality of base stations in communication with the target MS 140. That is, upon receiving wireless signal measurements from the transmissions between the target MS 140 and base stations 122, for each BS 122, a corresponding pdf is obtained from prior measurements of a particular wireless signal characteristic at locations around the base station Subsequently, a most likely location estimation is determined from a joint probability density function of the individual base station probability density functions. Further description can be found in the Description Of The Preferred Embodiment section of the '642 patent. Accordingly, the Lo '642 patent is incorporated by reference herein and may contain essential material for the present invention.

MS Status Repository Embodiment

The MS status repository 1338 is a run-time storage manager for storing location hypotheses from previous activations of the location engine 139 (as well as the output target MS location estimate(s)) so that a target MS may be tracked using target MS location hypotheses from previous location engine 139 activations to determine, for example, a movement of the target MS between evaluations of the target MS location. Thus, by retaining a moving window of previous location hypotheses used in evaluating positions of a target MS, measurements of the target MS's velocity, acceleration, and likely next position may be determined by the location hypothesis analyzer 1332. Further, by providing accessibility to recent MS location hypotheses, these hypotheses may be used to resolve conflicts between hypotheses in a current activation for locating the target MS; e.g., MS paths may be stored here for use in extrapolating a new location Mobile Base Station Location Subsystem Description Mobile Base Station Subsystem Introduction Any collection of mobile electronics (denoted mobile location unit) that is able to both estimate a location of a target MS 140 and communicate with the base station network may be utilized by the present invention to more accurately locate the target MS. Such mobile location units may provide greater target MS location accuracy by, for example, homing in on the target MS and by transmitting additional MS location information to the location center 142. There are a number of embodiments for such a mobile location unit contemplated by the present invention. For example, in a minimal version, such the electronics of the mobile location unit may be little more than an onboard MS 140, a sectored/directional antenna and a controller for communicating between them. Thus, the onboard MS is used to communicate with the location center 142 and possibly the target MS 140, while the antenna monitors signals for homing in on the target MS 140. In an enhanced version of the mobile location unit, a GPS receiver may also be incorporated so that the location of the mobile location unit may be determined and consequently an estimate of the location of the target MS may also be determined. However, such a mobile location unit is unlikely to be able to determine substantially more than a direction of the target MS 140 via the sectored/directional antenna without further base station infrastructure cooperation in, for example, determining the transmission power level of the target MS or varying this power level. Thus, if the target MS or the mobile location unit leaves the coverage area 120 or resides in a poor communication area, it may be difficult to accurately determine where the target MS is located. None-the-less, such mobile location units may be sufficient for many situations, and in fact the present invention contemplates their use. However, in cases where direct communication with the target MS is desired without constant contact with the base station infrastructure, the present invention includes a mobile location unit that is also a scaled down version of a base station 122. Thus, given that such a mobile base station or MBS 148 includes at least an onboard MS 140, a sectored/directional antenna, a GPS receiver, a scaled down base station 122 and sufficient components (including a controller) for integrating the capabilities of these devices, an enhanced autonomous MS mobile location system can be provided that can be effectively used in, for example, emergency vehicles, air planes and boats. Accordingly, the description that follows below describes an embodiment of an MBS 148 having the above mentioned components and capabilities for use in a vehicle.

As a consequence of the MBS 148 being mobile, there are fundamental differences in the operation of an MBS in comparison to other types of BS's 122 (152). In particular, other types of base stations have fixed locations that are precisely determined and known by the location center, whereas a location of an MBS 148 may be known only approximately and thus may require repeated and frequent re-estimating. Secondly, other types of base stations have substantially fixed and stable communication with the location center (via possibly other BS's in the case of IBSs 152) and therefore although these BS's may be more reliable in their in their ability to communicate information related to the location of a target MS with the location center, accuracy can be problematic in poor reception areas. Thus, MBSs may be used in areas (such as wilderness areas) where there may be no other means for reliably and cost effectively locating a target MS 140 (i.e., there may be insufficient fixed location BS's coverage in an area).

Figure 11:
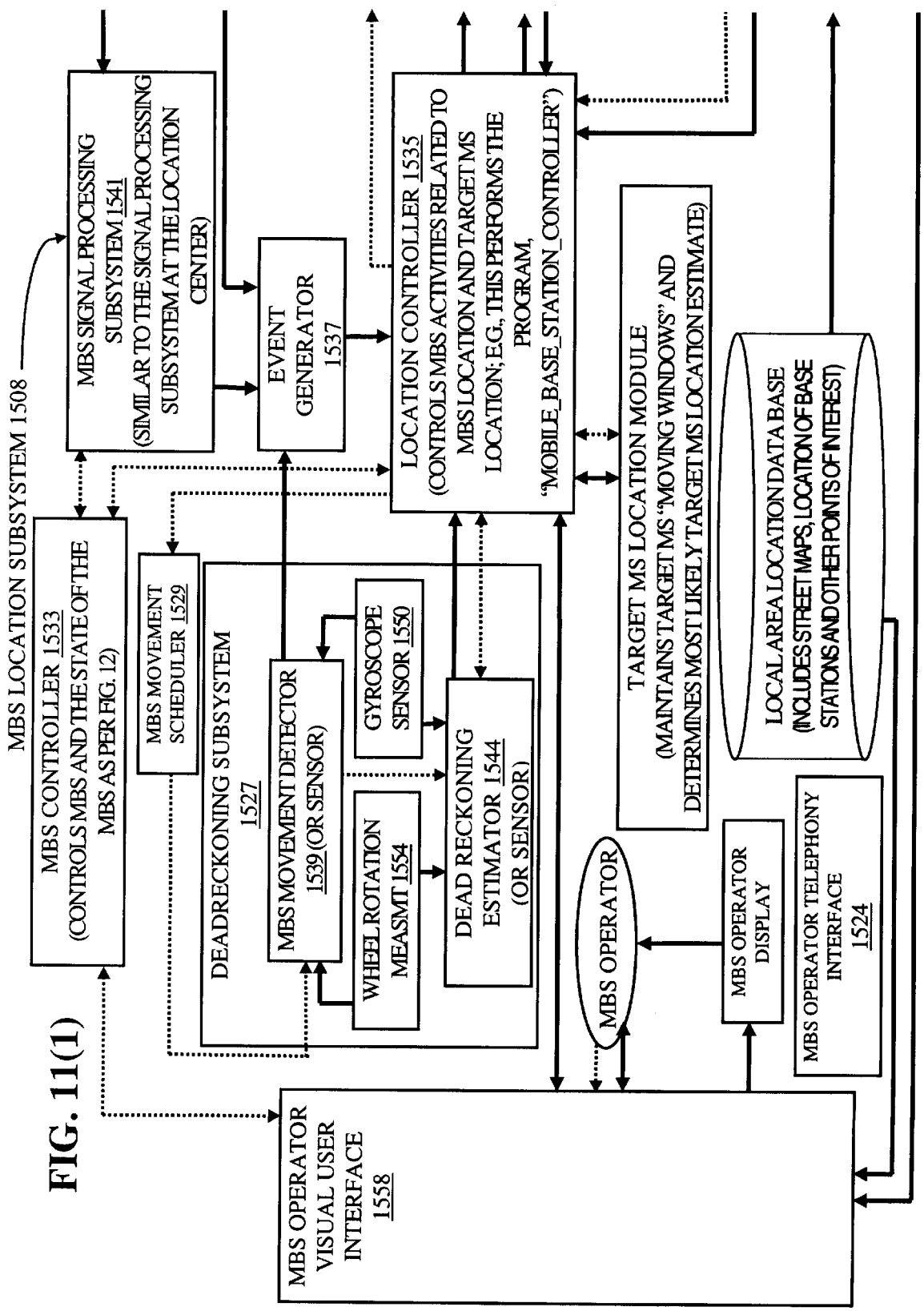
FIGS. 11(1) and 11(2) are a high level block diagram of the mobile base station (MBS).
Figure 11:
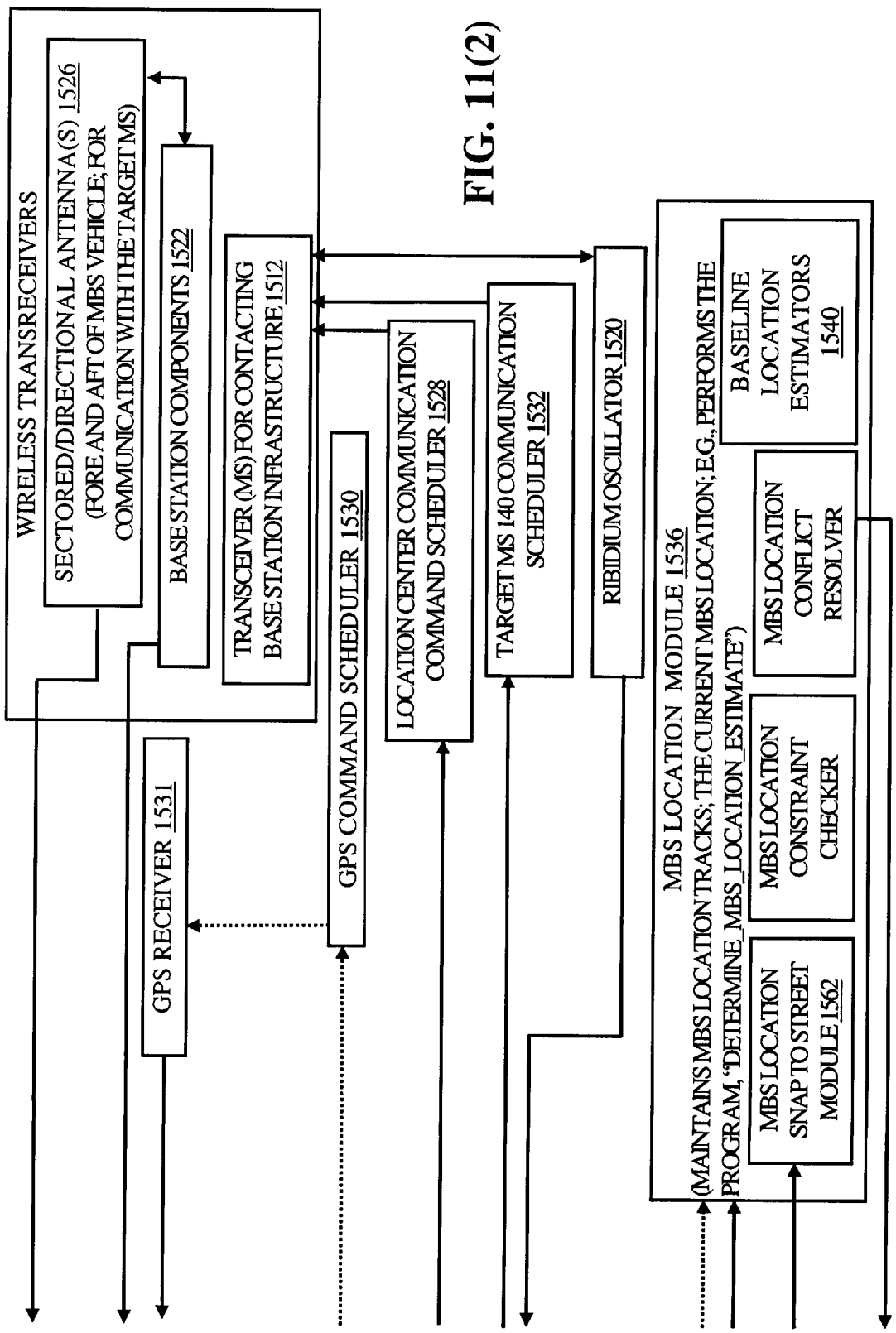
Figure 12:
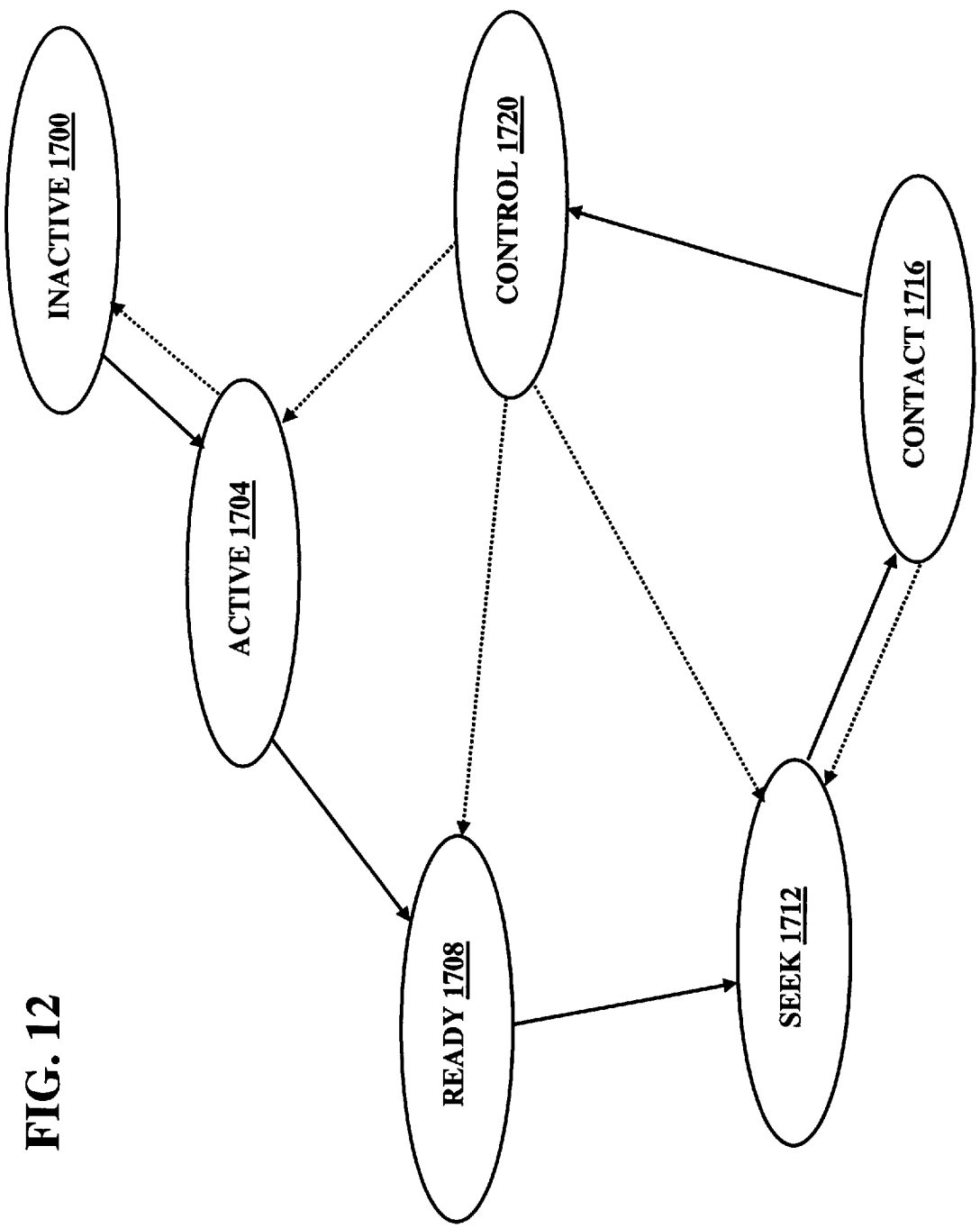
FIG. 12 is a high level state transition diagram describing computational states the Mobile Base station enters during operation.

FIG. 11 provides a high level block diagram architecture of one embodiment of the MBS location subsystem 1508. Accordingly, an MBS may include components for communicating with the fixed location BS network infrastructure and the location center 142 via an on-board transceiver 1512 that is effectively an MS 140 integrated into the location subsystem 1508. Thus, if the MBS 148 travels through an area having poor infrastructure signal coverage, then the MBS may not be able to communicate reliably with the location center 142 (e.g., in rural or mountainous areas having reduced wireless telephony coverage). So it is desirable that the MBS 148 must be capable of functioning substantially autonomously from the location center. In one embodiment, this implies that each MBS 148 must be capable of estimating both its own location as well as the location of a target MS 140.

Additionally, many commercial wireless telephony technologies require all BS's in a network to be very accurately time synchronized both for transmitting MS voice communication as well as for other services such as MS location. Accordingly, the MBS 148 will also require such time synchronization. However, since an MBS 148 may not be in constant communication with the fixed location BS network (and indeed may be off-line for substantial periods of time), on-board highly accurate timing device may be necessary. In one embodiment, such a device may be a commercially available ribidium oscillator 1520 as shown in FIG. 11.

Since the MBS 148, includes a scaled down version of a BS 122 (denoted 1522 in FIG. 11), it is capable of performing most typical BS 122 tasks, albeit on a reduced scale. In particular, the base station portion of the MBS 148 can:

(a) raise/lower its pilot channel signal strength, (b) be in a state of soft hand-off with an MS 140, and/or (c) be the primary BS 122 for an MS 140, and consequently be in voice communication with the target MS (via the MBS operator telephony interface 1524) if the MS supports voice communication.

Further, the MBS 148 can, if it becomes the primary base station communicating with the MS 140, request the MS to raise/lower its power or, more generally, control the communication with the MS (via the base station components 1522). However, since the MBS 148 will likely have substantially reduced telephony traffic capacity in comparison to a standard infrastructure base station 122, note that the pilot channel for the MBS is preferably a nonstandard pilot channel in that it should not be identified as a conventional telephony traffic bearing BS 122 by MS's seeking normal telephony communication. Thus, a target MS 140 requesting to be located may, depending on its capabilities, either automatically configure itself to scan for certain predetermined MBS pilot channels, or be instructed via the fixed location base station network (equivalently BS infrastructure) to scan for a certain predetermined MBS pilot channel.

Moreover, the MBS 148 has an additional advantage in that it can substantially increase the reliability of communication with a target MS 140 in comparison to the base station infrastructure by being able to move toward or track the target MS 140 even if this MS is in (or moves into) a reduced infrastructure base station network coverage area. Furthermore, an MBS 148 may preferably use a directional or smart antenna 1526 to more accurately locate a direction of signals from a target MS 140. Thus, the sweeping of such a smart antenna 1526 (physically or electronically) provides directional information regarding signals received from the target MS 140. That is, such directional information is determined by the signal propagation delay of signals from the target MS 140 to the angular sectors of one of more directional antennas 1526 on-board the MBS 148.

Before proceeding to further details of the MBS location subsystem 1508, an example of the operation of an MBS 148 in the context of responding to a 911 emergency call is given. In particular, this example describes the high level computational states through which the MBS 148 transitions, these states also being illustrated in the state transition diagram of FIG. 12. Note that this figure illustrates the primary state transitions between these MBS 148 states, wherein the solid state transitions are indicative of a typical "ideal" progression when locating or tracking a target MS 140, and the dashed state transitions are the primary state reversions due, for example, to difficulties in locating the target MS 140.

Accordingly, initially the MBS 148 may be in an inactive state 1700, wherein the MBS location subsystem 1508 is effectively available for voice or data communication with the fixed location base station network, but the MS 140 locating capabilities of the MBS are not active. From the inactive state 1700 the MBS (e.g., a police or rescue vehicle) may enter an active state 1704 once an MBS operator has logged onto the MBS location subsystem of the MBS, such logging being for authentication, verification and journaling of MBS 148 events. In the active state 1704, the MBS may be listed by a 911 emergency center and/or the location center 142 as eligible for service in responding to a 911 request. From this state, the MBS 148 may transition to a ready state 1708 signifying that the MBS is ready for use in locating and/or intercepting a target MS 140. That is, the MBS 148 may transition to the ready state 1708 by performing the following steps:

(1a) Synchronizing the timing of the location subsystem 1508 with that of the base station network infrastructure. In one embodiment, when requesting such time synchronization from the base station infrastructure, the MBS 148 will be at a predetermined or well known location so that the MBS time synchronization may adjust for a known amount of signal propagation delay in the synchronization signal.

(1b) Establishing the location of the MBS 148. In one embodiment, this may be accomplished by, for example, an MBS operator identifying the predetermined or well known location at which the MBS 148 is located.

(1c) Communicating with, for example, the 911 emergency center via the fixed location base station infrastructure to identify the MBS 148 as in the ready state.

Thus, while in the ready state 1708, as the MBS 148 moves, it has its location repeatedly (re)-estimated via, for example, GPS signals, location center 142S location estimates from the base stations 122 (and 152), and an on-board deadreckoning subsystem 1527 having an MBS location estimator according to the programs described hereinbelow. However, note that the accuracy of the base station time synchronization (via the ribidium oscillator 1520) and the accuracy of the MBS 148 location may need to both be periodically recalibrated according to (1a) and (1b) above.

Assuming a 911 signal is transmitted by a target MS 140, this signal is transmitted, via the fixed location base station infrastructure, to the 911 emergency center and the location center 142, and assuming the MBS 148 is in the ready state 1708, if a corresponding 911 emergency request is transmitted to the UBS (via the base station infrastructure) from the 911 emergency center or the location center, then the MBS may transition to a seek state 1712 by performing the following steps:

(2a) Communicating with, for example, the 911 emergency response center via the fixed location base station network to receive the PN code for the target MS to be located (wherein this communication is performed using the MS-like transceiver 1512 and/or the MBS operator telephony interface 1524).

(2b) Obtaining a most recent target MS location estimate from either the 911 emergency center or the location center 142.

(2c) Inputting by the MBS operator an acknowledgment of the target MS to be located, and transmitting this acknowledgment to the 911 emergency response center via the transceiver 1512.

Subsequently, when the MBS 148 is in the seek state 1712, the MBS may commence toward the target MS location estimate provided. Note that it is likely that the MBS is not initially in direct signal contact with the target MS. Accordingly, in the seek state 1712 the following steps may be, for example, performed:

(3a) The location center 142 or the 911 emergency response center may inform the target MS, via the fixed location base station network, to lower its threshold for soft hand-off and at least periodically boost its location signal strength. Additionally, the target MS may be informed to scan for the pilot channel of the MBS 148. (Note the actions here are not, actions performed by the MBS 148 in the "seek state"; however, these actions are given here for clarity and completeness.)

(3b) Repeatedly, as sufficient new MS location information is available, the location center 142 provides new MS location estimates to the MBS 148 via the fixed location base station network.

(3c) The MBS repeatedly provides the MBS operator with new target MS location estimates provided substantially by the location center via the fixed location base station network.

(3d) The MBS 148 repeatedly attempts to detect a signal from the target MS using the PN code for the target MS.

(3e) The MBS 148 repeatedly estimates its own location (as in other states as well), and receives MBS location estimates from the location center.

Assuming that the MBS 148 and target MS 140 detect one another (which typically occurs when the two units are within 0.25 to 3 miles of one another), the MBS enters a contact state 1716 when the target MS 140 enters a soft hand-off state with the MBS. Accordingly, in the contact state 1716, the following steps are, for example, performed:

(4a) The MBS 148 repeatedly estimates its own location.

(4b) Repeatedly, the location center 142 provides new target MS 140 and MBS location estimates to the MBS 148 via the fixed location base infrastructure network.

(4c) Since the MBS 148 is at least in softhand-off with the target MS 140, the MBS can estimate the direction and distance of the target MS itself using, for example, detected target MS signal strength and TOA as well as using any recent location center target MS location estimates.

(4d) The MBS 148 repeatedly provides the MBS operator with new target MS location estimates provided using MS location estimates provided by the MBS itself and by the location center via the fixed location base station network.

When the target MS 140 detects that the MBS pilot channel is sufficiently strong, the target MS may switch to using the MBS 148 as its primary base station. When this occurs, the MBS enters a control state 1720, wherein the following steps are, for example, performed:

(5a) The MBS 148 repeatedly estimates its own location.

(5b) Repeatedly, the location center 142 provides new target MS and MBS location estimates to the MBS 148 via the network of base stations 122 (152).

(5c) The MBS 148 estimates the direction and distance of the target MS 140 itself using, for example, detected target MS signal strength and TOA as well as using any recent location center target MS location estimates.

(5d) The MBS 148 repeatedly provides the MBS operator with new target MS location estimates provided using MS location estimates provided by the MBS itself and by the location center 142 via the fixed location base station network.

(5e) The MBS 148 becomes the primary base station for the target MS 140 and therefore controls at least the signal strength output by the target MS.

Note, there can be more than one MBS 148 tracking or locating an MS 140. There can also be more than one target MS 140 to be tracked concurrently and each target MS being tracked may be stationary or moving.

MBS Subsystem Architecture

An MBS 148 uses MS signal characteristic data for locating the MS 140. The MBS 148 may use such signal characteristic data to facilitate determining whether a given signal from the MS is a "direct shot" or an multipath signal. That is, in one embodiment, the MBS 148 attempts to determine or detect whether an MS signal transmission is received directly, or whether the transmission has been reflected or deflected. For example, the MBS may determine whether the expected signal strength, and TOA agree in distance estimates for the MS signal transmissions. Note, other signal characteristics may also be used, if there are sufficient electronics and processing available to the MBS 148; i.e., determining signal phase and/or polarity as other indications of receiving a "direct shot" from an MS 140.

In one embodiment, the MBS 148 (FIG. 11) includes an MBS controller 1533 for controlling the location capabilities of the MBS 148. In particular, the MBS controller 1533 initiates and controls the MBS state changes as described in FIG. 12. Additionally, the MBS controller 1533 also communicates with the location controller 1535, wherein this latter controller controls MBS activities related to MBS location and target MS location. The location controller 1535 receives data input from an event generator 1537 for generating event records to be provided to the location controller 1535. For example, records may be generated from data input received from: (a) the vehicle movement detector 1539 indicating that the MBS 148 has moved at least a predetermined amount and/or has changed direction by at least a predetermined angle, or (b) the MBS signal processing subsystem 1541 indicating that the additional signal measurement data has been received from either the location center 142 or the target MS 140. Note that the MBS signal processing subsystem 1541, in one embodiment, is similar to the signal processing subsystem 1220 of the location center 142. may have multiple command schedulers. In particular, a scheduler 1528 for commands related to communicating with the location center 142, a scheduler 1530 for commands related to GPS communication (via GPS receiver 1531), a scheduler 1529 for commands related to the frequency and granularity of the reporting of MBS changes in direction and/or position via the MBS dead reckoning subsystem 1527 (note that this scheduler is potentially optional and that such commands may be provided directly to the deadreckoning estimator 1544), and a scheduler 1532 for communicating with the target MS(s) 140 being located. Further, it is assumed that there is sufficient hardware and/or software to appear to perform commands in different schedulers substantially concurrently.

In order to display an MBS computed location of a target MS 140, a location of the MBS must be known or determined. Accordingly, each MBS 148 has a plurality of MBS location estimators (or hereinafter also simply referred to as location estimators) for determining the location of the MBS. Each such location estimator computes MBS location information such as MBS location estimates, changes to MBS location estimates, or, an MBS location estimator may be an interface for buffering and/or translating a previously computed MBS location estimate into an appropriate format. In particular, the MBS location module 1536, which determines the location of the MBS, may include the following MBS location estimators 1540 (also denoted baseline location estimators):

(a) a GPS location estimator 1540*a* (not individually shown) for computing an MBS location estimate using GPS signals, (b) a location center location estimator 1540*b* (not individually shown) for buffering and/or translating an MBS estimate received from the location center 142, (c) an MBS operator location estimator 1540*c* (not individually shown) for buffering and/or translating manual MBS location entries received from an MBS location operator, and (d) in some MBS embodiments, an LBS location estimator 1540*d* (not individually shown) for the activating and deactivating of LBS's 152. Note that, in high multipath areas and/or stationary base station marginal coverage areas, such low cost location base stations 152 (LBS) may be provided whose locations are fixed and accurately predetermined and whose signals are substantially only receivable within a relatively small range (e.g., 2000 feet), the range potentially being variable. Thus, by communicating with the LBS's 152 directly, the MBS 148 may be able to quickly use the location information relating to the location base stations for determining its location by using signal characteristics obtained from the LBSs 152.

Note that each of the MBS baseline location estimators 1540, such as those above, provide an actual MBS location rather than, for example, a change in an MBS location. Further note that it is an aspect of the present invention that additional MBS baseline location estimators 1540 may be easily integrated into the MBS location subsystem 1508 as such baseline location estimators become available. For example, a baseline location estimator that receives MBS location estimates from reflective codes provided, for example, on streets or street signs can be straightforwardly incorporated into the MBS location subsystem 1508.

Additionally, note that a plurality of MBS location technologies and their corresponding MBS location estimators are utilized due to the fact that there is currently no single location technology available that is both sufficiently fast, accurate and accessible in substantially all terrains to meet the location needs of an MBS 148. For example, in many terrains GPS technologies may be sufficiently accurate; however, GPS technologies: (a) may require a relatively long time to provide an initial location estimate (e.g., greater than 2 minutes); (b) when GPS communication is disturbed, it may require an equally long time to provide a new location estimate; (c) clouds, buildings and/or mountains can prevent location estimates from being obtained; (d) in some cases signal reflections can substantially skew a location estimate. As another example, an MBS 148 may be able to use triangulation or trilateralization technologies to obtain a location estimate; however, this assumes that there is sufficient (fixed location) infrastructure BS coverage in the area the MBS is located. Further, it is well known that the multipath phenomenon can substantially distort such location estimates. Thus, for an MBS 148 to be highly effective in varied terrains, an MBS is provided with a plurality of location technologies, each supplying an MBS location estimate.

In fact, much of the architecture of the location engine 139 could be incorporated into an MBS 148. For example, in some embodiments of the MBS 148, the following FOMs 1224 may have similar location models incorporated into the MBS:

(a) a variation of the distance FOM 1224 wherein TOA signals from communicating fixed location BS's are received (via the MBS transceiver 1512) by the MBS and used for providing a location estimate;

(b) a variation of the artificial neural net based FOMs 1224 (or more generally a location learning or a classification model) may be used to provide MBS location estimates via, for example, learned associations between fixed location BS signal characteristics and geographic locations;

(c) an LBS location FOM 1224 for providing an MBS with the ability to activate and deactivate LBS's to provide (positive) MBS location estimates as well as negative MBS location regions (i.e., regions where the MBS is unlikely to be since one or more LBS's are not detected by the MBS transceiver);

(d) one or more MBS location reasoning agents and/or a location estimate heuristic agents for resolving MBS location estimate conflicts and providing greater MBS location estimate accuracy. For example, modules similar to the analytical reasoner module 1416 and the historical location reasoner module 1424.

However, for those MBS location models requiring communication with the base station infrastructure, an alternative embodiment is to rely on the location center 142 to perform the computations for at least some of these MBS FOM models. That is, since each of the MBS location models mentioned immediately above require communication with the network of fixed location BS's 122 (152), it may be advantageous to transmit.MBS location estimating data to the location center 142 as if the MBS were another MS 140 for the location center to locate, and thereby rely on the location estimation capabilities at the location center rather than duplicate such models in the MBS 148. The advantages of this approach are that:

(a) an MBS is likely to be able to use less expensive processing power and software than that of the location center, (b) an MBS is likely to require substantially less memory, particularly for data bases, than that of the location center.

As will be discussed further below, in one embodiment of the MBS 148, there are confidence values assigned to the locations output by the various location estimators 1540. Thus, the confidence for a manual entry of location data by an MBS operator may be rated the highest and followed by the confidence for (any) GPS location data, followed by the confidence for (any) location center location 142 estimates, followed by the confidence for (any) location estimates using signal characteristic data from LBSs. However, such prioritization may vary depending on, for instance, the radio coverage area 120. In an one embodiment of the present invention, it is an aspect of the present invention that for MBS location data received from the GPS and location center, their confidences may vary according to the area in which the MBS 148 resides. That is, if it is known that for a given area, there is a reasonable probability that a GPS signal may suffer multipath distortions and that the location center has in the past provided reliable location estimates, then the confidences for these two location sources may be reversed.

In one embodiment of the present invention, MBS operators may be requested to occasionally manually enter the location of the MBS 148 when the MBS is stationary for determining and/or calibrating the accuracy of various MBS location estimators.

There is an additional important source of location information for the MBS 148 that is incorporated into an MBS vehicle (such as a police vehicle) that has no comparable functionality in the network of fixed location BS's. That is, the MBS 148 may use deadreckoning information provided by a deadreckoning MBS location estimator 1544 whereby the MBS may obtain MBS deadreckoning location change estates. Accordingly, the deadreckoning MBS location estimator 1544 may use, for example, an on-board gyroscope 1550, a wheel rotation measurement device (e.g., odometer) 1554, and optionally an accelerometer (not shown). Thus, such a deadreckoning MBS location estimator 1544 periodically provides at least MBS distance and directional data related to MBS movements from a most recent MBS location estimate. More precisely, in the absence of any other new MBS location information, the deadreckoning MBS location estimator 1544 outputs a series of measurements, wherein each such measurement is an estimated change (or delta) in the position of the MBS 148 between a request input timestamp and a closest time prior to the timestamp, wherein a previous deadreckoning terminated. Thus, each deadreckoning location change estimate includes the following fields:

(a) an "earliest timestamp" field for designating the start time when the deadreckoning location change estimate commences measuring a change in the location of the MBS;

(b) a "latest timestamp" field for designating the end time when the deadreckoning location change estimate stops measuring a change in the location of the MBS; and (c) an MBS location change vector.

That is, the "latest timestamp" is the timestamp input with a request for deadreckoning location data, and the "earliest timestamp" is the timestamp of the closest time, T, prior to the latest timestamp, wherein a previous deadreckoning output has its a timestamp at a time equal to T.

Further, the frequency of such measurements provided by the deadreckoning subsystem 1527 may be adaptively provided depending on the velocity of the MBS 148 and/or the elapsed time since the most recent MBS location update. Accordingly, the architecture of at least some embodiments of the MBS location subsystem 1508 must be such that it can utilize such deadreckoning information for estimating the location of the MBS 148.

In one embodiment of the MBS location subsystem 1508 described in further detail hereinbelow, the outputs from the deadreckoning MBS location estimator 1544 are used to synchronize MBS location estimates from different MBS baseline location estimators. That is, since such a deadreckoning output may be requested for substantially any time from the deadreckoning MBS location estimator, such an output can be requested for substantially the same point in time as the occurrence of the signals from which a new MBS baseline location estimate is derived. Accordingly, such a deadreckoning output can be used to update other MBS location estimates not using the new MBS baseline location estimate.

It is assumed that the error with dead reckoning increases with deadreckoning distance. Accordingly, it is an aspect of the embodiment of the MBS location subsystem 1508 that when incrementally updating the location of the MBS 148 using deadreckoning and applying deadreckoning location change estimates to a "most likely area" in which the MBS 148 is believed to be, this area is incrementally enlarged as well as shifted. The enlargement of the area is used to account for the inaccuracy in the deadreckoning capability. Note, however, that the deadreckoning MBS location estimator is periodically reset so that the error accumulation in its outputs can be decreased. In particular, such resetting occurs when there is a high probability that the location of the MBS is known. For example, the deadreckoning MBS location estimator may be reset when an MBS operator manually enters an MBS location or verifies an MBS location, or a computed MBS location has sufficiently high confidence.

Thus, due to the MBS 148 having less accurate location information (both about itself and a target MS 140), and further that deadreckoning information must be utilized in maintaining MBS location estimates, a first embodiment of the MBS location subsystem architecture is somewhat different from the location engine 139 architecture. That is, the architecture of this first embodiment is simpler than that of the architecture of the location engine 139. However, it important to note that, at a high level the architecture of the location engine 139 may also be applied for providing a second embodiment of the MBS location subsystem 1508, as one skilled in the art will appreciate after reflecting on the architectures and processing provided at an MBS 148. For example, an MBS location subsystem 1508 architecture may be provided that has one or more first order models 1224 whose output is supplied to, for example, a blackboard or expert system for resolving MBS location estimate conflicts, such an architecture being analogous to one embodiment of the location engine 139 architecture.

Furthermore, it is also an important aspect of the present invention that, at a high level, the MBS location subsystem architecture may also be applied as an alternative architecture for the location engine 139. For example, in one embodiment of the location engine 139, each of the first order models 1224 may provide its MS location hypothesis outputs to a corresponding "location track," analogous to the MBS location tracks described hereinbelow, and subsequently, a most likely MS current location estimate may be developed in a "current location track" (also described hereinbelow) using the most recent location estimates in other location tracks. Thus, the location estimating models of the location center 139 and those of the MBS 148 are may be interchanged depending on the where it is deemed most appropriate for such each such model to reside. Additionally, note that in different embodiments of the present invention, various combinations of the location center location architecture and the mobile station architecture may be utilized at either the location center or the MBS 148. Thus, by providing substantially all location estimating computational models at the location center 142, the models described here for locating the MBS 148 (and equivalently, its incorporated MS 140) can be used for locating other MSs 140 that are be capable of supporting transmission of wireless signal measurements that relate to models requiring the additional electronics available at the MBS 140 (e.g., GPS or other satellite signals used for location).

Further, note that the ideas and methods discussed here relating to MBS location estimators 1540 and MBS location tracks, and, the related programs hereinbelow are sufficiently general so that these ideas and methods may be applied in a number of contexts related to determining the location of a device capable of movement and wherein the location of the device must be maintained in real time. For example, the present ideas and methods may be used by a robot in a very cluttered environment (e.g., a warehouse), wherein the robot has access: (a) to a plurality of "robot location estimators" that may provide the robot with sporadic location information, and (b) to a deadreckoning location estimator.

Each MBS 148, additionally, has a location display (denoted the MBS operator visual user interface 1558 in FIG. 11) where area maps that may be displayed together with location data. In particular, MS location data may be displayed on this display as a nested collection of areas, each smaller nested area being the most likely area within (any) encompassing area for locating a target MS 140. Note that the MBS controller algorithm below may be adapted to receive location center 142 data for displaying the locations of other MBSs 148 as well as target MSs 140.

Further, the MBS 148 may constrain any location estimates to streets on a street map using the MBS location snap to street module 1562. For example, an estimated MBS location not on a street may be "snapped to" a nearest street location. Note that a nearest street location determiner may use "normal" orientations of vehicles on streets as a constraint on the nearest street location. Particularly, if an MBS 148 is moving at typical rates of speed and acceleration, and without abrupt changes direction. For example, if the deadreckoning MBS location estimator 1544 indicates that the MBS 148 is moving in a northerly direction, then the street snapped to should be a north-south running street. Moreover, the MBS location snap to street module 1562 may also be used to enhance target MS location estimates when, for example, it is known or suspected that the target MS 140 is in a vehicle and the vehicle is moving at typical rates of speed. Furthermore, the snap to street location module 1562 may also be used in enhancing the location of a target MS 140 by either the MBS 148 or by the location engine 139. In particular, the location estimator 1344 or an additional module between the location estimator 1344 and the output gateway 1356 may utilize an embodiment of the snap to street location module 1562 to enhance the accuracy of target MS 140 location estimates that are known to be in vehicles. Note that this may be especially useful in locating stolen vehicles that have embedded wireless location transceivers (MSs 140), wherein appropriate wireless signal measurements can be provided to the location center 142.

MBS Data Structure Remarks

Figure 13:
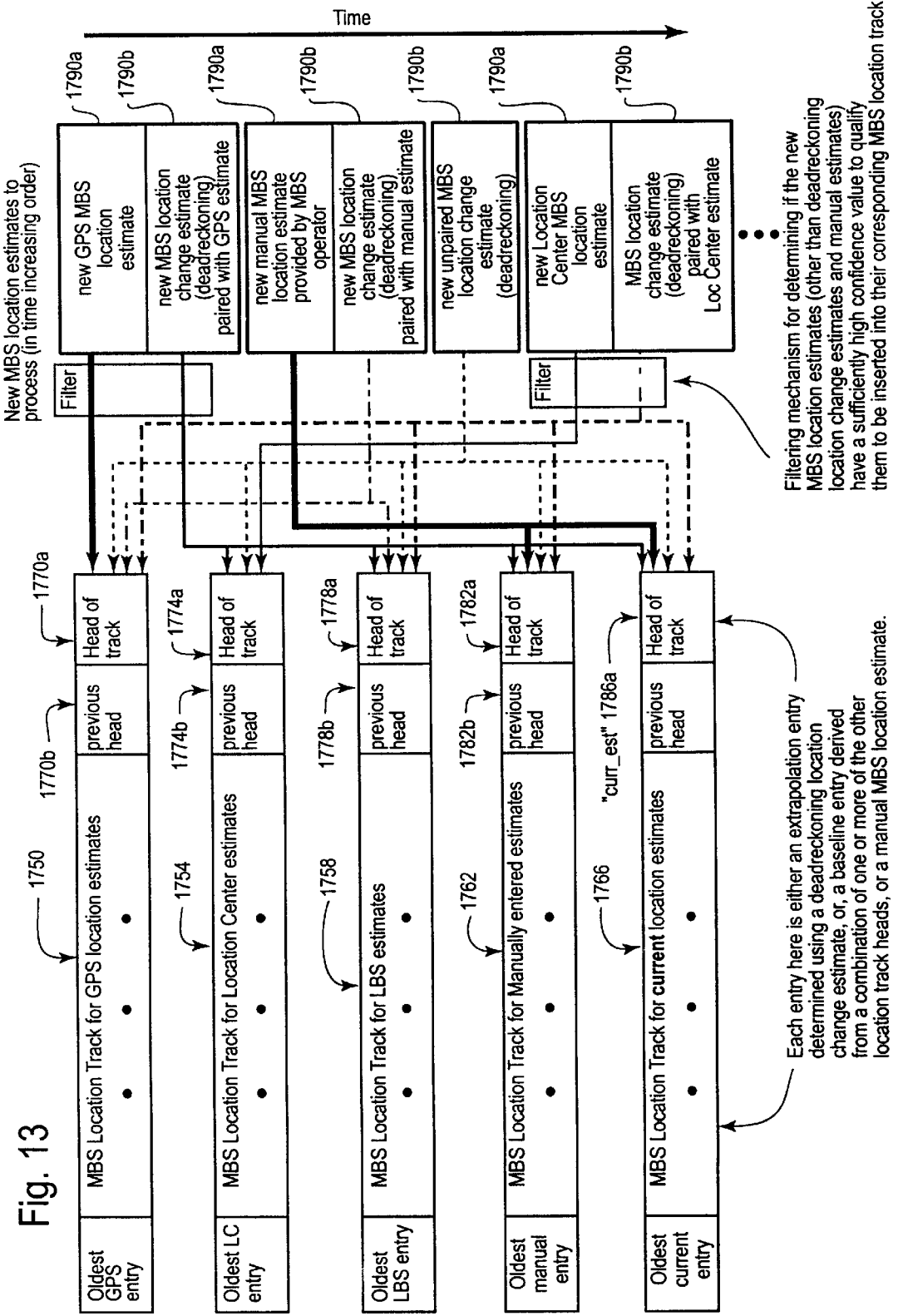
FIG. 13 is a high level diagram illustrating the data structural organization of the Mobile Base station capability for autonomously determining a most likely MBS location from a plurality of potentially conflicting MBS location estimating sources.
Figure 14:
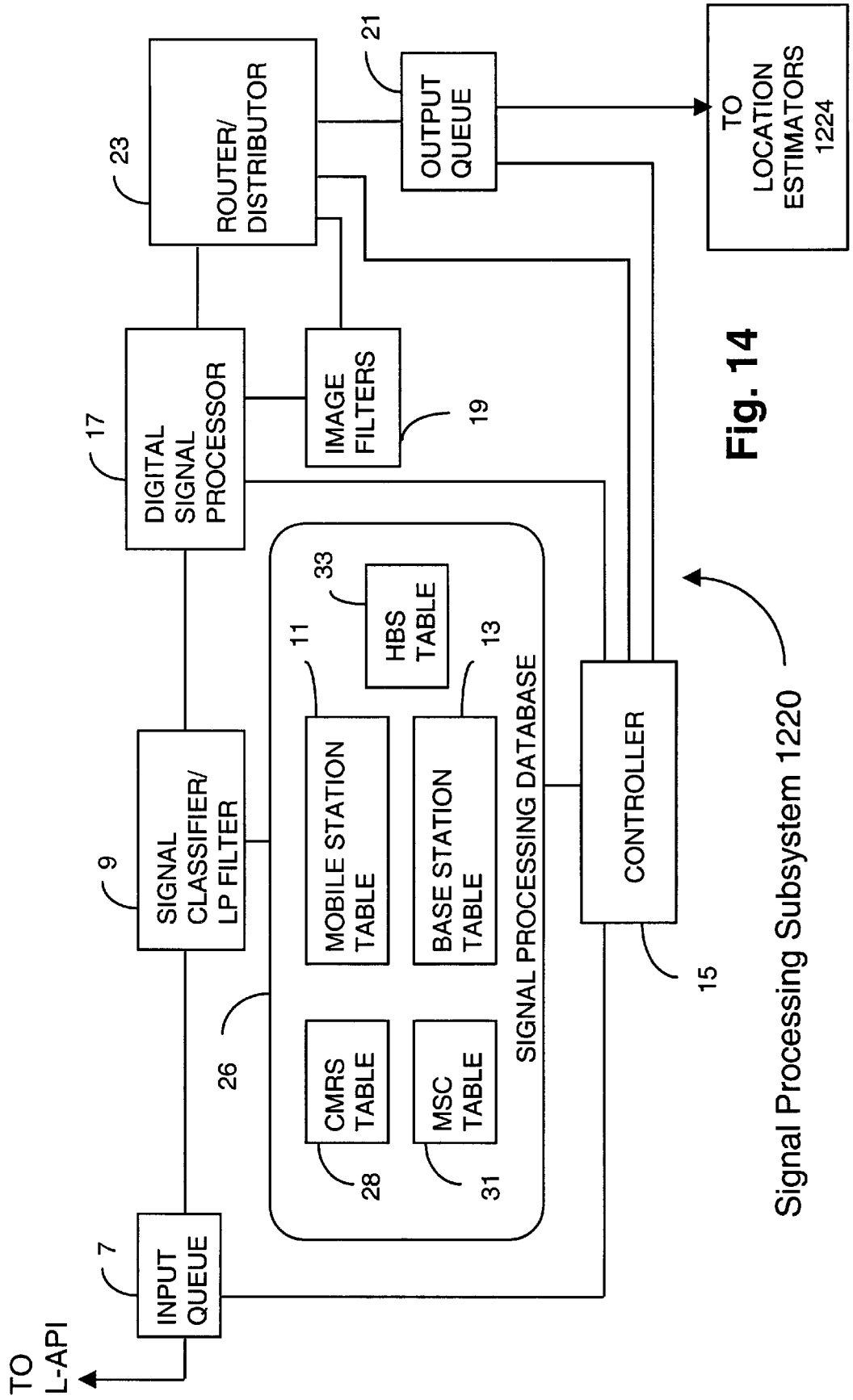
FIG. 14 illustrates the primary components of the signal processing subsystem
Figure 15:
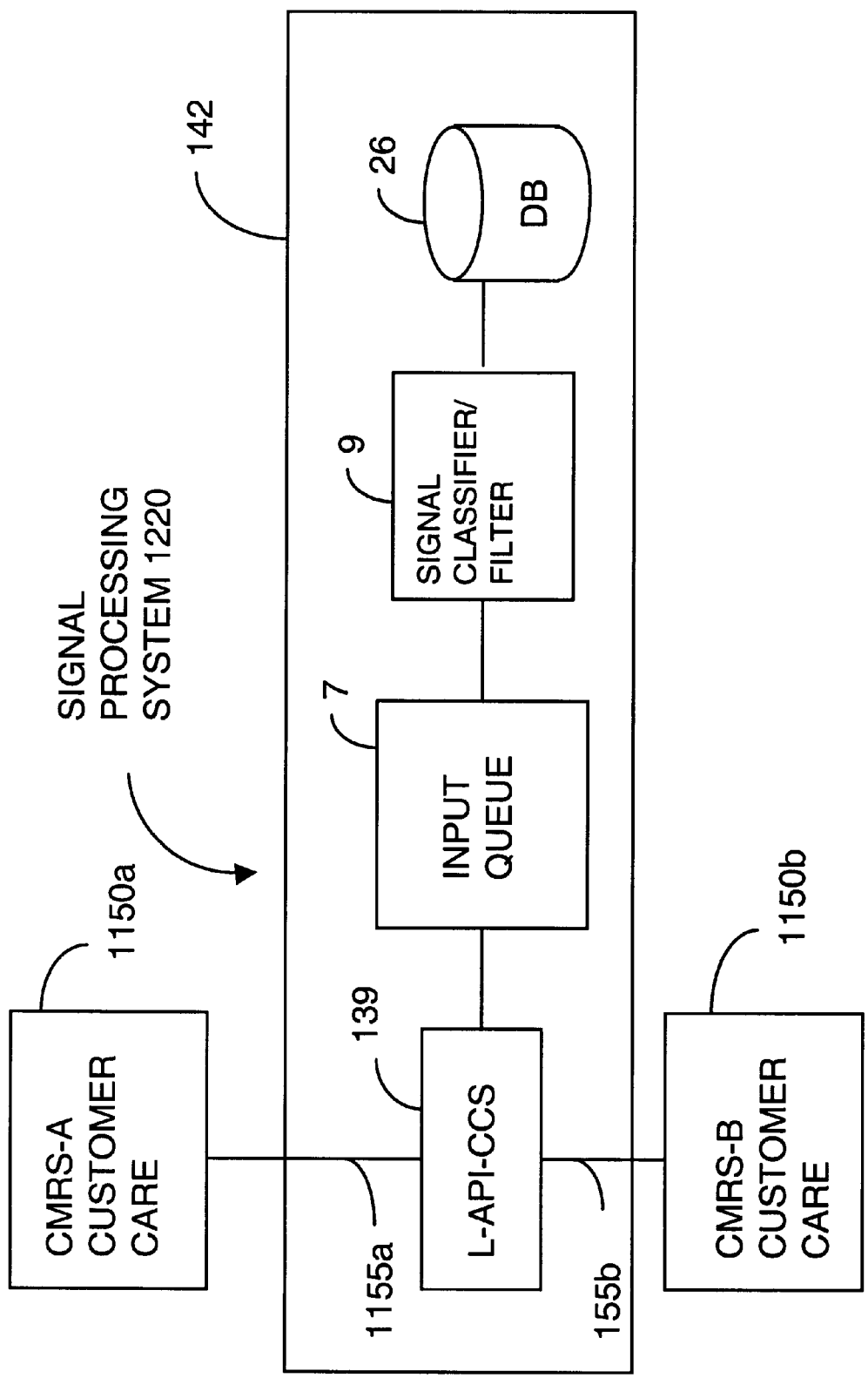
FIG. 15 illustrates how automatic provisioning of mobile station information from multiple CMRS occurs.

Assuming the existence of at least some of the location estimators 1540 that were mentioned above, the discussion here refers substantially to the data structures and their organization as illustrated in FIG. 13.

The location estimates (or hypotheses) for an MBS 148 determining its own location each have an error or range estimate associated with the MBS location estimate. That is, each such MBS location estimate includes a "most likely MBS point location" within a "most likely area". The "most likely MBS point location" is assumed herein to be the centroid of the "most likely area." In one embodiment of the MBS location subsystem 1508, a nested series of "most likely areas" may be provided about a most likely MBS point location. However, to simplify the discussion herein each MBS location estimate is assumed to have a single "most likely area". One skilled in the art will understand how to provide such nested "most likely areas" from the description herein. Additionally, it is assumed that such "most likely areas" are not grossly oblong; i.e., area cross sectioning lines through the centroid of the area do not have large differences in their lengths. For example, for any such "most likely area", A, no two such cross sectioning lines of A may have lengths that vary by more than a factor of two.

Each MBS location estimate also has a confidence associated therewith providing a measurement of the perceived accuracy of the MBS being in the "most likely area" of the location estimate.

A (MBS) "location track" is an data structure (or object) having a queue of a predetermined length for maintaining a temporal (timestamp) ordering of location track entries" such as the location track entries 1770a, 1770b, 1774a, 1774b, 1778a, 1778b, 1782a, 1782b, and 1786a (FIG. 13), wherein each such MBS location track entry is an estimate of the location of the MBS at a particular corresponding time.

There is an MBS location track for storing MBS location entries obtained from MBS location estimation information from each of the MBS baseline location estimators described above (i.e., a GPS location track 1750 for storing MBS location estimations obtained from the GPS location estimator 1540, a location center location track 1754 for storing MBS location estimations obtained from the location estimator 1540 deriving its MBS location estimates from the location center 142, an LBS location track 1758 for storing MBS location estimations obtained from the location estimator 1540 deriving its MBS location estimates from base stations 122 and/or 152, and a manual location track 1762 for MBS operator entered MBS locations). Additionally, there is one further location track, denoted the "current location track" 1766 whose location track entries may be derived from the entries in the other location tracks (described further hereinbelow). Further, for each location track, there is a location track head that is the head of the queue for the location track The location track head is the most recent (and presumably the most accurate) MBS location estimate residing in the location track. Thus, for the GPS location track 1750 has location track head 1770; the location center location track 1754 has location track head 1774; the LBS location track 1758 has location track head 1778; the manual location track 1762 has location track head 1782; and the current location track 1766 has location track head 1786. Additionally, for notational convenience, for each location track, the time series of previous MBS location estimations (i.e., location track entries) in the location track will herein be denoted the "path for the location track." Such paths are typically the length of the location track queue containing the path. Note that the length of each such queue may be determined using at least the following considerations:

(i) In certain circumstances (described hereinbelow), the location track entries are removed from the head of the location track queues so that location adjustments may be made. In such a case, it may be advantageous for the length of such queues to be greater than the number of entries that are expected to be removed;

(ii) In determining an MBS location estimate, it may be desirable in some embodiments to provide new location estimates based on paths associated with previous MBS location estimates provided in the corresponding location track queue.

Also note that it is within the scope of the present invention that the location track queue lengths may be a length of one.

Regarding location track entries, each location track entry includes:

(a) a "derived location estimate" for the MBS that is derived using at least one of (i) at least a most recent previous output from an MBS baseline location estimator 1540 (i.e., the output being an MBS location estimate);

(ii) deadreckoning output information from the deadreckoning subsystem 1527. Further note that each output from an MBS location estimator has a "type" field that is used for identifying the MBS location estimator of the output.

(b) an "earliest timestamp" providing the time/date when the earliest MBS location information upon which the derived location estimate for the MBS depends. Note this will typically be the timestamp of the earliest MBS location estimate (from an MBS baseline location estimator) that supplied MBS location information used in deriving the derived location estimate for the MBS 148.

(c) a "latest timestamp" providing the time/date when the latest MBS location information upon which the derived location estimate for the MBS depends. Note that earliest timestamp =latest timestamp only for so called "baseline entries" as defined hereinbelow. Further note that this attribute is the one used for maintaining the "temporal (timestamp) ordering" of location track entries.

(d) A "deadreckoning distance" indicating the total distance (e.g., wheel turns or odometer difference) since the most recently previous baseline entry for the corresponding MBS location estimator for the location track to which the location track entry is assigned.

For each MBS location track, there are two categories of MBS location track entries that may be inserted into a MBS location track:

(a) "baseline" entries, wherein each such baseline entry includes (depending on the location track) a location estimate for the MBS 148 derived from: (i) a most recent previous output either from a corresponding MBS baseline location estimator, or (ii) from the baseline entries of other location tracks (this latter case being the for the "current" location track);

(b) "extrapolation" entries, wherein each such entry includes an MBS location estimate that has been extrapolated from the (most recent) location track head for the location track (i.e., based on the track head whose "latest timestamp" immediately precedes the latest timestamp of the extrapolation entry). Each such extrapolation entry is computed by using data from a related deadreckoning location change estimate output from the deadreckoning MBS location estimator 1544. Each such deadreckoning location change estimate includes measurements related to changes or deltas in the location of the MBS 148. More precisely, for each location track, each extrapolation entry is determined using: (i) a baseline entry, and (ii) a set of one or more (i.e., all later occurring) deadreckoning location change estimates in increasing "latest timestamp" order. Note that for notational convenience this set of one or more deadreckoning location change estimates will be denoted the "deadreckoning location change estimate set" associated with the extrapolation entry resulting from this set.

(c) Note that for each location track head, it is either a baseline entry or an extrapolation entry. Further, for each extrapolation entry, there is a most recent baseline entry, B, that is earlier than the extrapolation entry and it is this B from which the extrapolation entry was extrapolated. This earlier baseline entry, B, is hereinafter denoted the "baseline entry associated with the extrapolation entry." More generally, for each location track entry, T, there is a most recent previous baseline entry, B, associated with T, wherein if T is an extrapolation entry, then B is as defined above, else if T is a baseline entry itself then T=B. Accordingly, note that for each extrapolation entry that is the head of a location track, there is a most recent baseline entry associated with the extrapolation entry.

Further, there are two categories of location tracks:
(a) "baseline location tracks," each having baseline entries exclusively from a single predetermined MBS baseline location estimator; and
(b) a "current" MBS location track having entries that are computed or determined as "most likely" MBS location estimates from entries in the other MBS location tracks.

MBS Location Estimating Strategy

In order to be able to properly compare the track heads to determine the most likely MBS location estimate it is an aspect of the present invention that the track heads of all location tracks include MBS location estimates that are for substantially the same (latest) timestamp. However, the MBS location information from each MBS baseline location estimator is inherently substantially unpredictable and unsynchronized. In fact, the only MBS location information that may be considered predicable and controllable is the deadreckoning location change estimates from the deadreckoning MBS location estimator 1544 in that these estimates may reliably be obtained whenever there is a query from the location controller 1535 for the most recent estimate in the change of the location for the MBS 148. Consequently (referring to FIG. 13), synchronization records 1790 (having at least a 1790*b* portion, and in some cases also having a 1790*a* portion) may be provided for updating each location track with a new MBS location estimate as a new track head. In particular, each synchronization record includes a deadreckoning location change estimate to be used in updating all but at most one of the location track heads with a new MBS location estimate by using a deadreckoning location change estimate in conjunction with each MBS location estimate from an MBS baseline location estimator, the location track heads may be synchronized according to timestamp. More precisely, for each MBS location estimate, E, from an MBS baseline location estimator, the present invention also substantially simultaneously queries the deadreckoning MBS location estimator for a corresponding most recent change in the location of the MBS 148. Accordingly, E and the retrieved MBS deadreckoning location change estimate, C, have substantially the same "latest timestamp". Thus, the location estimate E may be used to create a new baseline track head for the location track having the corresponding type for E, and C may be used to create a corresponding extrapolation entry as the head of each of the other location tracks. Accordingly, since for each MBS location estimate, E, there is a MBS deadreckoning location change estimate, C, having substantially the same Latest timestamp", E and C will be hereinafter referred as "paired."

What is claimed is:

1. A method for providing a location estimate of a wireless mobile station using measurements of wireless signals, comprising:
 (a) first receiving, when available, a first collection of measurements of wireless signals transmitted between said mobile station and one or more satellites;
 (b) second receiving a second collection of measurements of wireless signals transmitted between said mobile station and one or more terrestrial communication stations, at least when said first collection is not available, each said communication station including at least one of a receiver for receiving signals from, and a transmitter for transmitting signals to said mobile station;
 (c) first determining a first location estimate of said mobile station using said first measurements according to an availability of said first collection;
 (d) second determining a second location estimate of said mobile station using said second measurements according to an availability of said second collection, wherein said second location estimate is obtained from estimating a time of arrival (TOA) of a received signal relative to a time reference at each one of a plurality of wireless signal monitoring stations using an inverse transform whose resolution is greater than Rayleigh resolution;
 (e) outputting a resulting location estimate obtained using at least one of said first and second location estimates.

2. A method as claimed in claim 1, wherein said steps of claim 1 are performed for a single emergency response request.

3. A method as claimed in claim 1, further including a step of outputting, to an emergency response center, said resulting location estimate of said mobile station in response to said emergency response request.

4. A method for locating a mobile station using wireless signal measurements obtained from transmissions between said mobile station and a plurality of fixed location communication stations, wherein each of said communications stations includes one or more of a transmitter and a receiver for wirelessly communicating with said mobile station, comprising:
 providing first and second mobile station location evaluators, wherein said location evaluators determine information related to one or more location estimates of said mobile station when said location estimators are supplied with data having values obtained from wireless signal measurements obtained via transmissions between said mobile station and the communication stations, wherein:
 (A) said first location evaluator performs one or more of the following techniques (i), (ii) and (iii) when supplied with a corresponding instance of said data:
  (i) a first technique for determining, for at least one of the communication stations, one of: a distance, and a time difference of arrival between the mobile station and the communication station, wherein said first technique estimates a time of arrival (TOA) of a received signal relative to a time reference at each one of a plurality of wireless signal monitoring stations using an inverse transform whose resolution is greater than Rayleigh resolution;
  (ii) a second technique for estimating a location of said mobile station, using values from a corresponding instance of said data obtained from signals received by the mobile station from one or more satellites;
  (iii) a third technique for recognizing a pattern of characteristics of a corresponding instance of said data, wherein said pattern of characteristics is indicative of a plurality of wireless signal transmission paths between the mobile station and each of one or more of the communication stations; and
 (B) for at least a particular one of said techniques performed by said first location estimator, said second location evaluator performs a different one of said techniques when supplied with a corresponding instance of said data for the different technique;
 first generating, by said first location estimator, first location related information that is dependent upon an availability of a first corresponding instance of said data;
 second generating, by said second location evaluator, second location related information that is dependent upon an availability of a second corresponding instance of said data;

determining a resulting location estimate of the mobile station dependent upon at least one of: (a) a first value obtained from said first location related information, and (b) a second value obtained from said second location related information.

5. The method as claimed in claim 4, wherein one or more of said mobile station location evaluators generates a location estimate of said mobile station.

6. The method as claimed in claim 4, wherein said mobile station is co-located with a processor for activating at least one of said location estimators.

7. The method of claim 1, further including a step of monitoring a signal s(t) transmitted from the wireless mobile station at each one of a plurality of the communication stations, wherein said step of monitoring includes the steps following:

filtering, amplifying and demodulating the received signal s(t) thereby generating a filtered, amplified and demodulated signal $r_i(t)$; and estimating the TOA of the filtered, amplified and demodulated signal $r_i(t)$ relative to a time reference.

8. The method of claim 4, wherein one of said steps of first and second generating includes processing time difference of arrivals of said first technique for generating an estimate of the position of the mobile station by solving for one of (a) through (d) following:

(a) two coordinates using three of said communication stations using hyperbolic trilateration;

(b) three coordinates using four of said communication stations using hyperbolic trilateration;

(c) two coordinates using more than three of said communication stations using hyperbolic trilateration and one of parametric least squares, Kalman filtering or maximum likelihood; and (d) three coordinates using more than four of said communication stations using hyperbolic trilateration and one of parametric least squares, Kalman filtering or maximum likelihood.

* * * * *

UNITED STATES PATENT AND TRADEMARK OFFICE
CERTIFICATE OF CORRECTION

PATENT NO. : 6,249,252 B1
DATED : June 19, 2001
INVENTOR(S) : Dupray

Page 1 of 1

It is certified that error appears in the above-identified patent and that said Letters Patent is hereby corrected as shown below:

<u>Title page,</u>
Item [63], Related U.S. Application Data, replace with the following:

-- The present application is a continuation-in-part of co-pending U.S. Patent Application Serial No. 09/194,367 filed November 24, 1998 which is the U.S. National Stage filing of International Application No. PCT/US97/15892 filed September 8, 1997 (and claims the benefit thereof). Additionally, the present patent is a continuation-in-part of co-pending U.S. Application Serial No. 09/176,587 filed October 21, 1998 which is a continuation-in-part of U.S. Application Serial No. 09/194,367. Additionally, the present patent is a continuation-in-part of co-pending U.S. Application Serial No. 09/230,109 filed January 22, 1999 (now U.S Patent No. 6,236,365) which is the U.S. National Stage filing of International Application No. PCT/US97/15933 filed September 8, 1997 (and claims the benefit thereof). --

Item [60], Related U.S. Application Data, replace with the following:

-- International Application No. PCT/US97/15892 filed September 8, 1997, claims the benefit of the following three applications: U.S. Provisional Application No. 60/056,590 filed August 20, 1997; U.S. Provisional Application No. 60/044,821 filed April 25, 1997; and U.S. Provisional Application No. 60/025,855 filed September 9, 1996. U.S. Application Serial No. 09/176,587 filed October 21, 1998 claims the benefit of U.S. Provisional Application No. 60/062,931 filed October 21, 1997. International Application No. PCT/US97/15933 filed September 8, 1997 claims the benefit of the following three applications: U.S. Provisional Application No. 60/056,603 filed August 20, 1997, U.S. Provisional Application No. 60/044,821 filed April 25, 1997; and U.S. Provisional Application No. 60/025,855 filed September 9, 1996. Additionally, the present application claims the benefit of Provisional Application No. 60/083,041 filed April 23, 1998. The present application claims the benefit of all the above-identified applications. --

Signed and Sealed this

Twenty-second Day of March, 2005

JON W. DUDAS
*Director of the United States Patent and Trademark Office*

Disclaimer

6,249,252 B1—Dennis J. Dupray, et al., Denver, CO (US). WIRELESS LOCATION USING MULTIPLE LOCATION ESTIMATORS. Patent dated June 19, 2001. Disclaimer filed April 21, 2011, by the assignee, TracBeam, LLC.

The term of this patent shall not extend beyond the expiration date of patent no. 6,249,252.

(*Official Gazette January 10, 2012*)

Disclaimer 6,249,252 B1—Dennis J. Dupray, Denver, CO (US). WIRELESS LOCATION USING MULTIPLE LOCATION ESTIMATORS. Patent dated June 19, 2001. Disclaimer filed April 21, 2011, by the assignee, TracBeam LLC.

The term of this patent shall not extend beyond the expiration date of Patent Nos. 7,274,332 and 7,764,231.

(*Official Gazette, February 14, 2012*)